United States Patent
Lee et al.

(10) Patent No.: US 9,906,348 B2
(45) Date of Patent: *Feb. 27, 2018

(54) METHOD AND DEVICE FOR TRANSMITTING/RECEIVING UPLINK CONTROL INFORMATION IN WIRELESS COMMUNICATION SYSTEM

(71) Applicant: LG ELECTRONICS INC., Seoul (KR)

(72) Inventors: Hyunwoo Lee, Anyang-si (KR); Jaehoon Chung, Anyang-si (KR); Seunghee Han, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/589,317

(22) Filed: May 8, 2017

(65) Prior Publication Data

US 2017/0244532 A1    Aug. 24, 2017

Related U.S. Application Data

(63) Continuation of application No. 15/228,211, filed on Aug. 4, 2016, now Pat. No. 9,667,401, which is a
(Continued)

(51) Int. Cl.
*H04W 72/04*    (2009.01)
*H04L 1/16*    (2006.01)
(Continued)

(52) U.S. Cl.
CPC .......... *H04L 5/0055* (2013.01); *H04L 1/1607* (2013.01); *H04L 1/1854* (2013.01);
(Continued)

(58) Field of Classification Search
CPC ... H04L 1/1607; H04L 1/1887; H04L 5/0055; H04L 5/14; H04L 1/1854;
(Continued)

(56) References Cited

U.S. PATENT DOCUMENTS

2009/0213769 A1    8/2009    Shen et al.
2009/0245194 A1    10/2009    Damnjanovic et al.
(Continued)

FOREIGN PATENT DOCUMENTS

CN    101409922 A    4/2009
CN    101442818 A    5/2009
(Continued)

OTHER PUBLICATIONS

CATT, "Resource Allocation for PUCCH Format 3," 3GPP TSG RAN WG1 Meeting #62bis, R1-105153, Agenda Item 6.2.1.1, Xi'an, China, Oct. 11-15, 2010, 3 pages.
(Continued)

*Primary Examiner* — Gbemileke J Onamuti
(74) *Attorney, Agent, or Firm* — Birch, Stewart, Kolasch & Birch, LLP

(57) ABSTRACT

A method is provided for transmitting Acknowledgement/Negative Acknowledgement (ACK/NACK) information in a wireless communication system. A User Equipment (UE) configures a Physical Uplink Control Channel (PUCCH) format 3 for transmission of the ACK/NACK information. The UE transmits the ACK/NACK information for downlink transmission in a downlink subframe set including M downlink subframes in one uplink subframe, wherein M>1. A plurality of serving cells are configured for the UE and include one Primary Cell (PCell) and at least one Secondary Cell (SCell). The UE transmits the ACK/NACK information using a PUCCH format 1b when a first condition is met that comprises a condition in case where the ACK/NACK infor-
(Continued)

mation corresponds to one Physical Downlink Shared Channel (PDSCH) without a corresponding Physical Downlink Control Channel (PDCCH) received only on the PCell in the downlink subframe set and the ACK/NACK information corresponds to an additional PDSCH indicated by detection of one corresponding PDCCH.

18 Claims, 40 Drawing Sheets

Related U.S. Application Data continuation of application No. 14/801,675, filed on Jul. 16, 2015, now Pat. No. 9,549,396, which is a continuation of application No. 13/880,653, filed as application No. PCT/KR2011/008292 on Nov. 2, 2011, now Pat. No. 9,113,458.

(60) Provisional application No. 61/481,257, filed on May 2, 2011, provisional application No. 61/450,140, filed on Mar. 8, 2011, provisional application No. 61/412,794, filed on Nov. 12, 2010, provisional application No. 61/412,362, filed on Nov. 10, 2010, provisional application No. 61/410,349, filed on Nov. 5, 2010, provisional application No. 61/409,994, filed on Nov. 4, 2010, provisional application No. 61/409,547, filed on Nov. 3, 2010, provisional application No. 61/409,485, filed on Nov. 2, 2010.

(51) Int. Cl.
  H04L 5/00    (2006.01)
  H04L 5/14    (2006.01)
  H04L 1/18    (2006.01)
  H04W 36/00   (2009.01)
  H04W 52/04   (2009.01)
  H04L 27/26   (2006.01)

(52) U.S. Cl.
  CPC .......... *H04L 1/1861* (2013.01); *H04L 1/1887* (2013.01); *H04L 5/14* (2013.01); *H04W 36/0072* (2013.01); *H04W 52/04* (2013.01); *H04W 72/04* (2013.01); *H04W 72/042* (2013.01); *H04W 72/0406* (2013.01); *H04W 72/0413* (2013.01); *H04W 72/0446* (2013.01); *H04L 5/0048* (2013.01); *H04L 5/0053* (2013.01); *H04L 27/2636* (2013.01)

(58) Field of Classification Search
  CPC ......... H04W 36/0072; H04W 72/0406; H04W 72/0413; H04W 72/04; H04W 72/042
  See application file for complete search history.

(56) References Cited

U.S. PATENT DOCUMENTS

| | | |
|---|---|---|
| 2010/0322173 A1 | 12/2010 | Marinier et al. |
| 2011/0026631 A1 | 2/2011 | Zhang et al. |
| 2011/0096815 A1 | 4/2011 | Shin et al. |
| 2011/0134774 A1 | 6/2011 | Pelletier et al. |
| 2011/0205981 A1 | 8/2011 | Koo et al. |
| 2011/0243066 A1 | 10/2011 | Nayeb Nazar et al. |
| 2011/0268053 A1 | 11/2011 | Che et al. |
| 2011/0310856 A1 | 12/2011 | Hariharan et al. |
| 2012/0087254 A1 | 4/2012 | Yin et al. |
| 2013/0182619 A1 | 7/2013 | Tiirola et al. |
| 2013/0230033 A1 | 9/2013 | Lee et al. |

FOREIGN PATENT DOCUMENTS

| | | |
|---|---|---|
| CN | 101478383 A | 7/2009 |
| CN | 101616492 A | 12/2009 |
| CN | 101730245 A | 6/2010 |
| CN | 101801098 A | 8/2010 |
| CN | 101835271 A | 9/2010 |
| EP | 2104263 A1 | 9/2009 |
| EP | 2704345 A1 | 3/2014 |
| WO | WO 2010/069422 A1 | 6/2010 |
| WO | WO 2010/105680 A1 | 9/2010 |
| WO | WO 2011/041623 A1 | 4/2011 |
| WO | WO 2011/137408 A2 | 11/2011 |
| WO | WO 2012/146107 A1 | 11/2012 |

OTHER PUBLICATIONS

LG Electronics Inc., "ACK/NACK on PUCCH for TDD," 3GPP TSG RAN WG1 Meeting #62bis, R1-105647, Agenda Item 6.2.1.1., Xi'an, China, Oct. 11-15, 2010, 7 pages.
LG Electronics, "ACK/NACK on PUCCH for TDD," 3GPP TSG RAN WG1 Meeting #63, R1-106099, Jacksonville, USA, Nov. 15-19, 2010, pp. 1-13.
PUCCH Resources for Multi-bit ACK, 3GPP TSG RAN WG1 #62bis, R1-10557, Agenda Item, 6.2.1., Xian, China, Oct. 11-15, 2010.
Qualcomm Incorporated, "PUCCH Resources for Multi-bit ACK," 3GPP TSG RAN WG1 #62bis, R1-105557, Agenda Item, 6.2.1.1, Xi'an, China, Oct. 11-15, 2010, 3 pages.
Samsung, "HARQ-ACK Resource Indication in PUCCH for DL CA," 3GPP TSG RAN WG1 #62bis, R1-105359, Agenda Item 6.2.1.1, Xi'an, China, Oct. 11-15, 2010, 4 pages.
3GPP, "3rd Generation Partnership Project; Technical Specification Group Radio Access Network; Evolved Universal Terrestrial Radio Access (E-UTRA); Physical layer procedures (Release 9)," 3GPP TS 36.213 V9.3.0, Sep. 2010, XP050912599, pp. 1-80.
Ericsson et al., "PUCCH Format 3 Resource Selection," 3GPP TSG RAN WG1 Meeting #62bis, R1-105711, Xian, China, Oct. 11-15, 2010, 5 pages.
Huawei, "Resource allocation for uplink ACK/NACK multiplexing," 3GPP TSG RAN WG1 Meeting #62, Aug. 23-27, 2010, 5 pages, R1-104282.
LG Electronics, "Resource Allocation for TDD PUCCH format 3," 3GPP TSG RAN WG1 Meeting #64, R1-110841, Taipei, Taiwan, Feb. 21-25, 2011, pp. 1-5.
Nokia et al., "Acknowledgement for Explicit UL SPS Release in LTE Rel'9," 3GPP TSG RAN WG1 Meeting #58bis, R1-093894, Miyazaki, Japan, Oct. 12-16, 2009, 12 pages.
NTT Docomo, "Remaining Issue on PUCCH Resource Allocation," 3GPP TSG RAN WG1 Meeting #62bis, R1-105429, Xian, China, Oct. 11-15, 2010, pp. 1-4.
Huawei et al., "Remaining details on HARQ-ACK procedure with PUCCH format 3 for TDD", 3GPP TSG RAN WG1 Meeting #65, R1-111241, Barcelona, Spain, May 9-13, 2011, 5 pages.
3GPP, "LTE; Evolved Universal Terrestrial Radio Access (E-UTRA); Physical layer procedures (3GPP TS 36.213 version 9.3.0 Release 9)," ETSI TS 136 213, V9.3.0, Oct. 2010, pp. 1-81 (82 pages total).
Huawei et al., "Way forward on A/N PUCCH resource allocation," TSG-RAN WG1 Meeting #62bis, R1-105777, Agenda Item: 6.2.1. 1, Xi'an, P.R. China, Oct. 11-15, 2010, 3 pages.

Single component carrier (e.g. LTE system)

PUCCH format 1a and 1b structure (normal CP case)

PUCCH format 1a and 1b structure (extended CP case)

FIG. 35
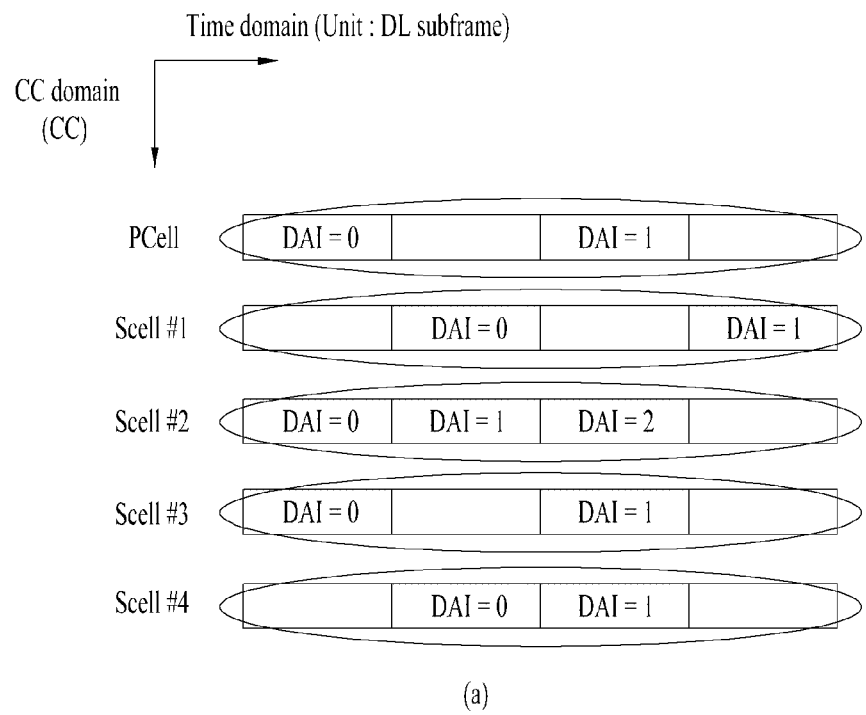
(a)
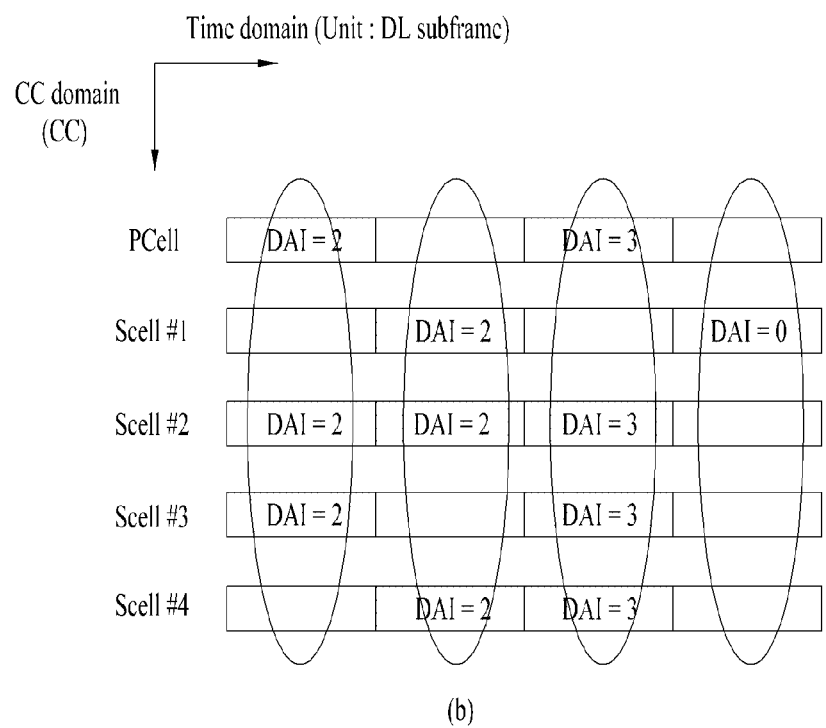
(b)

METHOD AND DEVICE FOR TRANSMITTING/RECEIVING UPLINK CONTROL INFORMATION IN WIRELESS COMMUNICATION SYSTEM

CROSS-REFERENCE TO RELATED APPLICATION

This Application is a Continuation of U.S. patent application Ser. No. 15/228,211 filed on Aug. 4, 2016 (now U.S. Pat. No. 9,667,401 issued on May 30, 2017), which is a Continuation of U.S. patent application Ser. No. 14/801,675 filed on Jul. 16, 2015 (now U.S. Pat. No. 9,549,396 issued on Jan. 17, 2017), which is a Continuation of U.S. patent application Ser. No. 13/880,653 filed on Apr. 19, 2013 (now U.S. Pat. No. 9,113,458 issued on Aug. 18, 2015), which is the National Phase of PCT/KR2011/008292 filed on Nov. 2, 2011, which claims the benefit under 35 U.S.C. § 119(e) to U.S. Provisional Application Nos. 61/481,257 filed on May 2, 2011, 61/450,140 filed on Mar. 8, 2011, 61/412,794 filed on Nov. 12, 2010, 61/412,362 filed on Nov. 10, 2010, 61/410,349 filed on Nov. 5, 2010, 61/409,994 filed on Nov. 4, 2010, 61/409,547 filed on Nov. 3, 2010 and 61/409,485 filed on Nov. 2, 2010, all of which are hereby expressly incorporated by reference into the present application.

BACKGROUND OF THE INVENTION

Field of the Invention

The present invention relates to a mobile radio communication system, and more particularly, to a method and apparatus for transmitting and receiving uplink control information.

Discussion of the Related Art

Wireless communication systems have been widely deployed to provide various types of communication services such as voice or data services. Generally, a wireless communication system is a multiple access system capable of supporting communication with multiple users by sharing available system resources (bandwidth, transmission power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

SUMMARY OF THE INVENTION

An object of the present invention is to provide a method for efficiently transmitting control information in a wireless communication system and an apparatus therefor. Another object of the present invention is to provide a channel format and signal processing method for efficiently transmitting control information and an apparatus therefor. Still another object of the present invention is to provide a method for efficiently allocating resources for control information transmission.

It will be appreciated by persons skilled in the art that that the technical objects that can be achieved through the present invention are not limited to what has been particularly described hereinabove and other technical objects of the present invention will be more clearly understood from the following detailed description.

The object of the present invention can be achieved by providing a method for transmitting Acknowledgement/Negative Acknowledgement (ACK/NACK) information at a User Equipment (UE) in a wireless communication system, including determining a Physical Uplink Control Channel (PUCCH) format and resource through which ACK/NACK information for downlink transmission in a downlink frame set including M (M>1) downlink subframes is to be transmitted; and transmitting the ACK/NACK information using the PUCCH format and resource in one uplink subframe, wherein more than one serving cell is configured for the UE and the more than one serving cell includes one Primary Cell (PCell) and at least one Secondary Cell (SCell), and the ACK/NACK information is transmitted using a PUCCH format 1a/1b, when one Physical Downlink Shared Channel (PDSCH) in which a corresponding Physical Downlink Control Channel (PDCCH) is not detected is present in the downlink subframe set only on the PCell and a Semi-Persistent Scheduling (SPS) release PDCCH is not present in the downlink subframe set.

In another aspect of the present invention, provided herein is a User Equipment (UE) for transmitting Acknowledgement/Negative Acknowledgement (ACK/NACK) information in a wireless communication system, including a reception module for receiving a downlink signal from a Base Station (BS); a transmission module for transmitting an uplink signal to the BS; and a processor for controlling the UE including the reception module and the transmission module, wherein the processor is configured to determine a Physical Uplink Control Channel (PUCCH) format and resource through which ACK/NACK information for downlink transmission received through the reception module in a downlink frame set including M (M≥1) downlink subframes is to be transmitted and to transmit the ACK/NACK information using the PUCCH format and resource in one uplink subframe through the transmission module, and wherein more than one serving cell is configured for the UE and the more than one serving cell includes one Primary Cell (PCell) and at least one Secondary Cell (SCell), and the ACK/NACK information is transmitted using a PUCCH format 1a/1b, when one Physical Downlink Shared Channel (PDSCH) in which a corresponding Physical Downlink Control Channel (PDCCH) is not detected is present in the downlink subframe set only on the PCell and a Semi-Persistent Scheduling (SPS) release PDCCH is not present in the downlink subframe set.

The following may be commonly applied to the above embodiments of the present invention.

A resource index of the PUCCH format 1a/1b may be determined by a value of a Transmit Power Control (TPC) field of a PDCCH indicating SPS activation for one PDSCH in which the corresponding PDCCH is not detected.

The ACK/NACK information may be transmitted by channel selection using a PUCCH format 1b, when M is greater than 1, one PDSCH in which the corresponding PDCCH is not detected is present in the downlink subframe set only on the PCell, a PDSCH indicated by detection of the corresponding PDCCH in the downlink subframe set is present in the downlink subframe set only on the PCell, and a Downlink Assignment Index (DAI) value of the detected PDCCH is 1.

The channel selection may be performed by selecting one PUCCH resource from among A (where A is 2 or 3) PUCCH resources.

The A may be determined based on the number of transport blocks of the downlink transmission.

One of the A PUCCH resources may be determined by a value of a TPC field of a PDCCH indicating SPS activation for the one PDSCH in which the corresponding PDCCH is not detected, and the other resources of the A PUCCH resources may be derived from a Control Channel Element (CCE) index of the detected PDCCH.

A TPC field of a PDCCH with a DAI value being 1 on the PCell may indicate uplink TPC information, a TPC field of a PDCCH with a DAI value being greater than 1 on the PCell may be used for determination of a resource index of a PUCCH format 3, and a TPC field of a PDCCH on each of the at least one SCell may be used for determination of the resource index of the PUCCH format 3.

The UE may assume that the same PUCCH resource index value is transmitted in all PDCCHs on the PCell and the at least one SCell used for determination of the resource index of the PUCCH format 3 in the downlink subframe set.

The wireless communication system may be a Time Division Duplex (TDD) wireless communication system.

The above overall description and a later detailed description of the present invention are purely exemplary and given as an additional description of the present invention determined by the appended claims.

According to the present invention, control information can be efficiently transmitted in a wireless communication system. Further, a channel format and a signal processing method for efficiently transmitting control information are provided. Furthermore, resources for control information transmission can be efficiently allocated.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 35 is a diagram illustrating examples for determining DAI values in a CA TDD system;

DETAILED DESCRIPTION OF THE INVENTION

Figure 1:
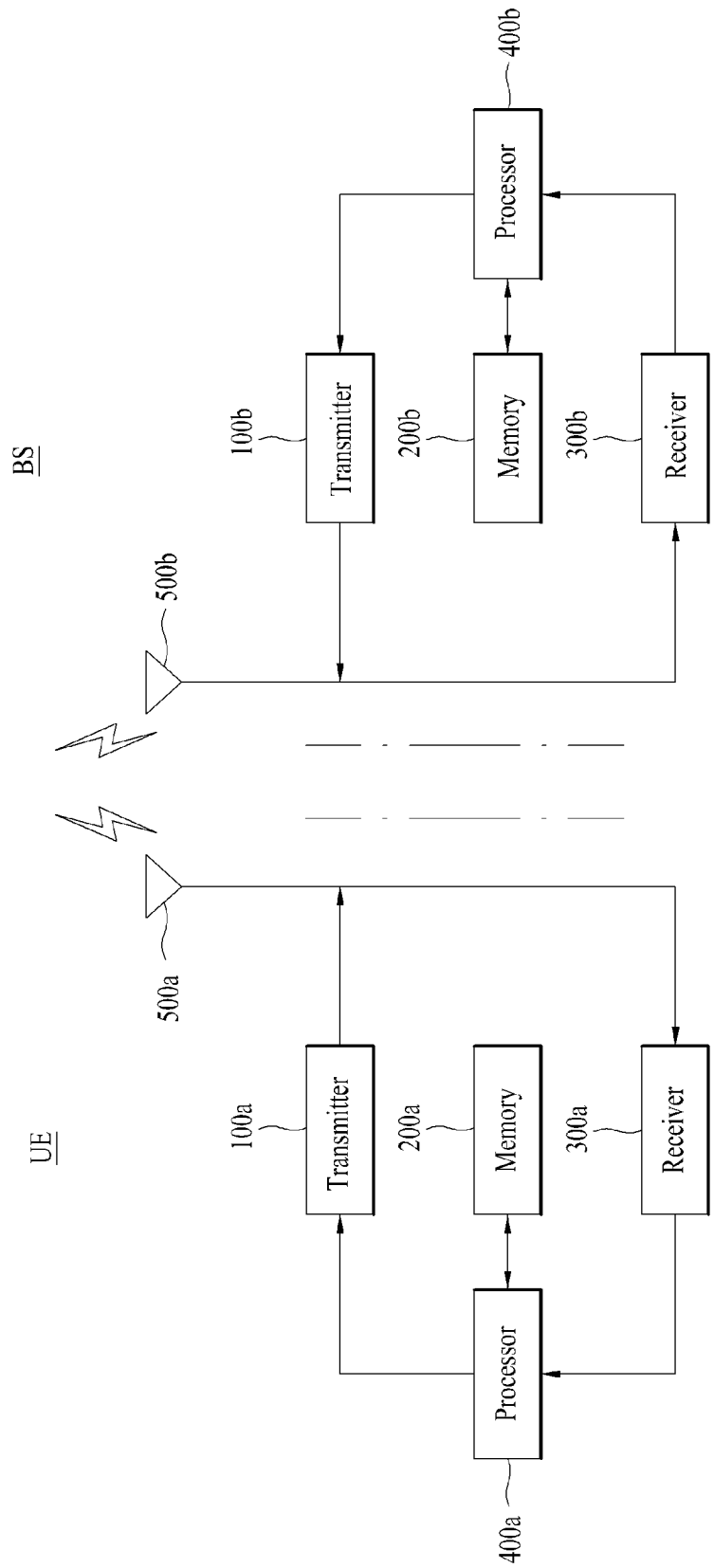
FIG. 1 is a block diagram illustrating constituent elements of a UE and a BS performing the present invention.

The embodiments of the present invention described hereinbelow are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given of a data transmission and reception relationship between a Base Station (BS) and a terminal. Here, the BS refers to a terminal node of a network communicating directly with the terminal. In some cases, a specific operation described as being performed by the BS may be performed by an upper node of the BS.

In other words, it is apparent that, in a network comprised of a plurality of network nodes including the BS, various operations performed for communication with a terminal may be performed by the BS, or network nodes other than the BS. The term 'BS' may be replaced with terms such as fixed station, Node B, eNode B (eNB), Access Point (AP), etc. Also, in the present document, the term BS may be used as a concept including a cell or a sector. Meanwhile, 'relay' may be replaced with terms such as Relay Node (RN), Relay Station (RS), etc. The term 'terminal' may be replaced with terms such as User Equipment (UE), Mobile Station (MS), Mobile Subscriber Station (MSS), Subscriber Station (SS), etc.

Specific terms disclosed in the present invention are proposed to aid in understanding the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

The embodiments of the present invention can be supported by standard documents disclosed in at least one of wireless access systems including an Institute of Electrical and Electronics Engineers (IEEE) 802 system, a $3^{rd}$ Generation Partnership Project (3GPP) system, a 3GPP Long Term Evolution (LTE) system, a 3GPP LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by the above-mentioned documents.

The following technique can be used for a variety of radio access systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of the Universal Mobile Telecommunications System (UMTS). 3GPP LTE is a part of Evolved UMTS (E-UMTS) using E-UTRA. 3GPP LTE employs OFDMA in downlink and employs SC-FDMA in uplink. LTE-A is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, technical features of the present invention are not limited thereto.

FIG. 1 is a block diagram illustrating constituent elements of a UE and a BS performing the present invention.

The UE operates as a transmitter on uplink and as a receiver on downlink. On the contrary, the BS operates as a receiver on uplink and as a transmitter on downlink.

The UE and the BS include antennas $500a$ and $500b$ for receiving information, data, signals, and/or messages, transmitters $100a$ and $100b$ for transmitting messages by controlling the antennas, receivers $300a$ and $300b$ for receiving messages by controlling the antennas, and memories $200a$ and $200b$ for storing various types of information related to communication in a wireless communication system. The UE and the BS further include processors $400a$ and $400b$ connected operationally to constitute elements of the transmitters, the receivers, and the memories included in the UE or BS, for performing the present invention by controlling the constituent elements. The transmitter $100a$, the receiver $300a$, the memory $200a$, and the processor $400a$ of the UE may be configured as independent components by separate chips or two or more thereof may be integrated into one chip. The transmitter $100b$, the receiver $300b$, the memory $200b$, and the processor $400b$ of the BS may be configured as independent components by separate chips or two or more thereof may be integrated into one chip. The transmitter and the receiver may be integrated into a single transceiver in the UE or the BS.

The antennas $500a$ and $500b$ transmit signals generated from the transmitters $100a$ and $100b$ to the outside or receive signals from the outside and provide the received signals to the receivers $300a$ and $300b$. The antennas $500a$ and $500b$ are also referred to as antenna ports. Each antenna port may correspond to one physical antenna or may be configured by a combination of more than one physical antenna element. A signal transmitted through each antenna port cannot be decomposed any more by the receiving device 20. A Reference Signal (RS) transmitted in correspondence to the antenna port defines an antenna port viewed from the UE and enables the UE to perform channel estimation for the antenna port, irrespective of whether a channel is a single radio channel from one physical channel or composite channels from a plurality of physical antenna elements including the antenna port. That is, an antenna port is defined such that a channel for transmitting a symbol on the antenna port can be derived from the channel through which another symbol on the same antenna port is transmitted. If a transmitter and a receiver support Multiple Input Multiple Output (MIMO) in which data is transmitted and received using a plurality of antennas, each of the transmitter and the receiver may be connected to two or more antennas.

The processor $400a$ or $400b$ generally controls overall operation of the modules of the UE or the BS. Especially, the processors $400a$ and $400b$ may perform various control functions for implementing the present invention, a Medium Access Control (MAC) frame conversion control function based on service characteristics and a propagation environment, a power saving mode function for controlling an idle-mode operation, a handover function, an authentication and encryption function, etc. The processors $400a$ and $400b$ may be called controllers, microcontrollers, microprocessors, or microcomputers. Meanwhile, the processors $400a$ and 400*b* may be configured as hardware, firmware, software, or a combination of hardware, firmware, and software. In a hardware configuration, the processors 400*a* and 400*b* may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention. In a firmware or software configuration, firmware or software may be configured so as to include a module, a procedure, a function, etc. that perform the functions or operations of the present invention. The firmware or software configured to implement the present invention may be included in the processors 400*a* and 400*b*, or may be stored in the memories 200*a* and 200*b* and executed by the processors 400*a* and 400*b*.

The transmitters 100*a* and 100*b* encode and modulate signals and/or data which are scheduled by the processors 400*a* and 400*b* or by schedulers connected to the processors and which are transmitted to the outside and transmit the modulated signals and/or data to the antennas 500*a* and 500*b*. For example, the transmitters 100*a* and 100*b* convert data streams to be transmitted into K layers through demultiplexing, channel coding, and modulation. The K layers are transmitted through the antennas 500*a* and 500*b* via transmission processors of the transmitters. The transmitters 100*a* and 100*b* and the receivers 300*a* and 300*b* of the UE and the BS may be configured differently according to operations of processing a transmission signal and a received signal.

The memories 200*a* and 200*b* may store programs for processing and control in the processors 400*a* and 400*b* and may temporarily store input and output information. The memories 200*a* and 200*b* may function as buffers. The memories 200*a* and 200*b* may be configured using a flash memory type, a hard disk type, a multimedia card micro type, a card type memory (e.g., a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disc, etc.

Figure 2:
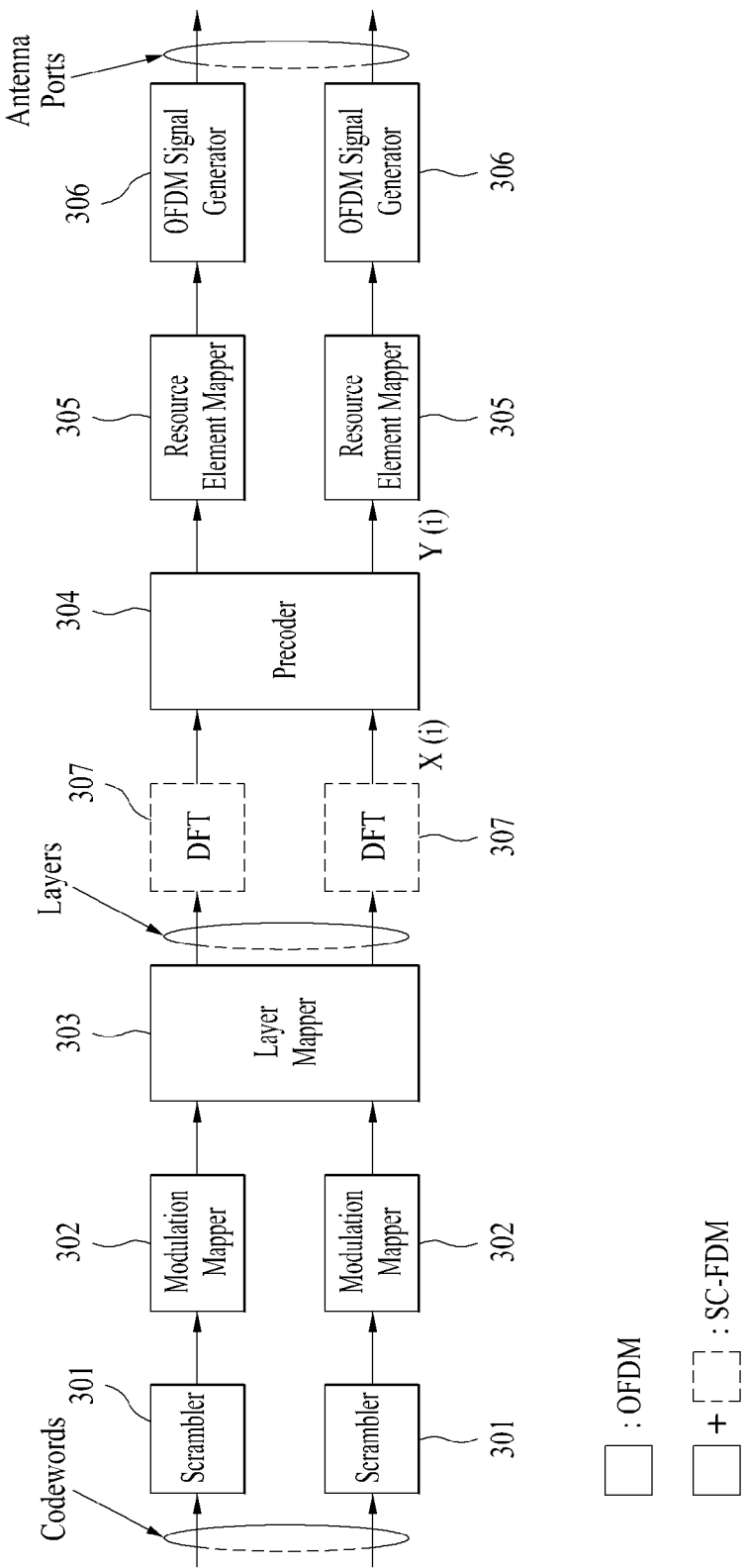
FIG. 2 illustrates an exemplary structure of a transmitter in each of a UE and a BS.

FIG. 2 illustrates an exemplary structure of a transmitter in each of the UE and the BS. Operations of the transmitters 100*a* and 100*b* will be described below in more detail with reference to FIG. 2.

Referring to FIG. 2, each of the transmitters 100*a* and 100*b* include scramblers 301, modulation mappers 302, a layer mapper 303, a precoder 304, Resource Element (RE) mappers 305, and Orthogonal Frequency Division Multiplexing (OFDM) signal generators 306.

The transmitters 100*a* and 100*b* may transmit more than one codeword. The scramblers 301 scramble the coded bits of each codeword, for transmission on a physical channel. A codeword may be referred to as a data stream and is equivalent to a data block provided from a MAC layer. The data block provided from the MAC layer is referred to as a transport block.

The modulation mappers 302 modulate the scrambled bits into complex-valued modulation symbols. The modulation mappers 302 may modulate the scrambled bits to complex-valued modulation symbols representing positions on signal constellation according to a predetermined modulation scheme. The modulation scheme is not limited and m-Phase Shift Keying (m-PSK) and m-Quadrature Amplitude Modulation (m-QAM) may be used to modulate the coded data.

The layer mapper 303 maps the complex-valued modulation symbols to one or several transmission layers.

The precoder 304 may precode the complex modulation symbols on each layer, for transmission through the antenna ports. More specifically, the precoder 304 generates antenna-specific symbols by processing the complex-valued modulation symbols for multiple transmission antennas 500-1 to 500-$N_t$ in a MIMO scheme and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z.

The RE mappers 305 map/allocate the complex-valued modulation symbols for the respective antenna ports to REs. The RE mappers 305 may allocate the complex-valued modulation symbols for the respective antenna ports to appropriate subcarriers and may multiplex the same according to UEs.

The OFDM signal generators 306 modulate the complex-valued modulation symbols for the respective antenna ports, that is, the antenna-specific symbols, through OFDM or Single Carrier Frequency Division Multiplexing (SC-FDM), thereby producing a complex-value time domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time domain symbol. The OFDM symbol is transmitted through the transmission antennas 500-1 to 500-$N_t$ to a receiver after digital-to-analog conversion, frequency up-conversion, etc. The OFDM signal generators 306 may include an IFFT module, a CP inserter, a Digital-to-Analog Converter (DAC), a frequency up-converter, etc.

Meanwhile, if the transmitters 100*a* and 100*b* adopt SC-FDMA for transmission of a codeword, the transmitters 100*a* and 100*b* may include Discrete Fourier Transform (DFT) modules 307 (or Fast Fourier Transform (FFT) modules). The DFT modules perform DFT or FFT on the antenna-specific symbols and outputs the DFT/FFT symbols to the RE mappers 305. SC-FDMA is a transmission scheme for transmitting signals by lowering Peak-to-Average Power Ratio (PAPR) or Cubic Metric (CM) of the signals. According to SC-FDMA, signals can be transmitted without passing through the non-linear distortion area of a power amplifier. Accordingly, even when the transmitter transmits a signal at lower power than power in a conventional OFDM scheme, the receiver can receive a signal satisfying constant intensity and error rate. That is, the power consumption of the transmitter can be reduced by SC-FDMA.

In a conventional OFDM signal generator, signals carried on each subcarrier are simultaneously transmitted in parallel with each other by Multi-Carrier Modulation (MCM) while passing through IFFT, thereby lowering efficiency of a power amplifier. On the other hand, in SC-FDMA, information undergoes DFT/FFT before signals are mapped to subcarriers. Signals passing through the DFT/FFT module 307 have increased PAPR by a DFT/FFT effect. The DFT/FFT-processed signals are mapped to subcarriers, IFFT-processed, and converted into time-domain signals. That is, the SC-FDMA transmitter further performs a DFT or FFT operation prior to the OFDM signal generator so that PAPR of a transmission signal is increased at the IFFT input stage and is finally reduced while passing again through IFFT. This scheme is called DFT-spread OFDM (DFT-s-OFDM) because it seems as if the DFT module (or FFT module) 307 is added before the existing OFDM signal generator.

Figure 3:
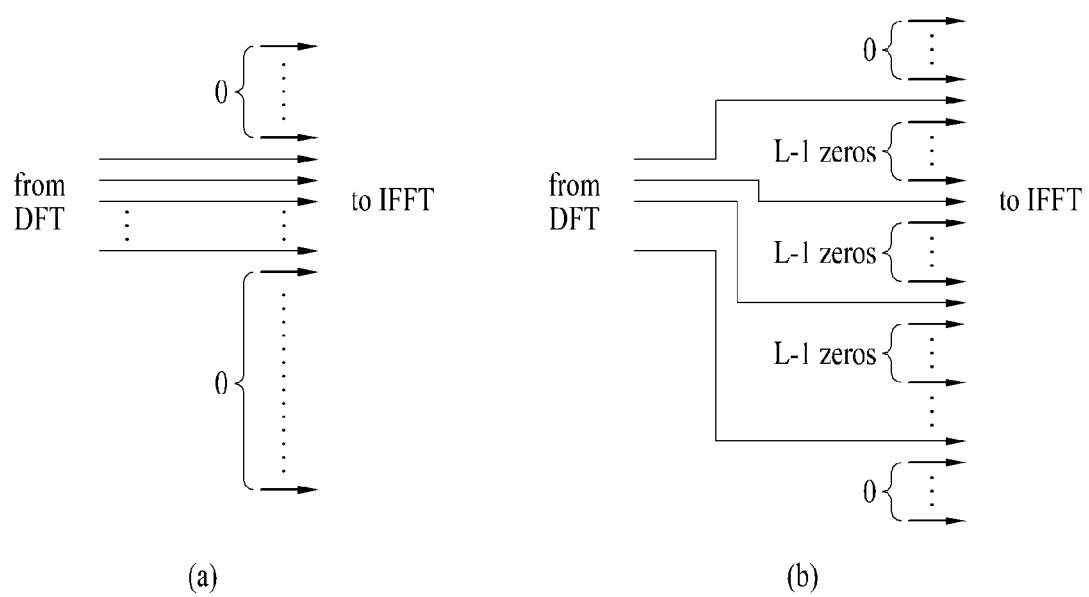
FIG. 3 illustrates examples of mapping input symbols to subcarriers in the frequency domain while satisfying a single-carrier property.

SC-FDMA should satisfy a single-carrier property. FIG. 3, including view (a) and view (b), illustrates examples of mapping input symbols to subcarriers in the frequency domain while satisfying the single-carrier property. If DFT symbols are allocated to subcarriers according to one of the schemes illustrated in FIGS. 3(a) and 3(b), a transmission signal satisfying the single-carrier property may be obtained. FIG. 3(a) illustrates localized mapping and FIG. 3(b) illustrates distributed mapping.

Figure 4:
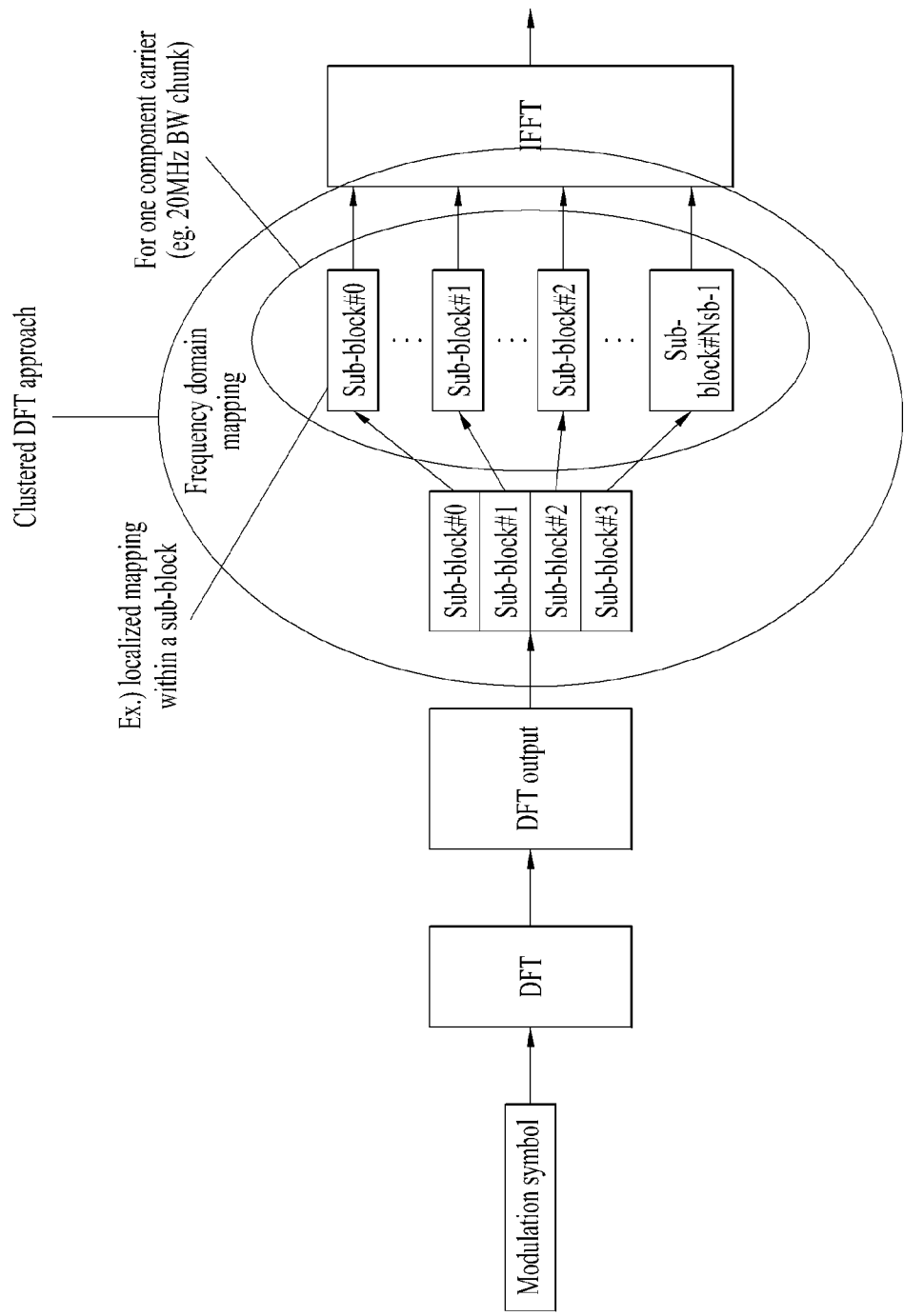
FIGS. 4 to 6 illustrate examples of mapping an input symbol to a single carrier by clustered DFT-s-OFDM.
Figure 5:
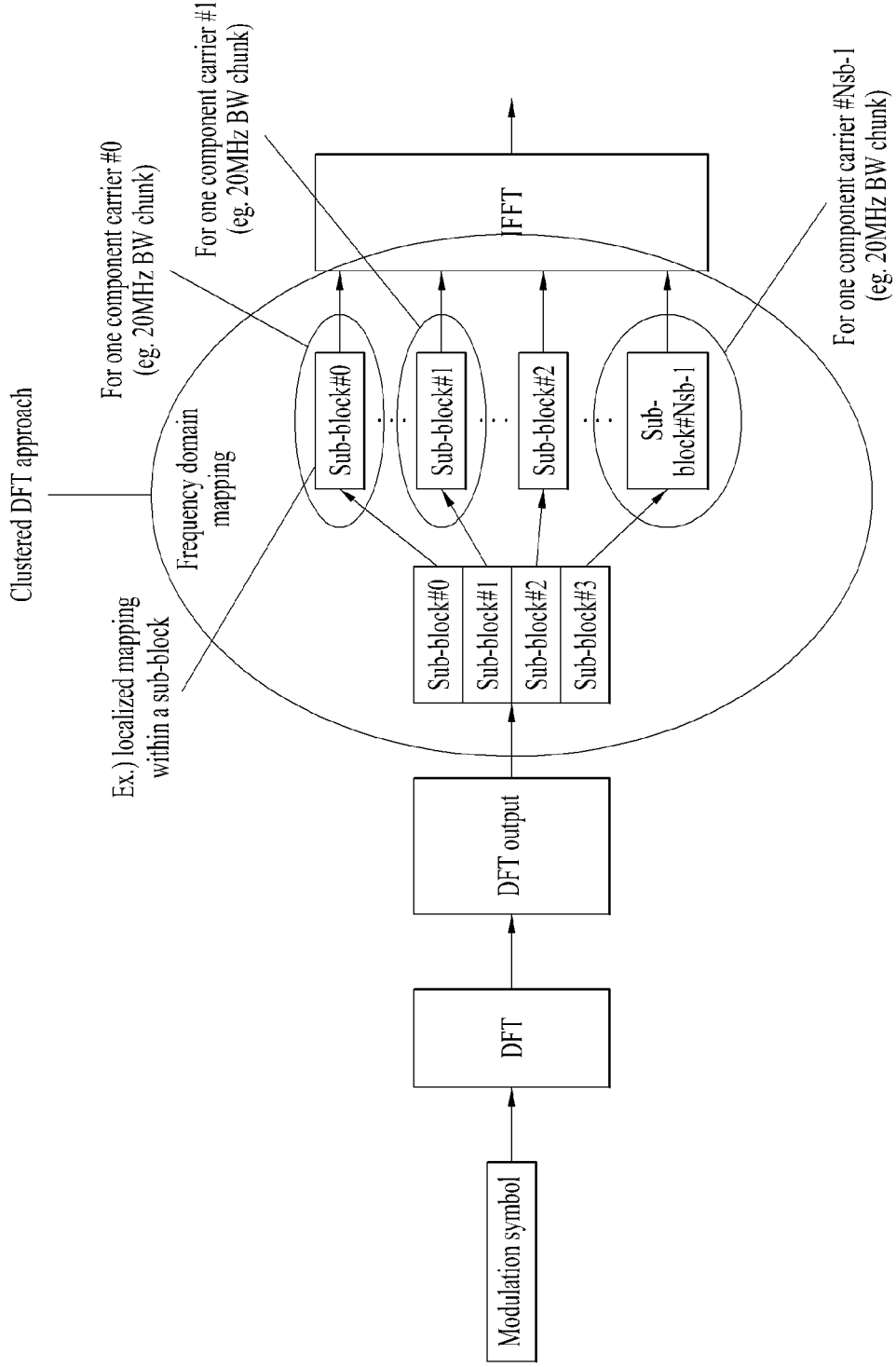
Figure 6:
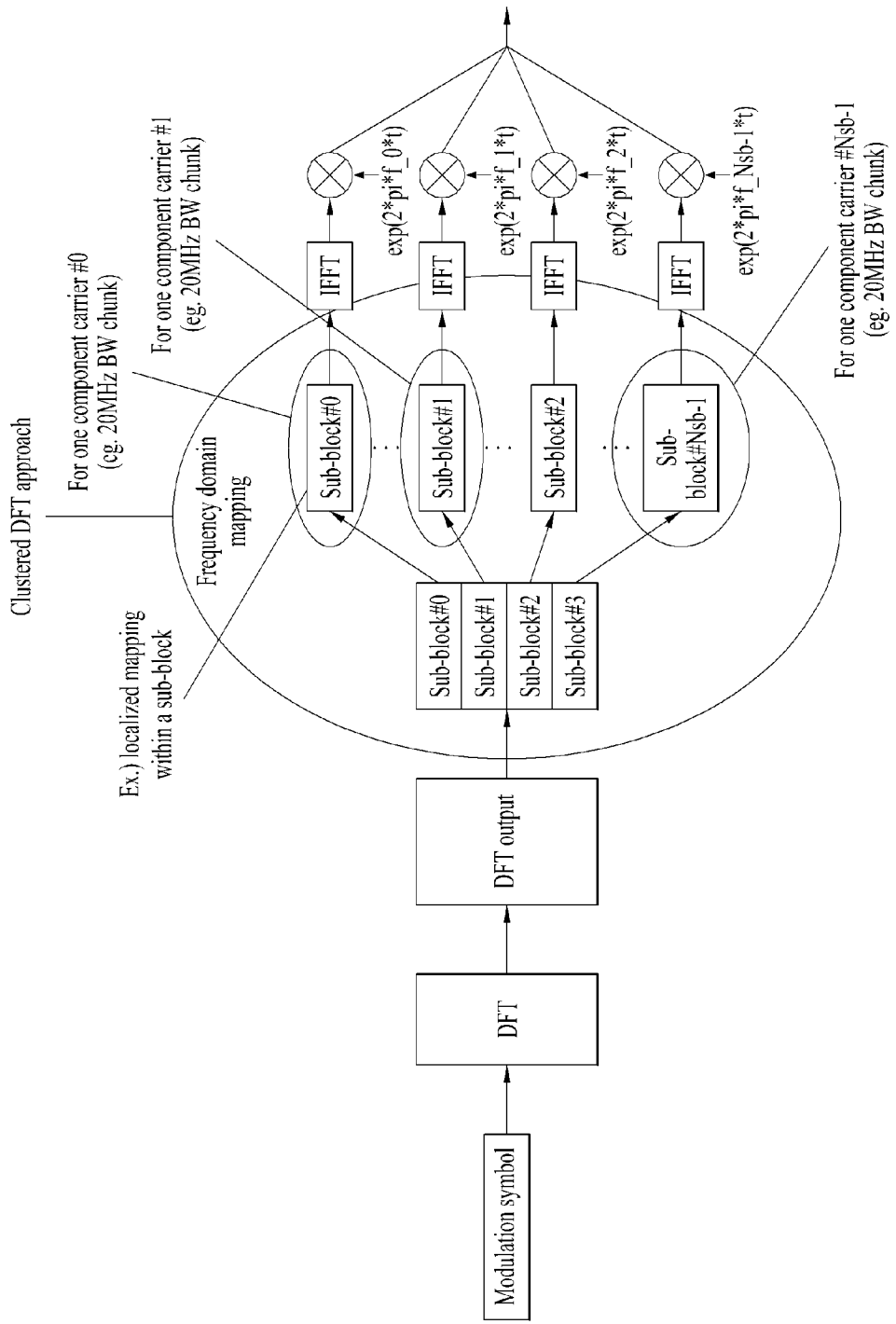

Meanwhile, the transmitters 100a and 100b may adopt clustered DFT-spread-OFDM (DFT-s-OFDM). Clustered DFT-s-OFDM is a modified version of conventional SC-FDMA. In clustered DFT-s-OFDM, a signal passing through the DFT/FFT module 307 and the precoder 304 is divided into a predetermined number of sub-blocks and mapped to subcarriers in a non-contiguous manner. FIGS. 4 to 6 illustrate examples of mapping an input symbol to a single carrier by clustered DFT-s-OFDM.

FIG. 4 illustrates a signal processing operation for mapping DFT processed output samples to a single carrier in clustered SC-FDMA. FIGS. 5 and 6 illustrate signal processing operations for mapping DFT processed output samples to multiple carriers in clustered SC-FDMA. FIG. 4 illustrates the application of intra-carrier clustered SC-FDMA, whereas FIGS. 5 and 6 illustrate the application of inter-carrier clustered SC-FDMA. FIG. 5 illustrates signal generation through a single IFFT block in the case where subcarrier spacings between contiguous component subcarriers are aligned in a situation in which component carriers are contiguously allocated in the frequency domain. FIG. 6 illustrates signal generation through a plurality of IFFT blocks in a situation in which component carriers are non-contiguously allocated in the frequency domain.

Figure 7:
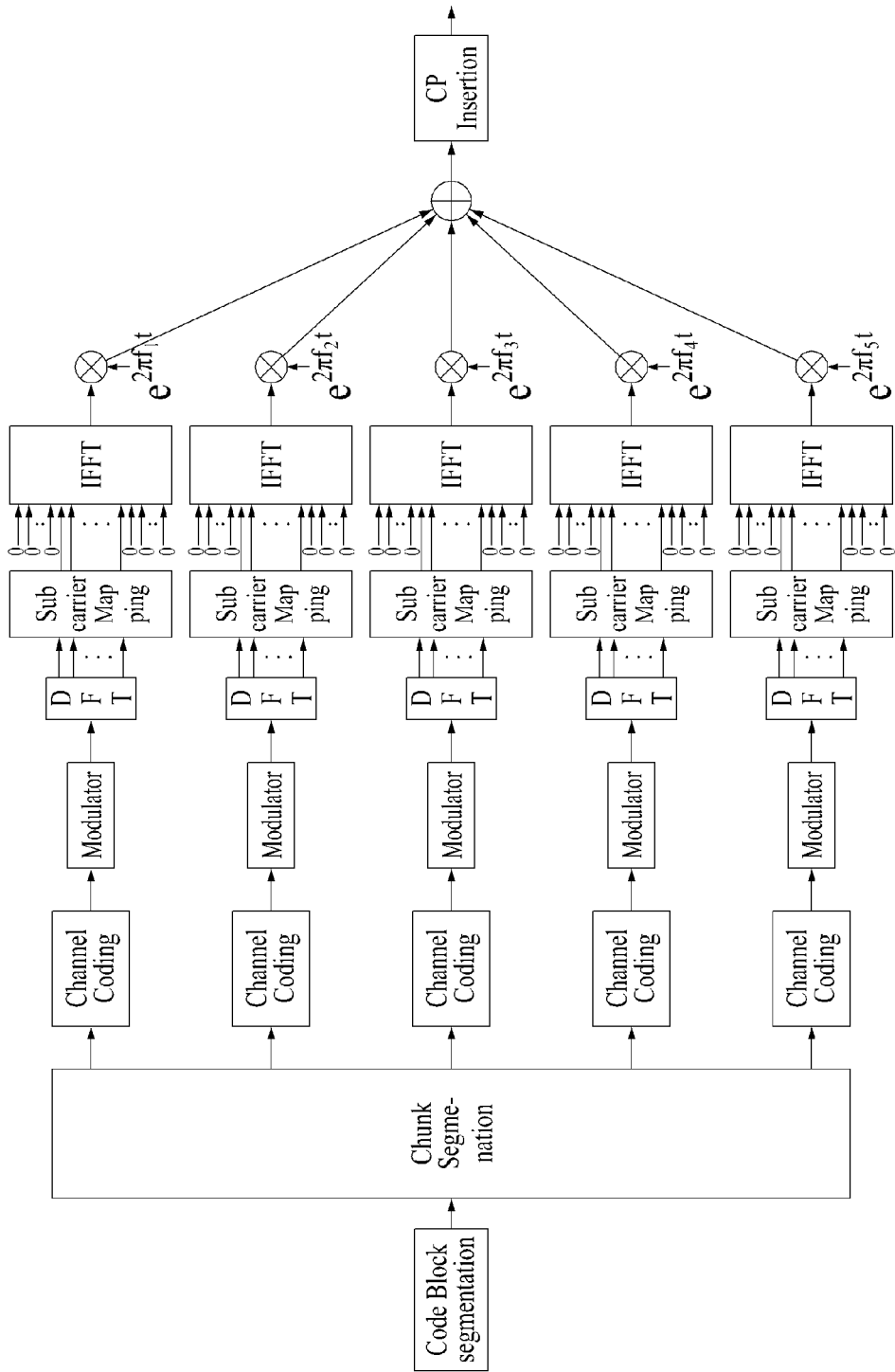
FIG. 7 illustrates a signal processing operation in segmented SC-FDMA.

FIG. 7 illustrates a signal processing operation in segmented SC-FDMA.

As the number of DFT blocks is equal to the number of IFFT blocks and thus the DFT blocks and the IFFT blocks are in one-to-one correspondence, segmented SC-FDMA is a simple extension of the DFT spreading and IFFT subcarrier mapping structure of conventional SC-FDMA and may be expressed as NxSC-FDMA or NxDFT-s-OFDMA. In this disclosure, segmented SC-FDMA includes all these terms. Referring to FIG. 7, in segmented SC-FDMA, all modulation symbols in the time domain are divided into N groups (where N is an integer greater than 1) and subjected to a DFT process in units of a group in order to relieve single-carrier property constraints.

Referring back to FIG. 2, the receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is restored into a baseband signal and then recovered to the original data stream transmitted by the transmitter 100a or 100b through multiplexing and MIMO demodulation. Each of the receivers 300a and 300b may include a signal recoverer for recovering a received signal into a baseband signal, a multiplexer for multiplexing a received and processed signal, and a channel demodulator for demodulating the multiplexed signal stream to a codeword. The signal recoverer, the multiplexer, and the channel demodulator may be configured as an integrated module for performing their functions or independent modules. More specifically, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

Meanwhile, if the receivers 300a and 300b receive signals transmitted by SC-FDMA described with reference to FIGS. 3 to 7, each of the receivers 300a and 300b further includes an IFFT module. The IDFT/IFFT module IDFT/IFFT-processes the antenna-specific symbols recovered by the RE demapper and outputs the IDFT/IFFT symbol to the multiplexer.

While it has been described in FIGS. 1 to 7 that each of the transmitters 100a and 100b includes the scramblers 301, the modulation mappers 302, the layer mapper 303, the precoder 304, the RE mappers 305, and the OFDM signal generators 306, it may be further contemplated that the scramblers 301, the modulation mappers 302, the layer mapper 303, the precoder 304, the RE mappers 305, and the OFDM signal generators 306 are incorporated into each of the processors 400a and 400b of the transmitters 100a and 100b. Likewise, while it has been described in FIGS. 1 to 7 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For convenience of description, the following description will be given on the premise that the scramblers 301, the modulation mappers 302, the layer mapper 303, the precoder 304, the RE mappers 305, and the OFDM signal generators 306 (in case of the SC-FDMA scheme, the DFT modules 307 are further included) are included in the transmitters 100a and 100b configured separately from the processors 400a and 400b that control operations thereof, and the signal recoverer, the multiplexer, and the channel demodulator are included in the receivers 300a and 300b configured separately from the processors 400a and 400b that control operations thereof. However, embodiments of the present invention are applicable in the same manner even though the scramblers 301, the modulation mappers 302, the layer mapper 303, the precoder 304, the RE mappers 305, and the OFDM generators 306 (and 307) are included in the processors 400a and 400b and the signal recoverer, the multiplexer, and the channel demodulator (in case of the SC-FDMA scheme, the IFFT module is further included) are included in the processors 400a and 400b.

Figure 8:
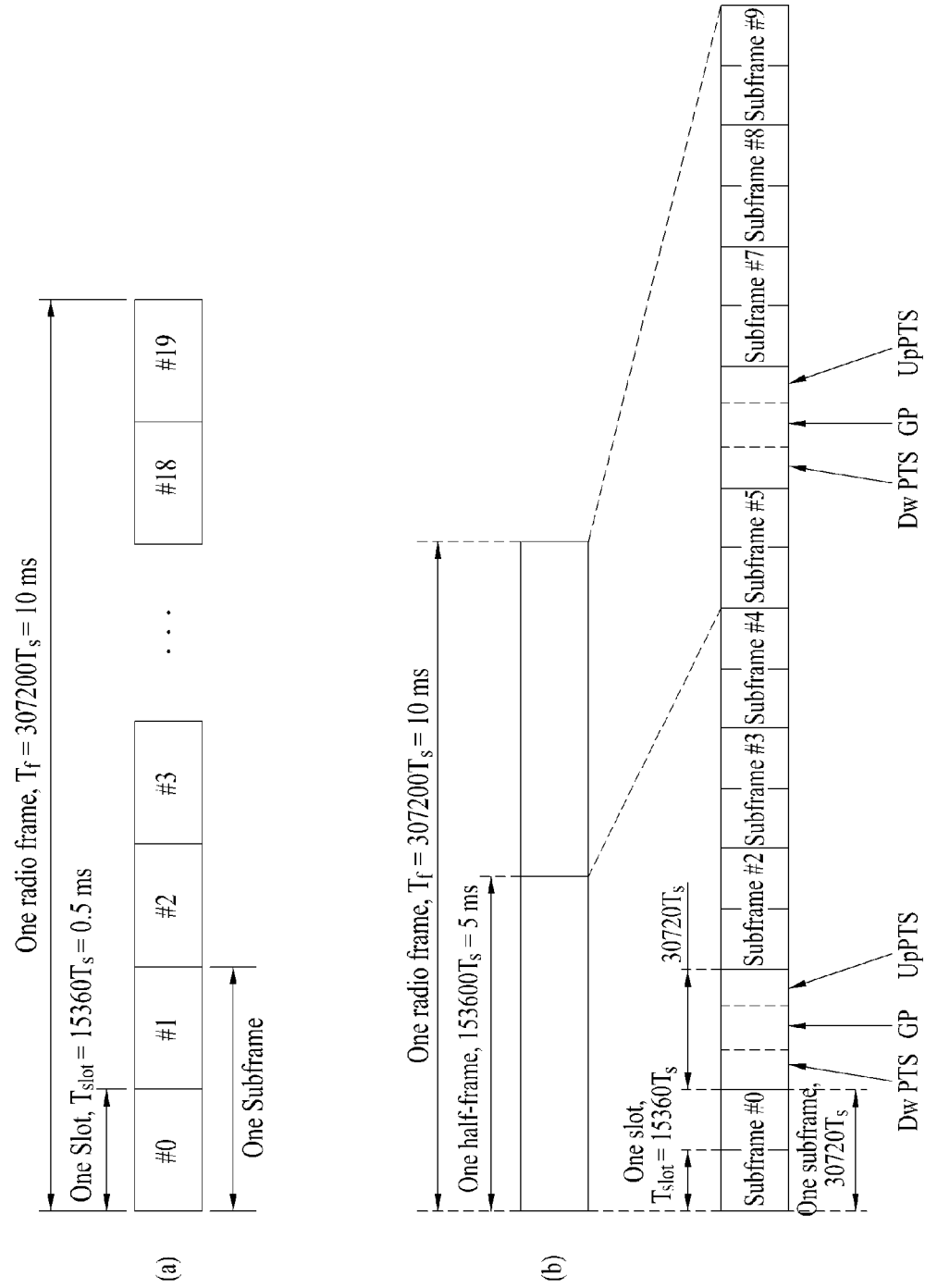
FIG. 8 illustrates exemplary radio frame structures used in a wireless communication system.

FIG. 8, including view (a) and view (b), illustrates exemplary radio frame structures used in a wireless communication system. Specifically, FIG. 8(a) illustrates a radio frame of Frame Structure type 1 (FS-1) in a 3GPP LTE/LTE-A system and FIG. 8(b) illustrates a radio frame of Frame Structure type 2 (FS-2) in the 3GPP LTE/LTE-A system. The frame structure of FIG. 8(a) may be applied to Frequency Division Duplex (FDD) mode and half-FDD (H-FDD) mode, while the frame structure of FIG. 8(b) may be applied to Time Division Duplex (TDD) mode.

Referring to FIG. 8, a radio frame has a length of 10 ms (307200 Ts) in 3GPP LTE/LTE-A, including 10 equally sized subframes. The 10 subframes of the radio frame may be numbered. Herein, $T_s$ is a sampling time, expressed as $T_s=1/(2048\times 15 \text{ kHz})$. Each subframe is 1 ms long, including two slots. The 20 slots of the radio frame may be sequentially numbered from 0 to 19. Each slot has a length of 0.5 ms. A time required to transmit one subframe is defined as a Transmission Time Interval (TTI). Time resources may be identified by a radio frame number (or a radio frame index), a subframe number (or a subframe index), and a slot number (or a slot index).

Different radio frames may be configured according to duplex mode. For example, in FDD mode, since downlink transmission and uplink transmission are distinguished by frequency, the radio frame includes either downlink subframes or uplink subframes.

On the other hand, in TDD mode, since downlink transmission and uplink transmission are distinguished by time, the subframes in the frame are divided into downlink subframes and uplink subframes. Table 1 shows an exemplary uplink-downlink configuration in TDD mode.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D denotes a downlink subframe, U denotes an uplink subframe, and S denotes a special subframe. The special subframe includes three fields of a Downlink Pilot Time Slot (DwPTS), a Guard Period (GP), an Uplink Pilot Time Slot (UpPTS). DwPTS is a time slot reserved for downlink transmission and UpPTS is a time slot reserved for uplink transmission.

Figure 9:
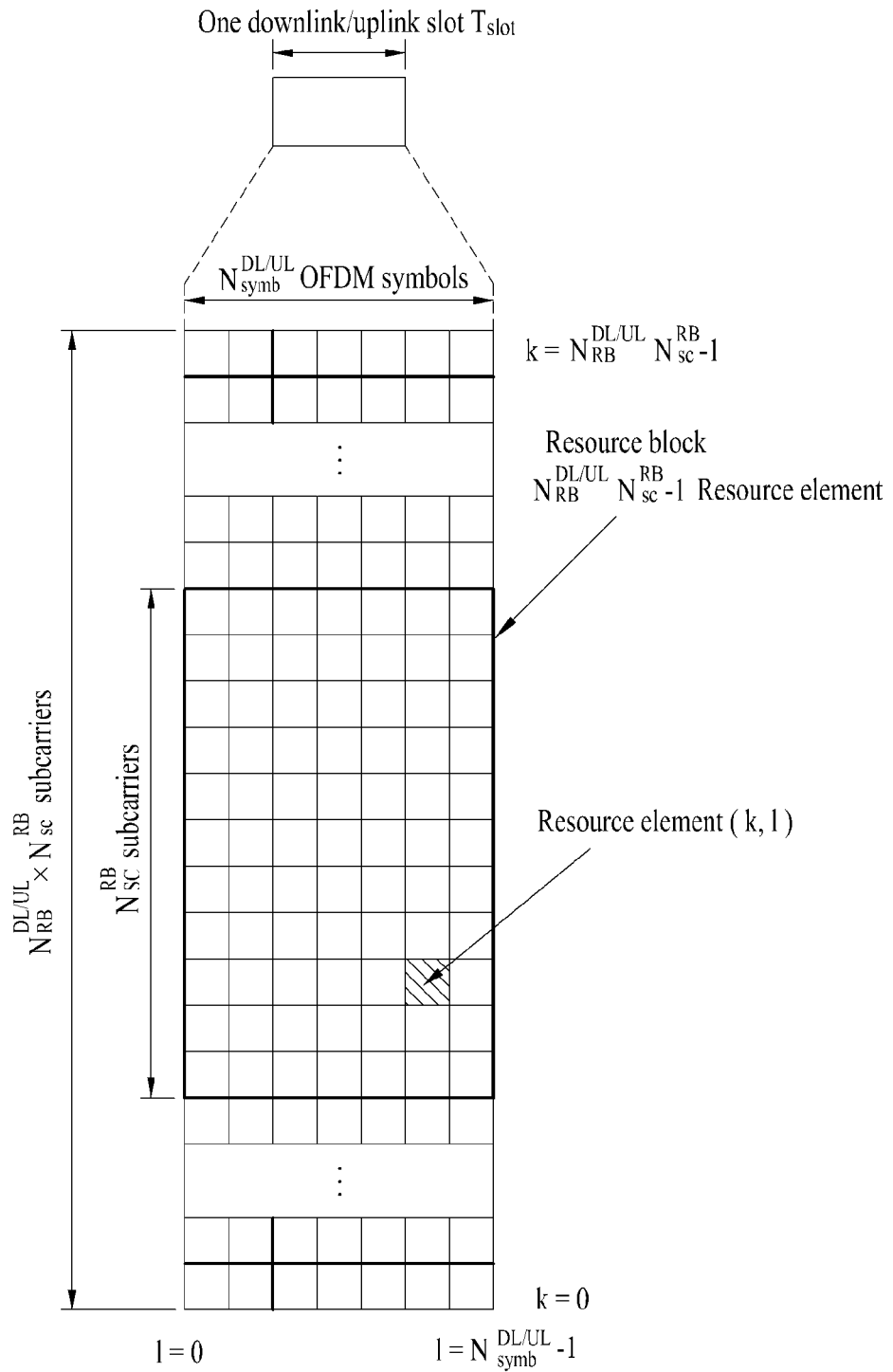
FIG. 9 illustrates an exemplary DL/UL slot structure in a wireless communication system.

FIG. 9 illustrates an exemplary downlink/uplink (DL/UL) slot structure in a wireless communication system. In particular, FIG. 9 illustrates the structure of a resource grid of a 3GPP LTE/LTE-A system. One resource grid exists per antenna port.

Referring to FIG. 9, a slot includes a plurality of Orthogonal Frequency Division Multiplexing (OFDM) symbols in a time domain and includes a plurality of Resource Blocks (RBs) in a frequency domain. The OFDM symbol may mean one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and cyclic Prefix (CP) length. For instance, one slot includes 7 OFDM symbols in case of a normal CP, whereas one slot includes 6 OFDM symbols in case of an extended CP. While a subframe is shown in FIG. 8 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 9, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. Each OFDM symbol includes $N^{DL/UL}_{RB}N^{RB}_{sc}$ subcarriers in the frequency domain. The number of subcarriers in one carrier is determined according to FFT magnitude. The type of the subcarrier may be divided into a data subcarrier for data transmission, an RS subcarrier for RS transmission, and a null subcarrier for a guard band and a DC component. The null subcarrier for the DC component remains unused and is mapped to a carrier frequency $f_0$ in a process of generating an OFDM signal. The carrier frequency is also called a center frequency. $N^{DL}_{symb}$ denotes the number of OFDM or SC-FDMA symbols in a DL slot, $N^{UL}_{symb}$ denotes the number of OFDM or SC-FDMA symbols in a UL slot, and $N^{RB}_{sc}$ denotes the number of subcarriers configuring one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb} \times N^{RB}_{sc}$ REs.

Each RE in the resource grid may be uniquely identified by an index pair (k, l) in a slot. k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 10:
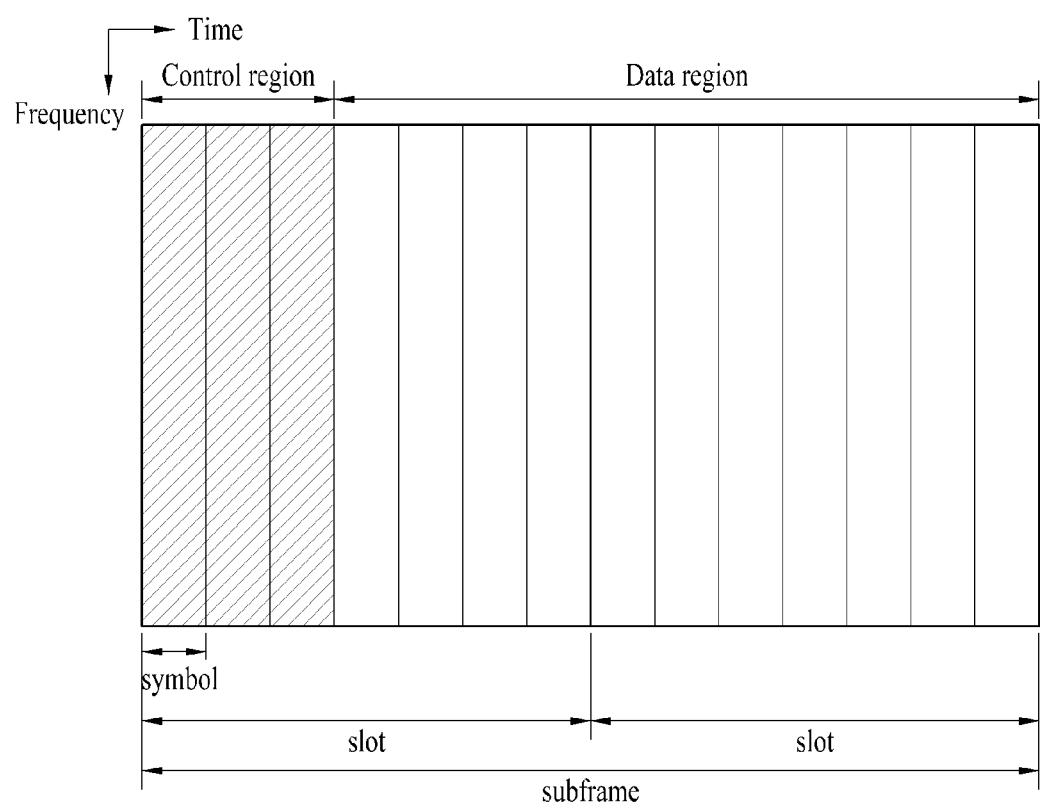
FIG. 10 illustrates an exemplary DL subframe structure in a wireless communication system.

FIG. 10 illustrates an exemplary DL subframe structure in a wireless communication system.

Referring to FIG. 10, each subframe may be divided into a control region and a data region. The control region includes one or more OFDM symbols starting from the first OFDM symbol. The number of OFDM symbols used in the control region in the subframe may be independently configured in each subframe. Information about the number of OFDM symbols is transmitted through a Physical Control Format Indicator Channel (PCFICH). A BS may transmit various control information to a UE(s) through the control region. For control information transmission, a Physical Downlink Control Channel (PDCCH), a PCFICH, and a Physical Hybrid automatic repeat request Indicator Channel (PHICH) may be allocated to the control region.

The BS transmits information associated with resource allocation of a Paging Channel (PCH) and a Downlink-Shared Channel (DL-SCH) which are transport channels, a UL scheduling grant, Hybrid Automatic Repeat Request (HARQ) information, a Downlink Assignment Index (DAI), etc. to each UE or UE group on the PDCCH.

The BS may transmit data for UEs or UE groups through the data region. Data transmitted through the data region is also referred to as user data. For transmission of user data, a Physical Downlink Shared Channel (PDSCH) may be allocated to the data region. The PCH and DL-SCH are transmitted through the PDSCH. The UE may read data transmitted through the PDSCH by decoding control information transmitted through the PDCCH. Information indicating to which UE or UE group PDSCH data is transmitted and information indicating how the UE or UE group should receive and decode the PDSCH data are transmitted over the PDCCH. For example, it is assumed that a specific PDCCH is CRC-masked with a Radio Network Temporary Identity (RNTI) 'A' and information about data transmitted using a radio resource 'B' (e.g., frequency location) and using transport format information 'C' (e.g., transmission block size, modulation scheme, coding information, etc.) is transmitted through a specific subframe. Then, a UE in a cell monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Downlink Control Information (DCI) carried by the PDCCH may be different in size and purpose according to a DCI format and in size according to coding rate.

The DCI format may be independently applied for each UE, and the PDCCHs of multiple UEs may be multiplexed in one subframe. The PDCCH of each UE may be independently channel-coded so that a Cyclic Redundancy Check (CRC) can be added to the PDCCH. The CRC is masked with a unique identifier of each UE so that each UE can receive the PDCCH thereof. However, since the UE is essentially unaware of the position to which the PDCCH thereof is transmitted, the UE is required to perform blind detection (also referred to as blind decoding) on all PDCCHs of the corresponding DCI format in every subframe, until the PDCCH having the identifier thereof is received.

Figure 11:
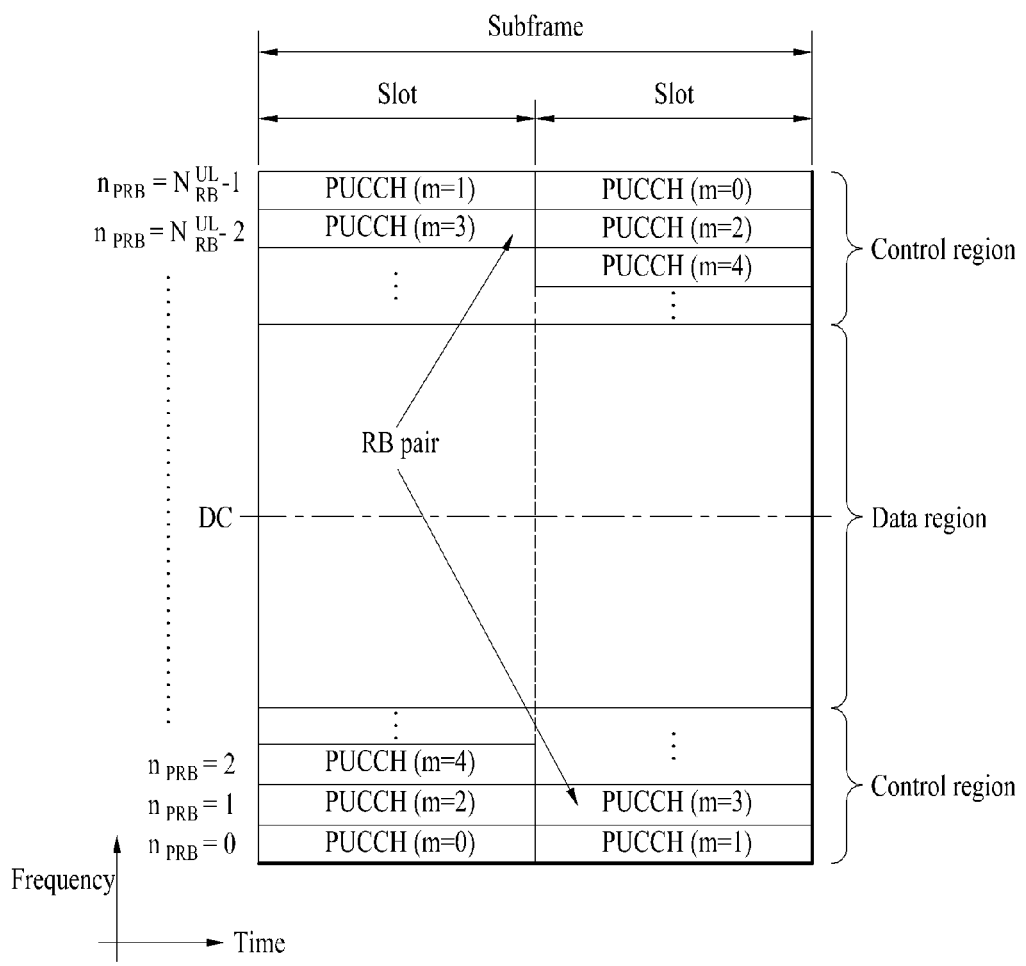
FIG. 11 illustrates an exemplary UL subframe structure in a wireless communication system.

FIG. 11 illustrates an exemplary UL subframe structure in a wireless communication system Referring to FIG. 11, a UL subframe may be divided into a control region and a data region in the frequency domain. One or multiple Physical Uplink Control Channels (PUCCHs) may be allocated to the control region to carry Uplink Control Information (UCI). One or multiple Physical Uplink Shared Channels (PUSCHs) may be allocated to the data region to carry user data. If the UE adopts an SC-FDMA scheme for uplink transmission, the PUCCH and the PUSCH cannot be simultaneously transmitted in order to maintain a single-carrier property.

The UCI carried by the PUCCH may be different in size and purpose according to a PUCCH format and in size according to coding rate. For example, the PUCCH format may be defined as follows.

TABLE 2

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

In a UL subframe, subcarriers distant from a Direct Current (DC) subcarrier are used as the control region. In other words, subcarriers located at both ends of a UL transmission bandwidth are assigned for UL control information transmission. DC subcarriers are reserved without being used in signal transmission and are mapped to a carrier frequency $f_0$ in a frequency up-conversion process caused by the OFDM/SC-FDMA signal generator 306.

A PUCCH for a UE is allocated to an RB pair in a subframe. The RBs of the RB pair occupy different subcarriers in two slots. This is called frequency hopping of an RB pair allocated to a PUCCH over a slot boundary. However, if frequency hopping is not used, an RB pair occupies the same subcarriers. Irrespective of the frequency hopping, a PUCCH for one UE is assigned to an RB pair in one subframe and therefore the same PUCCH is transmitted once through one RB in each slot, a total of two times, in one UL subframe.

Hereinafter, an RB pair used for each PUCCH transmission of one subframe is called a PUCCH region or a PUCCH resource. In addition, for convenience of description, a PUCCH carrying Acknowledgement/Negative Acknowledgement (ACK/NACK) is referred to as an ACK/NACK PUCCH, a PUCCH carrying Channel Quality Indicator (CQI)/Precoding Matrix Indicator (PMI)/Rank Information (RI) is referred to as a Channel State Information (CSI) PUCCH, and a PUCCH carrying Scheduling Request (SR) is referred to as an SR PUCCH.

The UE is assigned PUCCH resources for UCI transmission from the BS according to the explicit or implicit scheme.

UCI such as ACK/NACK, CQI, PMI, RI, SR, etc. may be transmitted over a control region of the UL subframe.

In a wireless communication system, the BS and the UE mutually transmit/receive signals or data. If the BS/UE transmits data to the UE/BS, the UE/BS decodes the received data. If the data is successfully decoded, ACK is transmitted to the BS/UE. If data decoding fails, NACK is transmitted to the BS/UE. In the 3GPP LTE system, the UE receives a data unit (e.g., PDSCH) from the BS and transmits ACK/NACK to the data unit to the BS through implicit PUCCH resources decided by PDCCH resources carrying scheduling information for the data unit.

Figure 12:
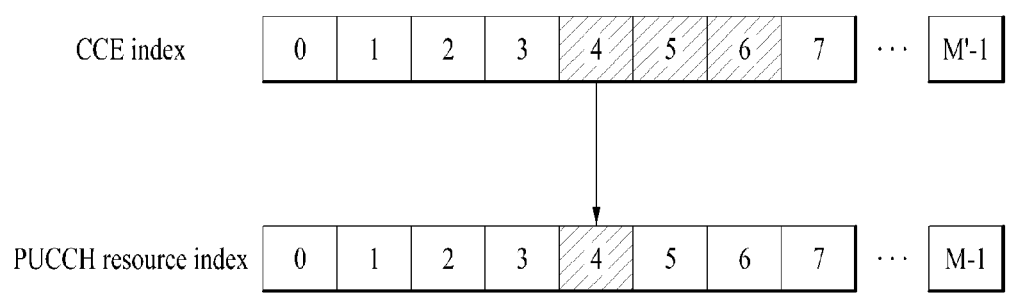
FIG. 12 illustrates an example for determining PUCCH resources for ACK/NACK.

FIG. 12 illustrates an example for determining PUCCH resources for ACK/NACK.

In the LTE system, a PUCCH resource for ACK/NACK is not previously allocated to each UE and multiple UEs located in a cell use a plurality of PUCCH resources in a divided manner at every time point. Specifically, the PUCCH resource used for ACK/NACK transmission of the UE is implicitly determined based on a PDCCH that carries scheduling information of a PDSCH that carries corresponding DL data. An entire region in which a PDCCH is transmitted in a DL subframe includes a plurality of Control Channel Elements (CCEs) and a PDCCH transmitted to the UE includes one or more CCEs. Each CCE includes a plurality of Resource Element Groups (REGs) (e.g., 9 REGs). One REG is comprised of four contiguous REs when a Reference Signal (RS) is excluded. The UE transmits ACK/NACK through an implicit PUCCH resource that is derived or calculated using a function of a specific CCE index (e.g., the first or lowest CCE index) from among indexes of CCEs that constitute the PDCCH received by the UE.

Referring to FIG. 12, each PUCCH resource index corresponds to a PUCCH resource for ACK/NACK. As shown in FIG. 12, assuming that PDSCH scheduling information is transmitted to the UE through a PDCCH consisting of CCEs numbered 4 to 6, the UE transmits ACK/NACK to the BS through a PUCCH derived or calculated from CCE number 4, which is the lowest CCE of the PDCCH, for example, through PUCCH number 4. FIG. 12 shows an example in which up to M' CCEs are present in a DL subframe and up to M PUCCH resources are present in a UL subframe. Although M' may be equal to M, M' may be different from M and CCEs and PUCCH resources may be mapped in an overlapping manner.

For example, a PUCCH resource index may be determined as follows.

$$n_{PUCCH}^{(1)} = n_{CCE} + N_{PUCCH}^{(1)}$$ Equation 1

Here, $n^{(1)}_{PUCCH}$ is a PUCCH resource index for ACK/NACK transmission, $N^{(1)}_{PUCCH}$ is a signaling value received from a higher layer, and $n_{CCE}$ denotes the lowest CCE index used for PDCCH transmission.

Figure 13:
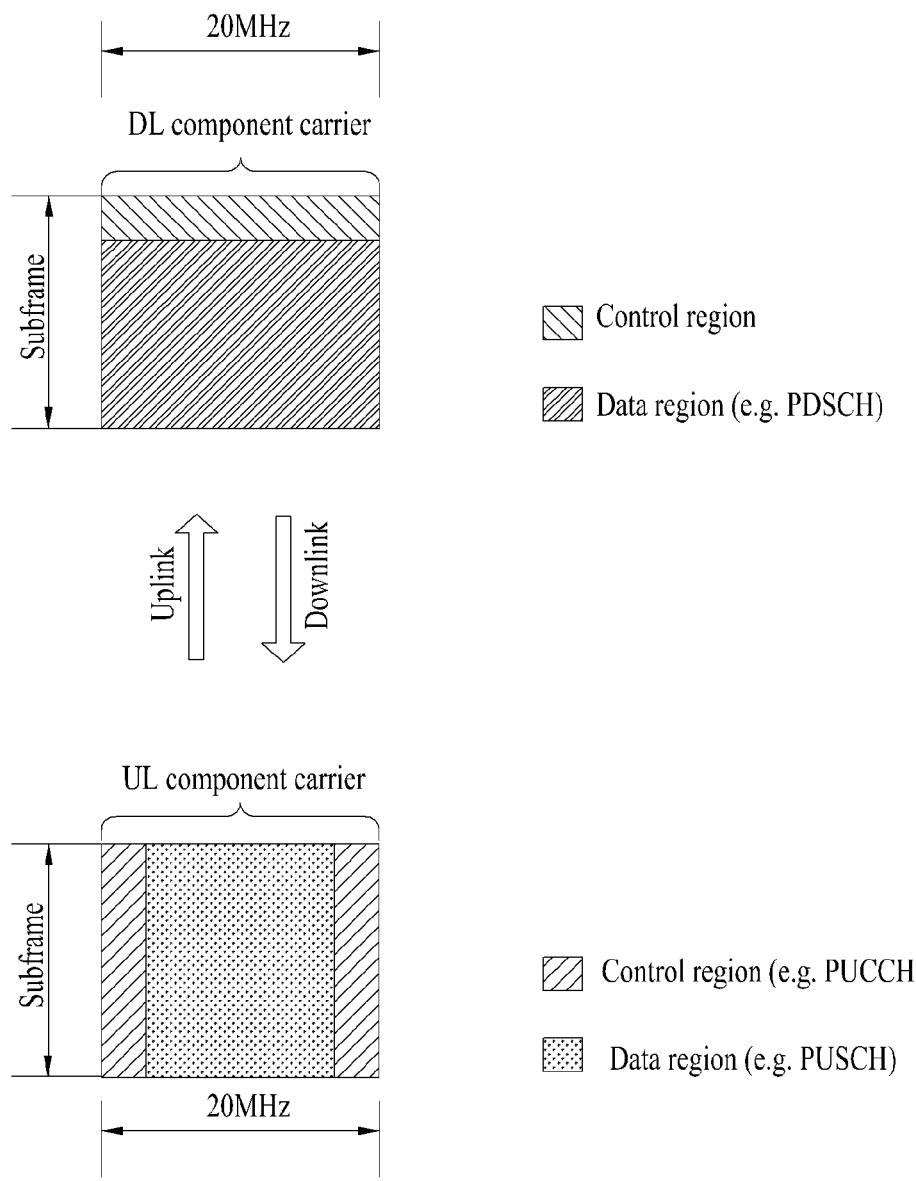
FIG. 13 illustrates exemplary communication in a single-carrier situation.

FIG. 13 illustrates exemplary communication in a single carrier situation. FIG. 13 may correspond to an example of communication in the LTE system.

Referring to FIG. 13, a general FDD wireless communication system transmits and receives data through one DL band and one UL band corresponding to the DL band. A BS and a UE transmit and receive data and/or control information scheduled in a subframe unit. The data is transmitted and received through a data region configured in UL/DL subframes and the control information is transmitted and received through a control region configured in the UL/DL subframes. To this end, the UL/DL subframes carry signals on various physical channels. Although a description of FIG. 13 is given based on an FDD scheme for convenience, the above description may also be applied to a TDD scheme by dividing the radio frame of FIG. 8 into UL and DL frames in the time domain.

Figure 14:
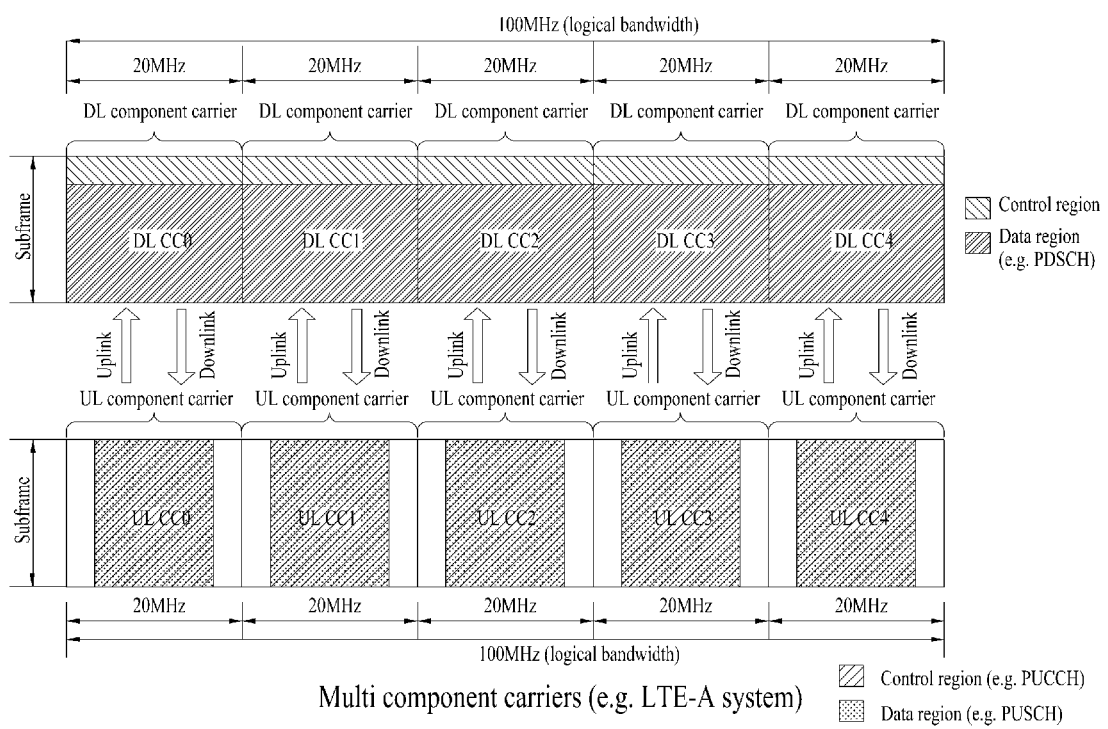
FIG. 14 illustrates exemplary communication in a multi-carrier situation.

FIG. 14 illustrates exemplary communication in a multi-carrier situation.

The LTE-A system uses carrier aggregation or bandwidth aggregation that uses a wider UL/DL bandwidth by aggregating a plurality of UL/DL frequency blocks in order to employ a wider frequency band. A multicarrier system or Carrier Aggregation (CA) system refers to a system aggregating a plurality of carriers each having a narrower bandwidth than a target bandwidth, for broadband support. When a plurality of carriers having a narrower bandwidth than a target bandwidth is aggregated, the bandwidth of the aggregated carriers may be limited to a bandwidth used in a legacy system in order to maintain backward compatibility with the legacy system. For example, an LTE system may support bandwidths of 1.4, 3, 5, 10, 15, and 20 MHz and the LTE-Advanced (LTE-A) system improved from the LTE system may support bandwidths wider than 20 MHz using the bandwidths supported in the LTE system. In addition, a new bandwidth may be defined to support CA irrespective of bandwidth used in the legacy system. The term multicarrier is used interchangeably with the terms CA and bandwidth aggregation. Contiguous CA and non-contiguous CA are collectively referred to as CA. For reference, when only one Component Carrier (CC) is used for communication in TDD, this corresponds to communication in the single carrier situation (non-CA) of FIG. 13. A UL CC and a DL CC are also referred to as UL resources and DL resources, respectively.

For example, referring to FIG. 14, five CCs, each of 20 MHz, may be aggregated on each of UL and DL to support a bandwidth of 100 MHz. The respective CCs may be contiguous or non-contiguous in the frequency domain. For convenience, FIG. 14 shows the case in which the bandwidth of a UL CC is the same as the bandwidth of a DL CC and the two are symmetrical. However, the bandwidth of each CC may be independently determined. For example, the bandwidth of the UL CC may be configured in a manner of 5 MHz (UL CC0)+20 MHz (UL CC1)+20 MHz (UL CC2)+20 MHz (UL CC3)+5 MHz (UL CC4). It is also possible to configure asymmetric CA in which the number of UL CCs is different from the number of DL CCs. Asymmetric CA may be generated due to limitation of available frequency bands or may be intentionally formed by network configuration. For example, even when the BS manages X DL CCs, a frequency band which can be received by a specific UE may be limited to Y (≤X) DL CCs. In this case, the UE needs to monitor DL signals/data transmitted through the Y CCs. In addition, even when the BS manages L UL CCs, a frequency band which can be received by a specific UE may be limited to M (≤L) UL CCs. The limited DL CCs or UL CCs for a specific UE are referred to as serving UL or DL CCs configured in a specific UE. The BS may allocate a prescribed number of CCs to the UE by activating some or all of the CCs managed by the BS or by deactivating some CCs managed by the BS. The BS may change the activated/deactivated CCs and change the number of activated/deactivated CCs. Meanwhile, the BS may cell-specifically or UE-specifically configure Z DL CCs (where 1≤Z≤Y≤X) that the UE should first monitor/receive as main DL CCs. Further, the BS may cell-specifically or UE-specifically configure N UL CCs (where 1≤N≤M≤L) that the UE should first transmit as main UL CCs. In this way, the restricted main DL or UL CCs for a specific UE are also referred to as serving UL or DL CCs configured in a specific UE. Various parameters for CA may be configured cell-specifically, UE group-specifically, or UE-specifically.

Once the BS allocates available CCs to the UE cell-specifically or UE-specifically, at least one of the allocated CCs is not deactivated, unless overall CC allocation to the UE is reconfigured or the UE is handed over. Hereinafter, the CC which is not deactivated unless the overall CC allocation to the UE is reconfigured is referred to as a Primary CC (PCC) and a CC that the BS can freely activate/deactivate is referred to as a Secondary CC (SCC). Single carrier communication uses one PCC for communication between the UE and the BS and does not use the SCC for communication. Meanwhile, the PCC and SCC may also be distinguished based on control information. For example, specific control information may be set to be transmitted/received only through a specific CC. Such a specific CC may be referred to as a PCC and the other CC(s) may be referred to as SCC(s). For instance, control information transmitted through a PUCCH may correspond to such specific control information. Thus, if control information transmitted on the PUCCH can be transmitted to the BS from the UE only through the PCC, a UL CC in which the PUCCH of the UE is present may be referred to as a UL PCC and the other UL CC(s) may be referred to as UL SCC(s). As another example, if a UE-specific CC is used, the specific UE may receive a DL Synchronization Signal (SS) from the BS as specific control information. In this case, a DL CC with which the specific UE establishes synchronization of initial DL time by receiving the DL SS (i.e., a DL CC used for attempting to access a network of the BS) may be referred to as a DL PCC and the other DL CC(s) may be referred to as DL SCC(s). In a communication system according to LTE-A release-10, multicarrier communication uses one PCC and no SCC or one or more SCC(s) per UE. However, this is the definition according to LTE-A and communication using multiple PCCs per UE will be able to be permitted in the future. The PCC may be referred to as a primary CC, an anchor CC, or a primary carrier and the SCC may be referred to as a secondary CC or a secondary carrier.

LTE-A uses the concept of cells to manage radio resources. A cell is defined as a combination of DL resources and UL resources, that is, a DL CC and a UL CC. Here, the UL resources are not an indispensable component. However, this is defined in the current LTE-A standard and, in the future, it may be permitted that a cell is configured using the UL resources alone. Accordingly, the cell can be configured with the DL resources alone, or with both the DL resources and UL resources. When CA is supported, linkage between carrier frequency of the DL resources (or DL CC) and carrier frequency of the UL resources (or UL CC) may be indicated by system information. For example, a combination of the DL resources and the UL resources may be indicated by a System Information Block type 2 (SIB2). Here, the carrier frequency refers to a center frequency of each cell or CC. A cell that operates on a primary frequency (or PCC) may be referred to as a Primary Cell (PCell) and a cell(s) that operates on a secondary frequency (or SCC) may be referred to as a Secondary Cell(s) (SCell(s)). The primary frequency (or PCC) refers to a frequency (or CC) used for the UE to perform an initial connection establishment or connection re-establishment procedure. PCell may refer to a cell indicated during a handover process. The secondary frequency (or SCC) refers to a frequency (or CC) that is configurable after RRC connection setup is performed and is usable to provide additional radio resources. The PCell and SCell may be collectively referred to as a serving cell. Accordingly, for a UE that is in an RRC_CONNECTED state, for which CA is not configured or CA is not supported, only one serving cell comprised of only the PCell is present. Meanwhile, for a UE in an RRC_CONNECTED state, for which CA is configured, one or more serving cells may be present and all serving cells may include one PCell and one or more SCells. However, in the future, it may be permitted that the serving cell includes a plurality of PCells. For CA, a network may configure one or more SCells for a UE that supports CA in addition to the PCell initially configured in the connection establishment procedure after an initial security activation procedure is initiated. However, even if the UE supports CA, the network may configure only the PCell for the UE, without adding the SCells. The PCell may be referred to as a primary CC, an anchor CC, or a primary carrier and the SCell may be referred to as a secondary CC or a secondary carrier.

In a multicarrier system, the BS may transmit a plurality of data units to the UE in a given cell(s) (or CC(s)) and the UE may transmit ACK/NACK signals for the plurality of data units in one subframe. The UE may be allocated one or plural cells (or DL CCs) for receiving a PDSCH for DL data reception. A cell (or DL CC(s)) for the UE may be semi-statically configured or reconfigured by RRC signaling. Moreover, a cell (or DL CC(s)) for the UE may be dynamically activated/deactivated by L1/L2 (Medium Access Control (MAC)) control signaling. Therefore, the maximum number of ACK/NACK bits to be transmitted by the UE varies according to cells (or DL CCs) available to the UE. That is, the maximum number of ACK/NACK bits to be transmitted by the UE is configured/reconfigured by RRC or varies with an activated DL CC (or configured serving cell(s)) by L1/L2 signaling.

Figure 15:
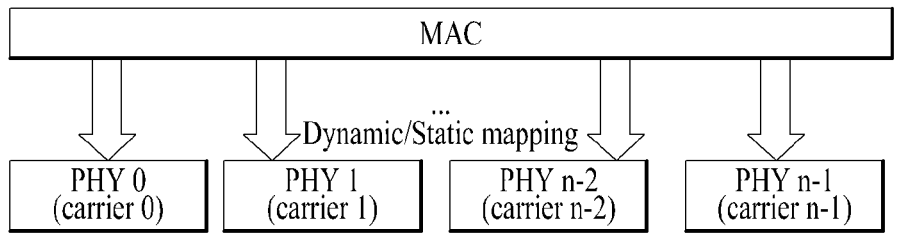
FIG. 15 explains a concept that one MAC layer manages multiple carriers in a BS.
Figure 16:
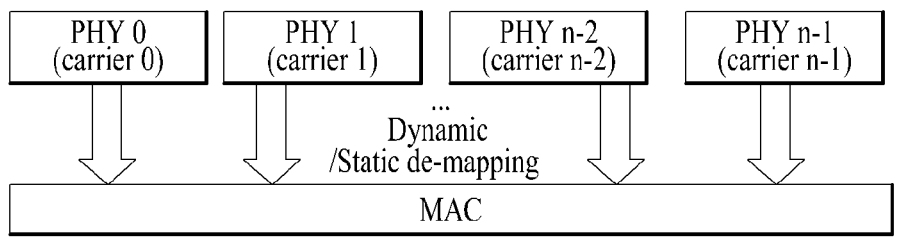
FIG. 16 explains a concept that one MAC layer manages multiple carriers in a UE.

FIG. 15 explains a concept that one MAC layer manages multiple carriers in a BS. FIG. 16 explains a concept that one MAC layer manages multiple carriers in a UE.

Referring to FIG. 15 and FIG. 16, one MAC layer manages one or more frequency carriers so as to perform transmission and reception. Since the frequency carriers managed by one MAC layer need not be contiguous, more flexible resource management is possible. In FIGS. 15 and 16, one physical layer (PHY) means one CC for convenience. Here, one PHY does not necessarily mean an independent Radio Frequency (RF) device. In general, one independent RF device means one PHY but is not limited thereto. One RF device may include several PHYs.

Figure 17:
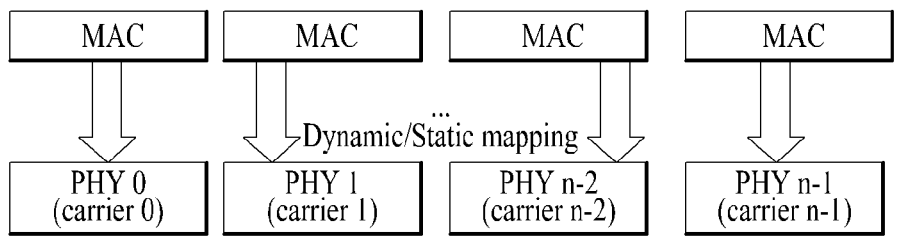
FIG. 17 explains a concept that a plurality of MAC layers manages multiple carriers in a BS.
Figure 18:
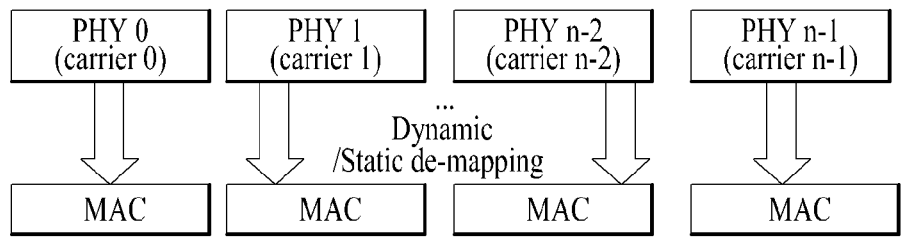
FIG. 18 explains a concept that a plurality of MAC layers manages multiple carriers in a UE.
Figure 19:
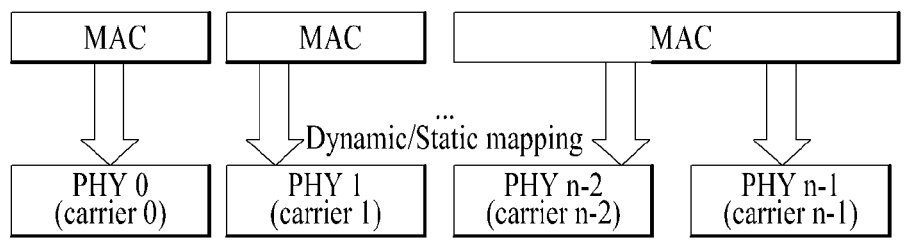
FIG. 19 explains another concept that a plurality of MAC layers manages multiple carriers in a BS.

FIG. 17 explains a concept that a plurality of MAC layers manages multiple carriers in a BS and FIG. 18 explains a concept that a plurality of MAC layers manages multiple carriers in a UE. FIG. 19 explains another concept that a plurality of MAC layers manages multiple carriers in a BS and FIG. 20 explains another concept that a plurality of MAC layers manages multiple carriers in a UE.

In addition to the structures as shown in FIGS. 15 and 16, multiple MAC layers rather than one MAC layer may control a plurality of CCs as shown in FIGS. 17 to 20.

Figure 20:
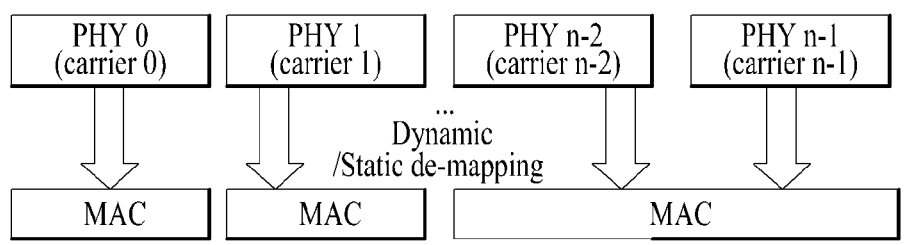
FIG. 20 explains another concept that a plurality of MAC layers manages multiple carriers in a UE

As shown in FIGS. 17 and 18, each MAC layer may control each carrier in one-to-one correspondence. As shown in FIGS. 19 and 20, each MAC layer may control each carrier in one-to-one correspondence with respect to partial carriers and one MAC layer may control one or more carriers with respect to the other carriers.

The system applied to the above description is a system supporting one carrier to N multiple carriers and carriers may be contiguous or non-contiguous carriers, regardless of UL/DL. A TDD system is configured to manage N carriers each including DL and UL transmission and an FDD system is configured to respectively use multiple carriers in UL and DL. The FDD system may support asymmetric CA in which the numbers of aggregated carriers and/or the bandwidths of carriers in UL and DL are different.

If the number of CCs aggregated in UL is equal to the number of CCs aggregated in DL, it is possible to configure CCs such that all CCs are compatible with CCs used in a legacy system. However, CCs that do not support compatibility are not excluded from the present invention.

For convenience of description, although description will be given under the assumption that when a PDCCH is transmitted on a DL CC #0, a PDSCH corresponding to the PDCCH is transmitted on the DL CC #0, it is apparent that cross-carrier scheduling may be applied so that the PDSCH is transmitted on a DL CC different from the DL CC #0.

Figure 21:
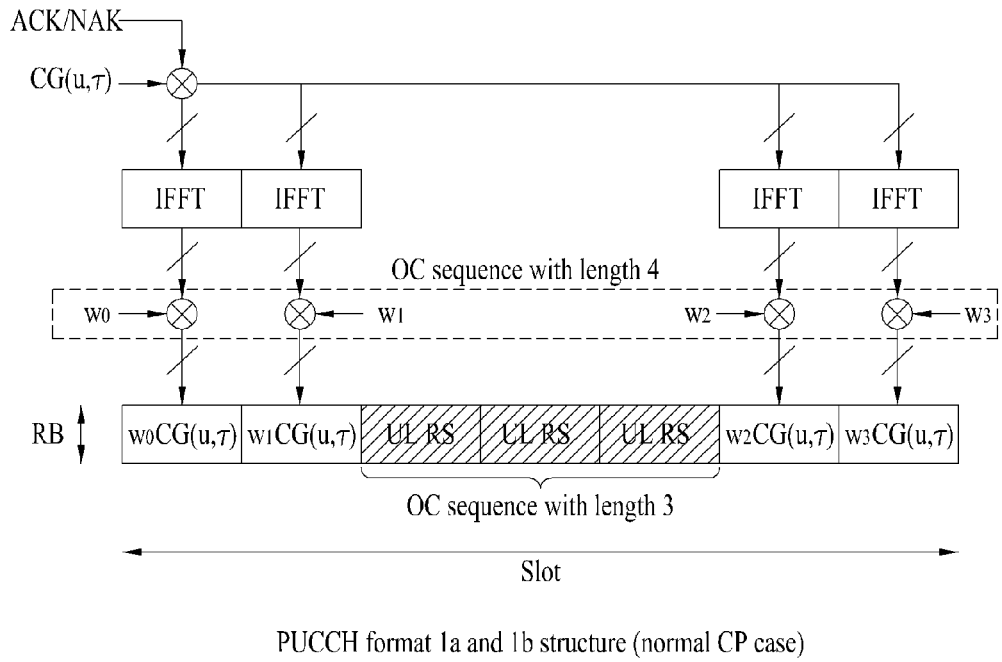
FIGS. 21 and 22 illustrate slot level structures of PUCCH formats 1a and 1b for ACK/NACK transmission.
Figure 22:
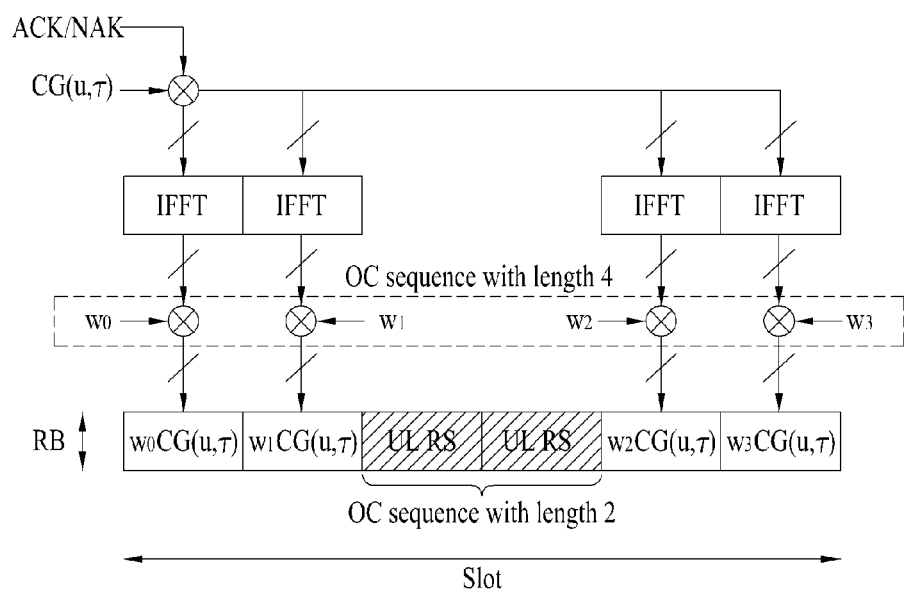

FIGS. 21 and 22 illustrate slot level structures of PUCCH formats 1a and 1b for ACK/NACK transmission.

FIG. 21 illustrates PUCCH formats 1a and 1b in case of normal CP and FIG. 22 illustrates PUCCH formats 1a and 1b in case of extended CP. The same control information is repeated on a slot basis in a subframe in PUCCH formats 1a and 1b. A UE transmits ACK/NACK signals through different resources of different Cyclic Shifts (CSs) (frequency-domain codes) and Orthogonal Cover (OC) or Orthogonal Cover Codec (OCC) (time-domain spreading codec) of a Computer-Generated Constant Amplitude Zero Auto Correlation (CG-CAZAC) sequence. An OC includes, for example, a Walsh/DFT orthogonal code. If the number of CSs is 6 and the number of OCs is 3, a total of 18 UEs may be multiplexed in the same Physical Resource Block (PRB) based on a single antenna. Orthogonal sequences w0, w1, w2, and w3 are applied in an arbitrary time domain (after FFT modulation) or in an arbitrary frequency domain (before FFT modulation). PUCCH format 1 for SR transmission and PUCCH formats 1a and 1b are the same in slot level structure and different in modulation scheme.

PUCCH resources comprised of a CS, an OC, and a PRB may be allocated to a UE by Radio Resource Control (RRC) signaling, for SR transmission and for ACK/NACK feedback for Semi-Persistent Scheduling (SPS). As explained with reference to FIG. 12, for dynamic ACK/NACK (or ACK/NACK for non-persistent scheduling) feedback or ACK/NACK feedback for the PDCCH indicating SPS release, a PUCCH resource may be implicitly allocated to a UE using the lowest CCE index of a PDCCH corresponding to a PDSCH or a PDCCH for SPS release.

Figure 23:
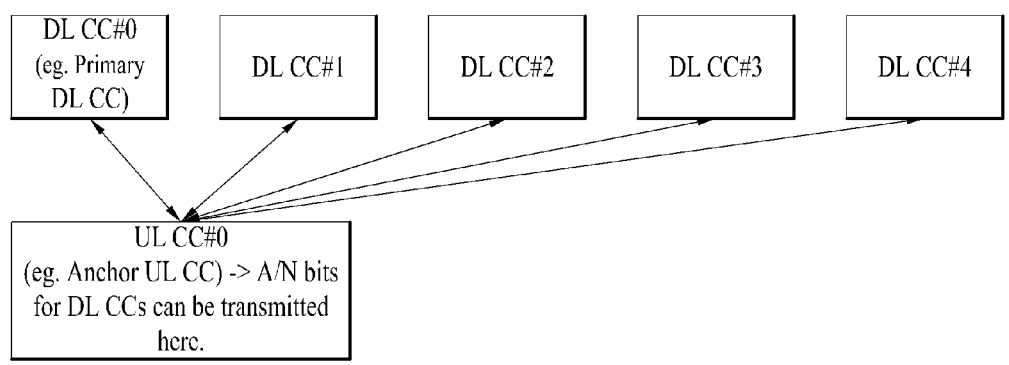
FIG. 23 illustrates a scenario of transmitting UCI in a wireless communication system supporting CA.

FIG. 23 illustrates a scenario of transmitting UCI in a wireless communication system supporting CA. For convenience of description, it is assumed in this example that UCI is ACK/NACK (A/N). However, UCI may include control information such as CSI (e.g., CQI, PMI, and RI) and scheduling request information (e.g., SR), without restriction. FIG. 23 illustrates exemplary asymmetrical CA in which five DL CCs are linked to a single UL CC. This asymmetrical CA may be set from the perspective of transmitting UCI. That is, DL CC-UL CC linkage for UCI may be set to be different from DL CC-UL CC linkage for data. For convenience, if it is assumed that each DL CC can carry up to two codewords and the number of ACKs/NACKs for each CC depends on the maximum number of codewords set per CC (e.g., if a BS sets up to two codewords for a specific CC, even though a specific PDCCH uses only one codeword on the CC, ACKs/NACKs for the CC are set to 2 which is the maximum number of codewords on the CC), at least two UL ACK/NACK bits are needed for each DL CC. In this case, at least 10 ACK/NACK bits are needed to transmit ACKs/NACKs to data received on five DL CCs on a single UL CC. If a Discontinuous Transmission (DTX) state is also to be indicated for each DL CC, at least 12 bits ($=5^6=3125=11.61$ bits) are required for ACK/NACK transmission. Since up to two ACK/NACK bits are available in the conventional PUCCH formats 1a and 1b, this structure cannot transmit increased ACK/NACK information. While CA is given as an example of a cause to increase the amount of UCI, this situation may also occur due to an increase in the number of antennas and existence of a backhaul subframe in a TDD system and a relay system. Similarly to ACK/NACK transmission, the amount of control information to be transmitted is also increased when control information related to a plurality of DL CCs is transmitted on a single UL CC. For example, transmission of CQI/PMI/RI information related to a plurality of DL CCs may increase UCI payload.

In FIG. 23, a UL anchor CC (also referred to as a UL PCC or a UL primary CC) is a CC on which a PUCCH or UCI is transmitted and may be cell-specifically/UE-specifically determined. In addition, a DTX state may be explicitly fed back or may be fed back so as to share the same state as NACK.

Hereinafter, a method for efficiently transmitting increased UCI will be proposed with reference to the drawings. Specifically, a new PUCCH format/signal processing operation/resource allocation method for transmitting increased UCI are proposed. The new PUCCH format proposed by the present invention is referred to as a CA PUCCH format, or PUCCH format 3 relative to PUCCH format 2 defined in legacy LTE Release 8/9. The technical features of the proposed PUCCH format may be easily applied to any physical channel (e.g., a PUSCH) that can deliver UCI in the same manner or in a similar manner. For example, an embodiment of the present invention is applicable to a periodic PUSCH structure for periodically transmitting control information or an aperiodic PUSCH structure for aperiodically transmitting control information.

The following drawings and embodiment of the present invention will be described, focusing on the case of using the UCI/RS symbol structure of PUCCH formats 1/1a/1b (a normal CP) of legacy LTE as a subframe/slot level UCI/RS symbol structure applied to PUCCH format 3. However, the subframe/slot level UCI/RS symbol structure of PUCCH format 3 is exemplarily defined for convenience and the present invention is not limited to such a specific structure. The number and positions of UCI/RS symbols may be changed freely in PUCCH format 3 of the present invention according to system design. For example, PUCCH format 3 according to an embodiment of the present invention may be defined using the RS symbol structure of PUCCH formats 2/2a/2b of legacy LTE.

PUCCH format 3 according to the embodiment of the present invention may be used to transmit UCI of any type or size. For example, information such as HARQ ACK/NACK, a CQI, a PMI, an RI, and an SR may be transmitted in PUCCH format 3 according to the embodiment of the present invention may. This information may have a payload of any size. For convenience of description, the following description will focus on transmission of ACK/NACK information in PUCCH format 3 according to the present invention.

FIGS. 24 to 27 illustrate a PUCCH format structure for feeding back a plurality of ACK/NACK bits and a signal processing operation therefor. For example, the PUCCH format may be used when a plurality ACK/NACK bits is fed back in a multi-carrier environment. Such a PUCCH format may be referred to as PUCCH format 3 to distinguish it from a conventional series of PUCCH formats 1 and 2.

FIGS. 24 to 27 illustrate a DFT-based PUCCH format structure. According to the DFT-based PUCCH structure, a PUCCH is DFT-precoded and a time-domain OC is applied thereto at an SC-FDMA level prior to transmission. Hereinafter, the DFT-based PUCCH format will be referred to as PUCCH format 3.

Figure 24:
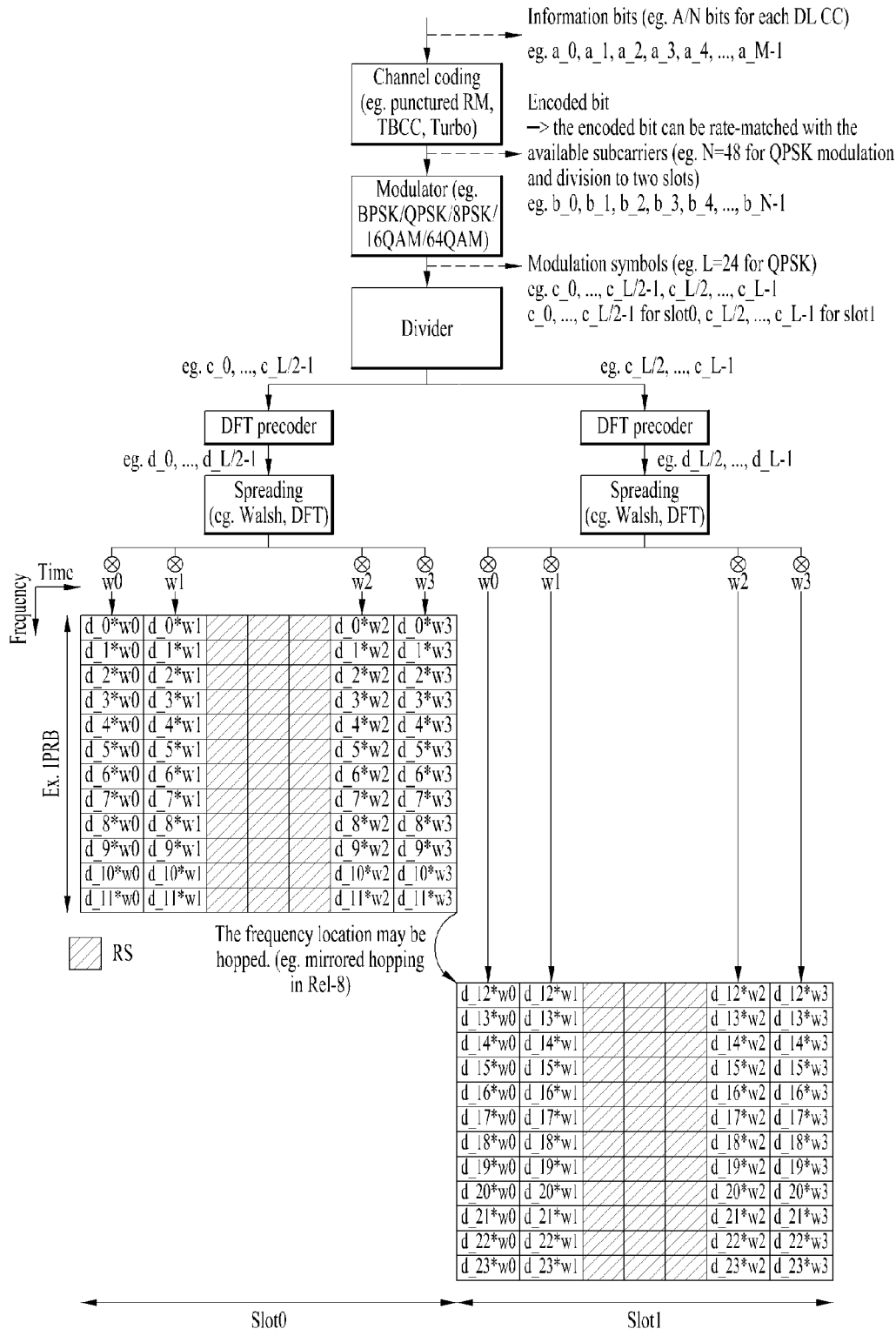
FIGS. 24, 25, 26 and 27 illustrate a PUCCH format structure for feeding back a plurality of ACK/NACK bits and a signal processing operation therefor.

FIG. 24 illustrates an exemplary structure of PUCCH format 3 using an OC of Spreading Factor (SF) of 4 (SF=4). Referring to FIG. 24, a channel coding block channel-encodes information bits $a\_0, a\_1, \ldots, a\_M-1$ (e.g., multiple ACK/NACK bits) and generates coded bits (or a codeword), $b\_0, b\_1, \ldots, b\_N-1$. M is the size of information bits and N is the size of coded bits. The information bits include UCI, for example, multiple ACKs/NACKs to a plurality of data (or PDSCHs) received on a plurality of DL CCs. Herein, the information bits $a\_0, a\_1, \ldots, a\_M-1$ are jointly encoded irrespective of the type/number/size of UCI constituting the information bits. For example, if the information bits include multiple ACKs/NACKs for a plurality of DL CCs, channel coding is performed on the entire bit information, rather than per DL CC or per individual ACK/NACK bit. A single codeword is generated by channel coding. Channel coding includes, but is not limited to, repetition, simplex coding, Reed Muller (RM) coding, punctured RM coding, Tail-Biting Convolutional Coding (TBCC), Low-Density Parity-Check (LDPC) coding, or turbo coding. Although not shown, the coded bits may be rate-matched, in consideration of modulation order and the amount of resources. The rate matching function may be partially incorporated into the channel coding block or implemented in a separate functional block. For example, the channel coding block may obtain a single codeword by performing (32, 0) RM coding with respect to a plurality of control information and may perform cyclic buffer rate-matching.

A modulator generates modulation symbols $c\_0, c\_1, \ldots, c\_L-1$ by modulating the coded bits $b\_0, b\_1, \ldots, b\_M-1$. L is the size of modulation symbols. A modulation scheme is performed by changing the amplitude and phase of a transmission signal. The modulation scheme includes, for example, n-Phase Shift Keying (n-PSK) and n-Quadrature Amplitude Modulation (QAM) (where n is an integer of 2 or more). Specifically, the modulation scheme includes Binary PSK (BPSK), Quadrature PSK (QPSK), 8-PSK, QAM, 16-QAM, or 64-QAM.

A divider divides the modulation symbols $c\_0, c\_1, \ldots, c\_L-1$ into slots. The order/pattern/scheme of dividing modulation symbols into slots is not limited to a specific one. For instance, the divider may divide the modulation symbols into slots, sequentially starting from the first modulation symbol (localized scheme). In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1. When the modulation symbols are divided into slots, the modulation symbols may be interleaved (or permuted). For example, even-numbered modulation symbols may be allocated to slot 0 and odd-numbered modulation symbols may be allocated to slot 1. The modulation process and the division process are interchangeable in order.

A DFT precoder performs DFT precoding (e.g., 12-point DFT) with respect to the modulation symbols divided into the slots in order to generate a single carrier waveform. Referring to FIG. 24, the modulation symbols $c\_0, c\_1, \ldots, c\_L/2-1$ allocated to slot 0 are DFT-precoded to DFT symbols $d\_0, d\_1, \ldots, d\_L/2-1$ and the modulation symbols $c\_L/2, c\_L/2+1, \ldots, c\_L-1$ allocated to slot 1 are DFT-precoded to DFT symbols $d\_L/2, d\_L/2+1, \ldots, d\_L-1$. DFT precoding may be replaced with another linear operation (e.g., Walsh precoding).

A spreading block spreads the DFT-precoded signals at an SC-FDMA symbol level (in the time domain). Time-domain spreading at the SC-FDMA symbol level is performed using a spreading code (sequence). The spreading code includes a quasi-orthogonal code and an orthogonal code. The quasi-orthogonal code includes, but is not limited to, a Pseudo Noise (PN) code. The orthogonal code includes, but is not limited to, a Walsh code and a DFT code. While the orthogonal code is described as a typical example of the spreading code for convenience of description, the orthogonal code may be replaced with the quasi-orthogonal code. The maximum value of a spreading code size or an SF is limited by the number of SC-FDMA symbols used for transmission of control information. For example, if four SC-FDMA symbols are used for control information transmission in one slot, an orthogonal code of length 4, w0, w1, w2, w3 can be used in each slot. The SF means the degree of spreading of control information and may be related to the multiplexing order or antenna multiplexing order of a UE. The SF may be changed to 1, 2, 3, 4, . . . depending on system requirements. The SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g., SF=3 instead of SF=4) may be applied to the control information in a corresponding slot.

A signal generated from the above operation is mapped to subcarriers in a PRB and converted into a time-domain signal by IFFT. A CP is added to the time-domain signal and the generated SC-FDMA symbols are transmitted through an RF end.

Each operation will be described in more detail on the assumption that ACKs/NACKs are transmitted for five DL CCs. If each DL CC can transmit two PDSCHs, ACK/NACK bits for the PDSCHs may be 12 bits, including a DTX state. Under the assumption of QPSK and time spreading of SF=4, the size of a coding block (after rate matching) may be 48 bits. The coded bits are modulated to 24 QPSK symbols and the QPSK symbols are divided into two slots each including 12 QPSK symbols. The 12 QPSK symbols in each slot are converted into 12 DFT symbols by 12-point DFT. The 12 DFT symbols in each slot are spread to four SC-FDMA symbols using a spreading code of SF=4 in the time domain and then mapped. Since 12 bits are transmitted on [2 bits×12 subcarriers×8 SC-FDMA symbols], the coding rate is 0.0625 (=12/192). If SF=4, a maximum of four UEs may be multiplexed per PRB.

Figure 25:
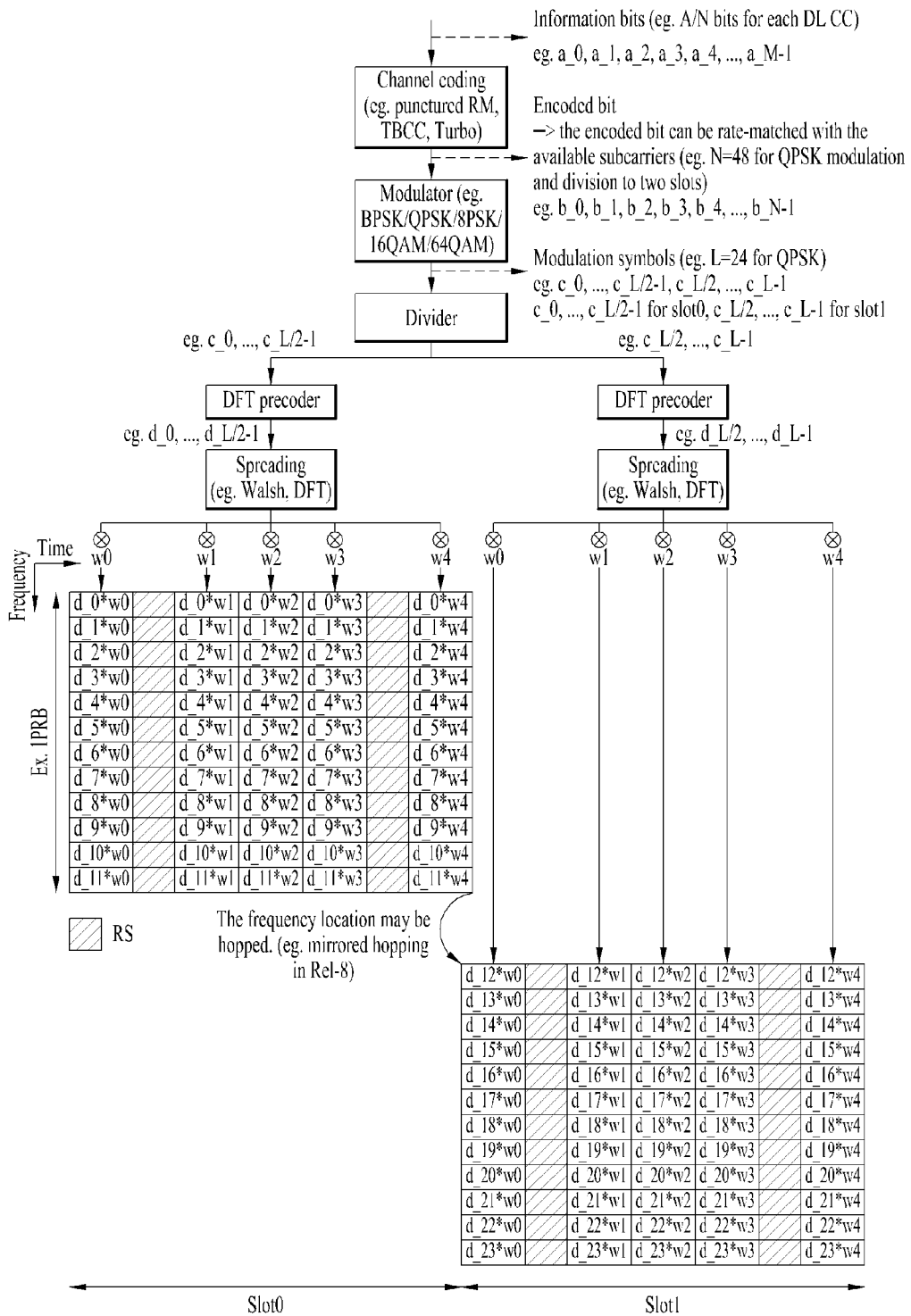

FIG. 25 illustrates an exemplary structure of PUCCH format 3 using an OC of SF=5.

The basic signal processing operation is performed in the same manner as described with reference to FIG. 25 except for the number and positions of UCI SC-FDMA symbols and RS SC-FDMA symbols. A spreading block may be applied in advance at the front end of the DFT precoder.

In FIG. 25, RSs may use the same structure as those used in the LTE system. For example, a base sequence may be cyclically shifted. The multiplexing capacity of a data part is 5 due to SF=5. However, the multiplexing capacity of an RS part is determined by a CS interval $\Delta_{shift}^{PUCCH}$. For example, the multiplexing capacity may be $12/\Delta_{shift}^{PUCCH}$. In this case, the multiplexing capacities for the cases in which $\Delta_{shift}^{PUCCH}=1$, $\Delta_{shift}^{PUCCH}=2$, and $\Delta_{shift}^{PUCCH}=3$ are 12, 6, and 4, respectively. In FIG. 25, while the multiplexing capacity of the data part is 5 due to SF=5, the multiplexing capacity of the RS part is 4 in case of $\Delta_{shift}^{PUCCH}$. Therefore, overall multiplexing capacity may be limited to the smaller of the two values, 4.

Figure 26:
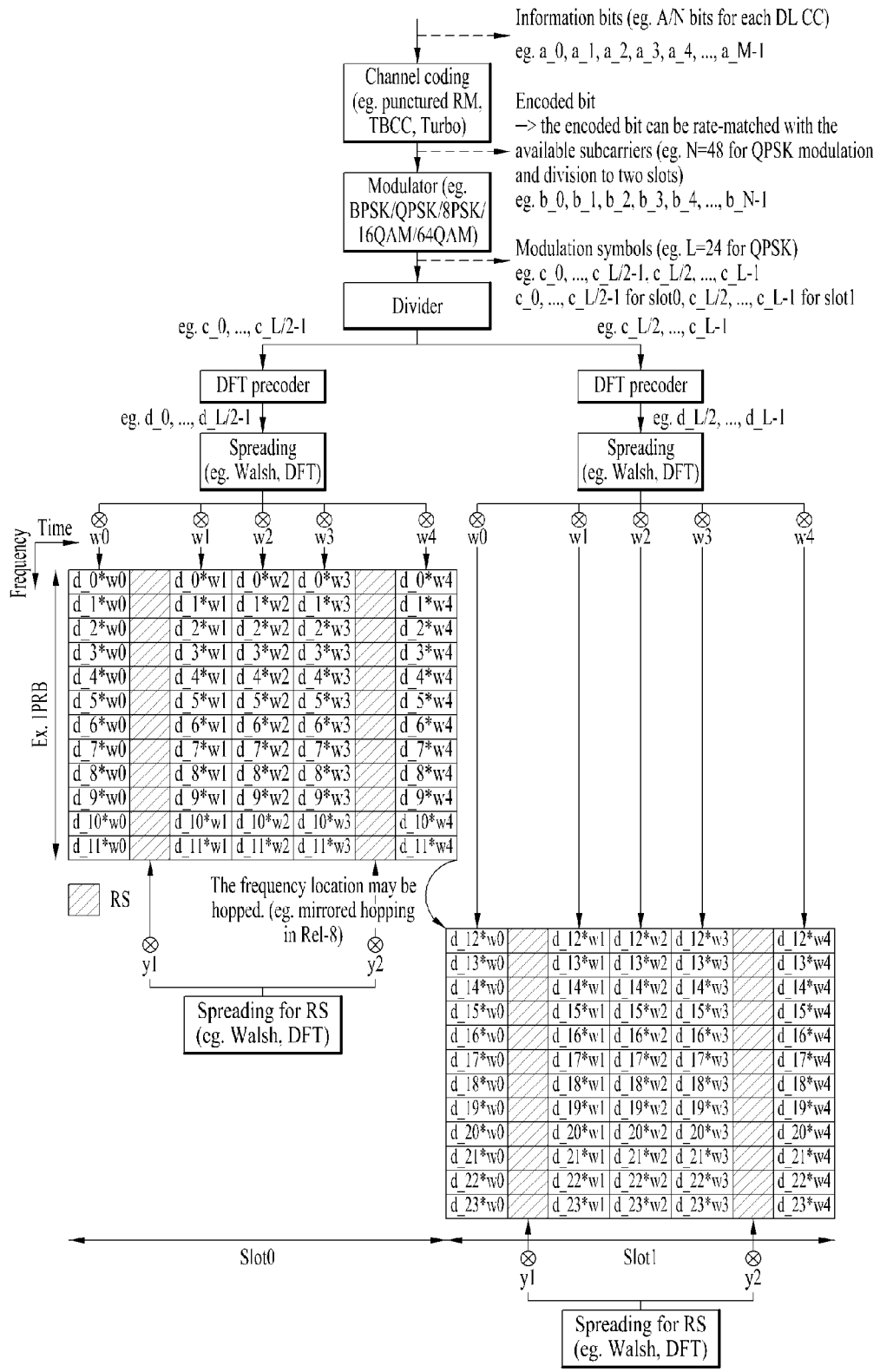

FIG. 26 illustrates an exemplary structure of PUCCH format 3 that can increase a multiplexing capacity at a slot level.

Overall, multiplexing capacity can be increased by applying SC-FDMA symbol-level spreading described with reference to FIGS. 24 and 25 to RSs. Referring to FIG. 26, the multiplexing capacity is doubled by applying a Walsh cover (or a DFT code cover) within a slot. Then, the multiplexing capacity is 8 even in case of $\Delta_{shift}^{PUCCH}$, thereby preventing the multiplexing capacity of a data part from decreasing. In FIG. 26, [y1 y2]=[1 1], [y1 y2]=[1 −1], or a linear transform thereof (e.g., [j j] [j −j], [1 j] [1 −j], etc.) may be used for an OC for RSs.

Figure 27:
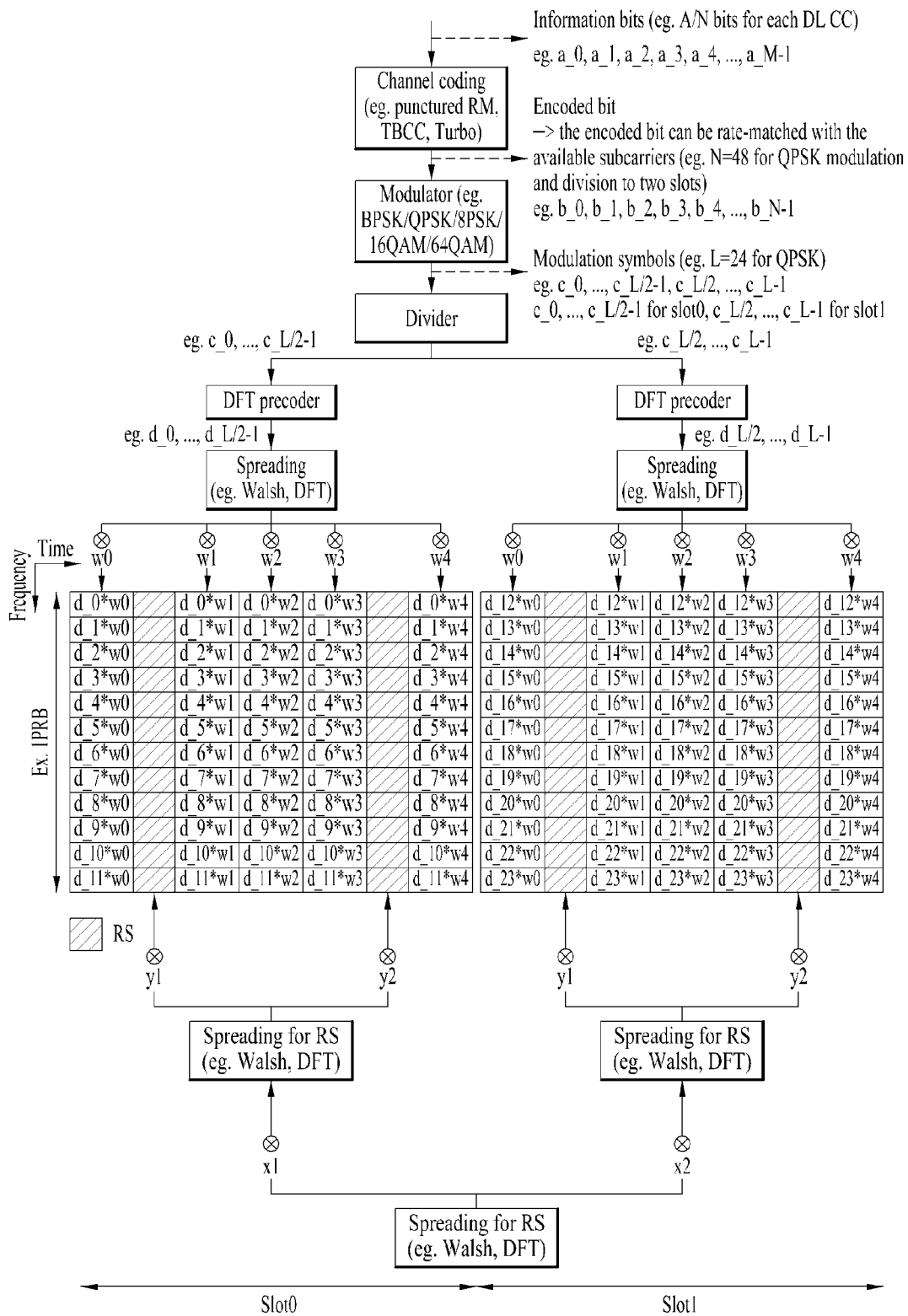

FIG. 27 illustrates an exemplary PUCCH format 3 structure that can increase multiplexing capacity at a subframe level.

Without applying slot-level frequency hopping, the multiplexing capacity is doubled again by applying a Walsh cover in units of a slot. As described before, [x1 x2]=[1 1], [1 −1], or a transformation thereof may be used as an OC.

For reference, the processing operation of PUCCH format 3 is not limited to the orders illustrated in FIGS. 24 to 27.

Channel Selection

Channel selection refers to expression/transmission of specific information by selecting a specific resource from among a plurality of resources. General channel selection is a scheme of transmitting specific information by a combination of a resource and constellation.

Here, the resource may be specified by a physical time-frequency resource and/or a sequence resource (e.g., a CS value). For example, in LTE release-8 PUCCH format 1/1a/1b, a specific resource may be selected by a combination of an OC, a CS, and a Physical Resource Unit (PRU). It may be assumed that a plurality of resources on which channel selection is performed is distinguished by a combination of the above three resources. For example, a channel selection method shown in the following Table 3 may be used.

TABLE 3

|  | Ch1 | | Ch2 | |
| --- | --- | --- | --- | --- |
|  | RS | Data | RS | Data |
| ACK | a | b | 0 | 0 |
| NACK | 0 | 0 | a | b |

In the above Table 3 and in the following description, values expressed as a, b, c, . . . may mean constellation values caused by modulation (e.g., BPSK, QPSK, etc.) in a channel Ch-x (x=1, 2, 3, . . . ). Alternatively, the values expressed as a, b, c, . . . may be values multiplexed, scrambled, or covered by an allocated sequence or an allocated code, rather than the constellation values. Thus, the values expressed as a, b, c, . . . with respect to Ch-x may be values capable of distinguishing therebetween and a method for distinguishing between the values is not restricted. Notably, in the following description, the values expressed as a, b, c, . . . with respect to Ch-x are referred to as modulated values, for convenience of description.

In addition, the values expressed as a, b, c, . . . may be predetermined specific values rather than 0. For example, a may be '+1' and b may be '−1'.

In the example of Table 3, even if the same value is transmitted, different information (i.e., ACK or NACK) may be transmitted depending on which channel is used for transmission. For example, for ACK transmission, a value a is transmitted in an RS part of resource 1 (i.e., Ch1) and a value b is transmitted in a data part of resource 1. For NACK transmission, a is transmitted in an RS part of resource 2 (i.e., Ch2) and b is transmitted in a data part of resource 2. In this way, a method for transmitting different information depending on through which resource a signal is transmitted may be referred to as channel selection.

In Table 3, a simple example without using complicated constellation mapping is shown but additional constellation mapping may be used to transmit more information. Table 4 shows an example using two types of distinguishable constellation mapping (e.g., BPSK).

TABLE 4

|  | Ch1 | | Ch2 | |
| --- | --- | --- | --- | --- |
|  | RS | Data | RS | Data |
| A/A | a | b | 0 | 0 |
| A/N | a | c | 0 | 0 |
| N/A | 0 | 0 | a | b |
| N/N | 0 | 0 | a | c |

In the above Table 4, a, b, and c may be specific values other than 0. Notably, it is preferable that b and c be distant from each other on constellation. For example, a may be used as '+1' and b and c may be used as '+1' and '−1', respectively or '−1' and '+1', respectively. In the example of Table 4, a value modulated to b is transmitted in resource 1 (Ch1) for ACK/ACK transmission and a value modulated c is transmitted in resource 1 (Ch1) for ACK/NACK transmission. In addition, a value modulated to b is transmitted in resource 2 (Ch2) for NACK/ACK transmission and a value modulated to c is transmitted in resource 2 (Ch2) for NACK/NACK.

A mapping relationship for channel selection for ACK/NACK transmission in TDD, used in legacy LTE release-8/9, is defined in Tables 5, 6, and 7 shown below. In LTE release-8/9, TDD ACK/NACK multiplexing may have the same meaning as TDD ACK/NACK channel selection but they have different meanings in a multicarrier support system (e.g., LTE-A or LTE-release-10) which will be described later.

In the following Tables 5, 6, and 7, a value M may be determined by a DL related set index K: $\{k_0, k_1, \ldots k_{M-1}\}$ (defined as in Table 12 which will be described later) in a TDD system. For example, if M=2 in Table 5, two PUCCH resources $n_{PUCCH,0}^{(1)}$ and $n_{PUCCH,1}^{(1)}$ and a QPSK constellation 'b(0), b(1)' in each PUCCH resource may be used to transmit two types of ACK/NACK information including spatial bundling (i.e., ACK/NACK bundling for a plurality of codewords).

Specifically, the UE transmits bits 'b(0),b(1)' on an ACK/NACK resource $n_{PUCCH}^{(1)}$ using PUCCH format 1b in subframe n. The value b(0),b(1), and the ACK/NACK resource $n_{PUCCH}^{(1)}$ may be generated by channel selection according to the following Tables 5, 6, and 7. Tables 5, 6, and 7 show ACK/NACK multiplexing transmission when M=2, M=3, and M=4, respectively. If 'b(0),b(1)', is mapped to NACK/ACK, the UE does not transmit an ACK/NACK response in subframe n.

TABLE 5

| HARQ-ACK(0), HARQ-ACK(1) | $n_{PUCCH}^{(1)}$ | b(0), b(1) |
| --- | --- | --- |
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 6

| HARQ-ACK(0), HARQ-ACK(1), HARQ-ACK(2) | $n_{PUCCH}^{(1)}$ | b(0), b(1) |
| --- | --- | --- |
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,1}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 7

| HARQ-ACK(0), HARQ-ACK(1), HARQ-ACK(2), HARQ-ACK(3) | $n_{PUCCH}^{(1)}$ | b(0), b(1) |
| --- | --- | --- |
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |

TABLE 7-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Tables 5, 6, and 7, HARQ-ACK(i) indicates a HARQ ACK/NACK/DTX result for an i-th data unit ($0 \leq i \leq 3$). DTX means that there is no data unit transmitted for corresponding HARQ-ACK(i) or the data unit corresponding to HARQ-ACK(i) has not been detected by the UE. In this specification, HARQ-ACK is used interchangeably with ACK/NACK. A maximum of four PUCCH resources (i.e., $n_{PUCCH,0}^{(1)}$ to $n_{PUCCH,3}^{(1)}$) may be occupied for each data unit. Multiplexed ACK/NACK signals are transmitted through one PUCCH resource selected from among the occupied PUCCH resources. In Tables 5, 6, and 7, $n_{PUCCH,x}^{(1)}$ indicates a PUCCH resource used for actual ACK/NACK transmission, and 'b(0)b(1)' indicates two bits transmitted through the selected PUCCH resource, which is modulated using QPSK. For example, if the UE successfully decodes four data units as in Table 7, the UE transmits (1, 1) to the BS through a PUCCH resource connected to $n_{PUCCH,1}^{(1)}$. Since combinations of PUCCH resources and QPSK symbols cannot represent all of available ACK/NACK, NACK and DTX are coupled (expressed as NACK/DTX) except in some cases.

Meanwhile, in an LTE-A (or LTE release-10) system to which the present invention is applied, there are no particular restrictions as to a channel selection mapping relationship which is used to apply the channel selection method. For example, a channel selection mapping relationship for transmitting ACK/NACK information as shown in Tables 8 to 10 may be defined. Table 8 defines a mapping relationship for 2-bit ACK/NACK, Table 9 defines mapping relationship for 3-bit ACK/NACK, and Table 10 defines a mapping relationship for 4-bit ACK/NACK.

TABLE 8

| | ACK/NACK resource | |
|---|---|---|
| A/N state | 1 | 2 |
| A, A | | −1 |
| A, N/D | −1 | |
| N/D, A | | +1 |
| N, N/D | +1 | |
| D, N/D | No transmission | |

TABLE 9

| | ACK/NACK resource | | |
|---|---|---|---|
| A/N state | 1 | 2 | 3 |
| A, A, A | | −1 | |
| A, N/D, A | | +j | |
| N/D, A, A | | −j | |
| N/D, N/D, A | | | −1 |
| A, A, N/D | −1 | | |
| A, N/D, N/D | +j | | |
| N/D, A, N/D | −j | | |
| N/D, N/D, N | | | +1 |
| N/D, N/D, D | +1 | | |
| (except for D, D, D) | | | |
| D, D, D | No transmission | | |

TABLE 10

| | ACK/NACK resource | | | |
|---|---|---|---|---|
| A/N state | 1 | 2 | 3 | 4 |
| A, A, A, A | | −1 | | |
| A, N/D, A, A | | | −j | |
| N/D, A, A, A | | −j | | |
| N/D, N/D, A, A | | | | −1 |
| A, A, A, N/D | | +j | | |
| A, N/D, A, N/D | | | +1 | |
| N/D, A, A, N/D | | +1 | | |
| N/D, N/D, A, N/D | | | | +j |
| A, A, N/D, A | | −1 | | |
| A, N/D, N/D, A | | +j | | |
| N/D, A, N/D, A | | | | −j |
| N/D, N/D, N/D, A | | | | +1 |
| A, A, N/D, N/D | −1 | | | |
| A, N/D, N/D, N/D | +j | | | |
| N/D, A, N/D, N/D | −j | | | |
| N/D, N/D, N/D, N/D | +1 | | | |
| (except for D, D, N/D, N/D) | | | | |
| D, D, N/D, N/D | No transmission | | | |

Alternatively, channel mapping relationships for 1-bit to 4-bit ACK/NACK as shown in Table 11 may be defined. In the example of Table 11, one channel resource h0 and constellation values 1 and −1 generated by data modulation may be used to transmit 1-bit ACK/NACK information. For transmission of 2-bit ACK/NACK information, two channel resources h0 and h1 and constellation values 1, −1, −j, and j are used. For 3-bit ACK/NACK information, three channel resources h0, h1, and h2 and constellation values 1, −1, −j, and j generated by data modulation are used. Four channel resources h0, h1, h2, and h3 and constellation values 1, −1, −j, and j generated by data modulation may be used to transmit 4-bit ACK/NACK information.

[00185] Table 11

| PCC | PCC/SCC | SCC | SCC | PUCCH A/N resource (h#) | Data | |
| b0 | b1 | b2 | b3 | RS&Data | Const. | |
| D | N/D | N/D | N/D | DTX | | |
| N | N/D | N/D | N/D | h0 | 1 | 1 bit |
| A | N/D | N/D | N/D | h0 | -1 | |
| N/D | A | N/D | N/D | h1 | -j | 2 bits |
| A | A | N/D | N/D | h1 | j | |
| N/D | N/D | A | N/D | h2 | 1 | |
| A | N/D | A | N/D | h2 | j | |
| N/D | A | A | N/D | h2 | -j | 3 bits |
| A | A | A | N/D | h2 | -1 | |
| N/D | N/D | N/D | A | h3 | 1 | |
| A | N/D | N/D | A | h0 | -j | |
| N/D | A | N/D | A | h3 | j | |
| A | A | N/D | A | h0 | j | |
| N/D | N/D | A | A | h3 | -j | |
| A | N/D | A | A | h3 | -1 | |
| N/D | A | A | A | h1 | 1 | |
| A | A | A | A | h1 | -1 | 4 bits |

UL ACK/NACK to DL Transmission in Multicarrier Support System

In a multicarrier system or a CA support system, DL resources may be defined as a DL CC and UL resources may be defined as a UL CC. In addition, a combination of DL resources and UL resources may be referred to as a cell. If DL CCs and UL CCs are asymmetrically configured, the cell may refer to only the DL CCs (or UL CCs). For example, if a specific UE is configured with one serving cell, one DL CC and one UL CC are present. However, if a specific UE is configured with two or more serving cells, DL CCs which is equals in number to the cells and UL CCs which is equal to or less than the DL CCs in number are present. When a specific UE is configured with a plurality of serving cells, a multicarrier environment in which the number of UL CCs is greater than the number of DL CCs may be supported.

Linkage between carrier frequencies (center frequencies of a cell) of the DL and UL resources may be indicated by system information transmitted on the DL resources. For example, a combination of the DL resources and the UL resources may be configured by linkage defined by an SIB2.

According to the above definition, CA may refer to an aggregate of two or more cells having different carrier frequencies. That is, the case in which a specific UE is configured with two or more serving cells having different carrier frequencies may be referred to as a CA environment. For UEs supporting CA, one or more SCells may be aggregated with a PCell to support increased bandwidth.

In this case, the serving cell may be a PCell or an SCell. For a UE that is in an RRC_CONNECTED state without supporting CA, only one serving cell including a PCell is present. Meanwhile, for a UE in an RRC_CONNECTED state, for which CA is configured, serving cells refer to a set of one or more cells including a PCell and SCells.

The PCell is a central cell of control related communication among serving cells configured in a CA environment. The PCell is a cell indicated or used by a UE in an initial connection establishment procedure, a connection re-establishment procedure, or a handover procedure. In LTE-A release 10, the UE may receive and transmit a PUCCH only on the PCell thereof. In future releases, PUCCH transmission on the SCell of the UE may be permitted. In addition, the UE may perform a monitoring procedure for system information acquisition and change only on the PCell. For a CA support UE, a BS may change only through a handover procedure using an RRCConnectionReconfiguration message including mobilityControlInfo.

Next, SCells refer to cells except for the PCell among serving cells configured in a CA environment. In LTE-A release 10, no PUCCHs are present on the SCell. If an SCell is added, the BS may provide all system information related to an operation on the SCell of an RRC_CONNECTED state to the UE supporting CA through dedicated signaling. For the SCell, change in system information may be performed by release and addition of the SCell through one RRCConnectionReconfiguration message. The BS may transmit dedicated signaling having a different parameter from a parameter included in a broadcast message on the SCell to the UE. After an initial security activation procedure, the BS may configure one or more SCells in addition to the PCell (a cell configured as a serving cell during a connection establishment procedure) for the UE. The PCell may be used to provide security input and higher-layer system information and the SCell may be used to provide additional DL resources and, when necessary, UL resources. The BS may independently add, eliminate, or correct the SCell through an RRC reconnection reconfiguration procedure using an RRCConnectionReconfiguration message which includes or does not include mobilityControlInfo.

In the CA environment, PhyCellId, SCellIndex, and ServCellIndex may be defined as RRC related parameters/Information Elements (IEs). PhyCellId may have an integer ranging from 0 to 503 and may be used as a physical layer identifier of a cell. SCellIndex may have an integer ranging from 1 to 7 and may be used as an identifier of an SCell. ServCellIndex may have an integer ranging from 0 to 7 and may be used as an identifier of a serving cell (PCell or SCell). ServCellIndex having a value of 0 may be applied to the PCell and, for the SCell, SCellIndex may be applied. That is, a cell having the smallest (or lowest) cell index in ServCellIndex may be defined as the PCell.

In summary, multiple carriers in CA are divided into a PCell and an SCell which are UE-specific parameters. A specific UE may have one or more configured serving cells. If a plurality of configured serving cells is present, a cell having the smallest ServCellIndex among the cells is a PCell and the other cells are SCells. In LTE-A release 10, if the UE has a plurality of configured serving cells in TDD, UL-DL configurations constituting a UL subframe and a DL subframe in a frame may be equal in all cells and HARQ-ACK timings indicating which UL subframe is used to transmit ACK/NACK for a PDSCH transmitted in a specific DL subframe according to the UL-DL configuration may be equal in all cells. In future releases, if the UE has a plurality of configured serving cells in TDD, the UL-DL configurations may differ between cells and the HARQ-ACK timings according to the UL-DL configurations may differ between cells.

In addition, the UE may transmit UCI such as CSI (including CQI, RI, PMI, etc.) and HARQ ACK/NACK, measured from one or more CCs, to the BS in one predetermined CC. For example, if a plurality of ACK/NACK feedbacks is needed, the UE may gather the ACK/NACK feedbacks (e.g., ACK/NACK multiplexing or ACK/NACK bundling) received from a PCell DL CC and SCell DL CC(s) and may transmit the gathered ACK/NACK feedbacks to the BS in a UL CC of the PCell using one PUCCH.

In the present invention, when a plurality of ACK/NACK signals for a plurality of DL transmissions is transmitted through one PUCCH, a unit (one or more subframes and/or one or more carriers) constituting the plurality of DL transmissions is referred to as a bundling window. That is, time domain bundling refers to bundling ACK/NACK signals for DL transmissions in a plurality of subframes. CC domain bundling refers to bundling ACK/NACK signals for DL transmissions in a plurality of CCs. Time domain/CC domain bundling refers to bundling ACK/NACK signals for DL transmissions in a plurality of subframes and a plurality of CCs. Although ACK/NACK bundling may be performed by logical AND operation, the present invention is not limited thereto and other operations such as logical OR may be used.

In addition, a unit for actually performing time domain bundling and/or CC domain bundling using a logical AND (or logical OR) operation may be referred to as a real bundling window. That is, one or more real bundling windows may be present in one bundling window. In other words, the size of a bundling window is equal to or greater than the size of a real bundling window. Here, spatial bundling for a plurality of ACK/NACK bits for one DL transmission (i.e., ACK/NACK bundling for a plurality of codewords) may be applied regardless of the bundling window or the real bundling window.

Examples in which ACK/NACK for DL transmission is needed, defined in the 3GPP LTE system, will now be described. Here, when ACK/NACK is transmitted in subframe n, the ACK/NACK relates to DL transmission in subframe n−k.

In a TDD system, a DL related set index K: $\{k_0, k_1, \ldots k_{M-1}\}$ may be given per UL-DL configuration of Table 1 as shown in Table 12 with respect to the relationship between subframe n and subframe n−k.

TABLE 12

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In FDD, M is always 1 and K always satisfies $\{k_0\}=\{4\}$. When ACK/NACK for DL transmission in subframe n−k is transmitted in subframe n, the DL transmission in subframe n−k may correspond to one or more of the following three cases.

Case 1 is when ACK/NACK feedback for a PDSCH(s) indicated by a PDCCH(s) detected in a subframe(s) n−k is needed. Here, k∈K, and K varies according to subframe index n and UL-DL configuration and includes M elements $\{k_0, k_1, \ldots k_{M-1}\}$. The following Table 12 shows K: $\{k_0, k_1, \ldots k_{M-1}\}$. Case 1 relates to a PDSCH(s) requiring general ACK/NACK feedback. In the following description, Case 1 is referred to as 'ACK/NACK for a PDSCH' or 'ACK/NACK for a PDSCH with a PDCCH'.

Case 2 is when ACK/NACK feedback for a PDCCH(s) indicating DL SPS release in a subframe(s) n−k is needed. Here, k∈K and K denotes the same index as in the description given in Case 1. ACK/NACK of Case 2 means ACK/NACK feedback for a PDCCH(s) for SPS release. Meanwhile, while ACK/NACK feedback for DL SPS release is performed, ACK/NACK feedback for a PDCCH(s) indicating SPS activation is not performed. In the following description, Case 2 is referred to as 'ACK/NACK for DL SPS release PDCCH'.

Case 3 is when ACK/NACK feedback for transmission of a PDSCH(s) without corresponding to a PDCCH(s) detected in subframe(s) n−k is needed. Here, k∈K and K denotes the same index as in description given in Case 1. Case 3 relates to PDSCHs without PDCCHs and means ACK/NACK feedbacks for PDSCHs allocated by SPS. In the following description, Case 3 is referred to as 'ACK/NACK for DL SPS PDSCH'.

In the following description, a PDSCH with a corresponding PDCCH, a PDSCH for DL SPS release, and a PDSCH without a corresponding PDCCH are collectively referred to as DL transmission requiring ACK/NACK transmission.

Examples of the present invention when the above ACK/NACK for DL transmission is applied to a multicarrier system will be described hereinbelow in detail.

For convenience of description, the examples of the present invention will be described under the following assumptions. However, the embodiments of the present invention are not limited to the following assumptions.

(1) One PCell and one or more SCells may be present.
(2) A PDSCH with a corresponding PDCCH may be present on a PCell and an SCell(s).
(3) A PDCCH indicating DL SPS release may be present only on a PCell.
(4) A PDSCH without a corresponding PDCCH (=SPS PDSCH) may be present only on a PCell.
(5) Cross-scheduling from a PCell to a SCell(s) may be supported.
(6) Cross-scheduling from an SCell(s) to a PCell is not supported.
(7) Cross-scheduling from an SCell(s) to another SCell (or other SCells) may be supported.

In description of the present invention, time-domain bundling and/or CC-domain bundling means a logical AND operation. However, time-domain bundling and/or CC-domain bundling may be performed through other methods such as a logic OR operation, etc. That is, time-domain bundling or CC-domain bundling refers to a method for expressing a plurality of ACKs/NACKs over a plurality of subframes or CCs as ACK/NACK information having less bits, in an ACK/NACK response using a single PUCCH format. In other words, time domain bundling or CC domain bundling refers to an arbitrary method for expressing M-bit ACK/NACK information as N bits (M≥N).

In a system to which multiple carriers and/or TDD are applied, a plurality of ACK/NACK bits may be transmitted by channel selection using PUCCH format 1a/1b, PUCCH format 3, or channel selection using PUCCH format 3. For PUCCH resource indexes for the PUCCH formats, implicit mapping, explicit mapping, or a composite of implicit and explicit mapping may be used. Implicit mapping may use a method for deriving a PUCCH resource index based on the lowest CCE index of a corresponding PDCCH. Explicit mapping may use a method for indicating or deriving the PUCCH resource index among sets predetermined by RRC configuration by an ACK/NACK Resource Indicator (ARI) in the PDCCH.

In relation to the present invention, when a new format (e.g., PUCCH format 3 described with reference to FIGS. 24 to 27) for transmitting a plurality of ACK/NACK bits, resource allocation of PUCCH format 3 is basically performed based on explicit resource allocation.

Specifically, a UE configured as PUCCH format 3 may be explicitly (e.g., through RRC signaling) assigned an orthogonal resource for the format. In addition, a final PUCCH resource may be determined by an ARI value in a DCI format in a PDCCH for a PDSCH transmitted on the SCell among orthogonal resources predetermined by RRC configuration. In this case, the ARI may be used as an offset based on an explicitly signaled PUCCH resource value or may be used to indicate which one among one or more PUCCH resource sets is to be used.

To contain ARI information in a PDCCH, a method of reusing a field defined in a DCI format of an existing PDCCH for an ARI purpose may be considered. The PDCCH may include a Transmit Power Control (TPC) field. An original purpose of the TPC field is to control transmit power of a PUCCH and/or a PUSCH and may consist of 2 bits.

As described above, when the ARI is transmitted only on the SCell, a TPC field in the PDCCH on the SCell may be reused as the ARI. Meanwhile, the TPC field in the PDCCH on the PCell may be used for transmit power control of a PUCCH and/or a PUSCH.

In the LTE release-10 system, since a PDCCH for scheduling a PDSCH of a PCell cannot be received on an SCell (i.e., cross-carrier scheduling of the PDSCH of the PCell from the PDCCH of the SCell is not permitted), the meaning that the UE receives the PDSCH only on the PCell may be equivalent to the meaning that the UE receives the PDCCH only on the PCell.

Explicit ACK/NACK resource allocation configured by RRC signaling may be performed as follows.

First, a PDCCH corresponding to a PDSCH on an SCell (i.e., a PDCCH for scheduling a PDSCH) may include information (e.g., ARI) for deriving a specific PUCCH resource from an RRC-configured resource(s).

Next, if a PDCCH corresponding to a PDSCH is not received on an SCell and the PDSCH is received only on a PCell, one of the following cases may be applied. First, a PUCCH resource (i.e., PUCCH format 1a/1b) defined in LTE release-8 may be used. Second, a PDCCH corresponding to a PDSCH on the PCell may include information (e.g., ARI) for deriving a specific PUCCH resource from an RRC-configured resource(s).

The UE may assume that all PDCCHs corresponding to PDSCHs on SCells have the same ARI.

In this way, when ARI information is defined to be transmitted only on the SCells, if the UE receives only a PDSCH(s) for the PCell (or receives a PDCCH(s) only on the PCell) in a multicarrier and/or TDD system, since the UE is unable to know ARI information transmitted from the SCell, a final resource index for a PUCCH format (PUCCH format 3) to be used by the UE cannot be determined.

The present invention devised to solve the above problem proposes methods for determining a final resource index for a PUCCH format even when the UE receives only a PDSCH(s) for a PCell (or receives a PDCCH(s) only on the PCell).

In various examples of the present invention, the case in which a UE receives only a PDSCH(s) for a PCell (or the case in which the UE receives a PDCCH(s) only on the PCell) is briefly referred to as a 'PCell-only-receiving', for convenience of description. Here, PCell-only-receiving is defined in terms of reception of the UE. If the present invention is applied to a multicarrier environment, the UE may have one configured cell or a plurality of configured cells. If the UE has one configured cell, the cell may be a PCell and if the UE has a plurality of configured cells, the cells may be comprised of one PCell and one or more SCells. The present invention may be applied to one of the two cases or to both cases. Namely, the PCell-only-receiving case may be applied to both a CA environment and a non-CA environment.

Moreover, as described previously, a new PUCCH format, i.e., PUCCH format 3, may be used for ACK/NACK transmission for DL transmission received through a plurality of DL subframes in a TDD system even when the UE includes one configured cell. PUCCH format 3 may also be used in an FDD or TDD system when the UE includes a plurality of configured cells. That is, PUCCH format 3 may be used in a CA system or non-CA TDD system.

Further, in various examples of the present invention, a candidate set of resources used for PUCCH format 3 may be RRC-configured. A specific PUCCH resource in the PUCCH resource candidate set may be determined by or derived from a value of ARI information (which may expressed as reuse of a TPC field of a PDCCH). In brief, a PUCCH format 3 resource to be used by the UE is derived from an ARI included in a PDCCH among RRC-configured resource candidates. The ARI has a size of X bits and X may be defined as 2 when the ARI is expressed by reuse of the TPC field (of 2 bits in size) of the PDCCH on the SCell as described above. For example, one resource of four PUCCH resource candidates may be expressed using a 2-bit ARI.

The present invention is described on the assumption that transmission is performed through a single antenna requiring one orthogonal resource, for convenience of description associated with application of PUCCH format 3. However, it is apparent that the present invention is not limited thereto and the principle of the present invention is applicable in the same manner even when a multi-antenna transmit diversity scheme such as Spatial Orthogonal-Resource Transmit Diversity (SORTD) is applied to PUCCH format 3.

An exemplary assumption of the present invention for PUCCH format 3 resource allocation will now be described based on the above description.

A resource for PUCCH format 3 may be expressed as $n_{PUCCH}^{(3)}$ and four orthogonal resource candidates for PUCCH format 3 may be expressed as $n_{PUCCH,0}^{(3)}$, $n_{PUCCH,1}^{(3)}$, $n_{PUCCH,2}^{(3)}$, and $n_{PUCCH,3}^{(3)}$. An arbitrary UE may be assigned such four orthogonal resources through RRC signaling. RRC signaling may be, for example, four separate RRC signals. UE may be informed of one set $\{n_{PUCCH,0}^{(3)}, n_{PUCCH,1}^{(3)}, n_{PUCCH,2}^{(3)}, n_{PUCCH,3}^{(3)}\}$ consisting of four orthogonal resources through one RRC signaling. The UE that has been assigned the four PUCCH resource candidates may finally determine one PUCCH resource ($n_{PUCCH}^{(3)}$) among the four PUCCH resource candidates based on a value indicated by an additionally received ARI.

The following Table 13 shows exemplary resource allocation for PUCCH format 3 in single-antenna transmission.

TABLE 13

| Value of ARI (or TPC command for PUCCH on SCells) | $n_{PUCCH}^{(3)}$ |
|---|---|
| '00' | The first PUCCH resource index ($n_{PUCCH,0}^{(3)}$) configured by the higher layers |
| '01' | The second PUCCH resource index ($n_{PUCCH,1}^{(3)}$) configured by the higher layers |
| '10' | The third PUCCH resource index ($n_{PUCCH,2}^{(3)}$) configured by the higher layers |
| '11' | The fourth PUCCH resource index ($n_{PUCCH,3}^{(3)}$) configured by the higher layers |

Hereinafter, various embodiments of the present invention will be described in detail based on the above description.

Embodiment 1

The present embodiment 1 relates to a method of using predefined resource allocation in a PCell-only-receiving case (i.e., the case of receiving only a PDSCH(s) for a PCell or the case of receiving a PDCCH(s) only on the PCell).

In the PCell-only-receiving case, it is possible to predetermine a resource index of PUCCH format 3. That is, in a non-PCell-only-receiving case, the UE may derive a PUCCH resource index from an ARI received on an SCell, whereas in the PCell-only-receiving, the UE may use a predetermined PUCCH resource index.

Specifically, a new index may be predetermined so that the UE can determine a PUCCH format 3 resource to be used in the PCell-only-receiving case. The new index may have the same meaning as the ARI on the SCell. In other words, the index may be used to indicate any one of resource candidate sets configured through RRC signaling. The index may be defined in the form of a predefined rule (or a specific value) indicating a resource of a specific order (e.g., the first resource or last resource) among the resource candidate sets.

For example, in the PCell-only-receiving case, the index capable of determining the PUCCH format 3 resource may be defined as a system-specific value. Alternatively, the index may be RRC-configured as an eNB-specific value or as a UE-specific value.

Figure 28:
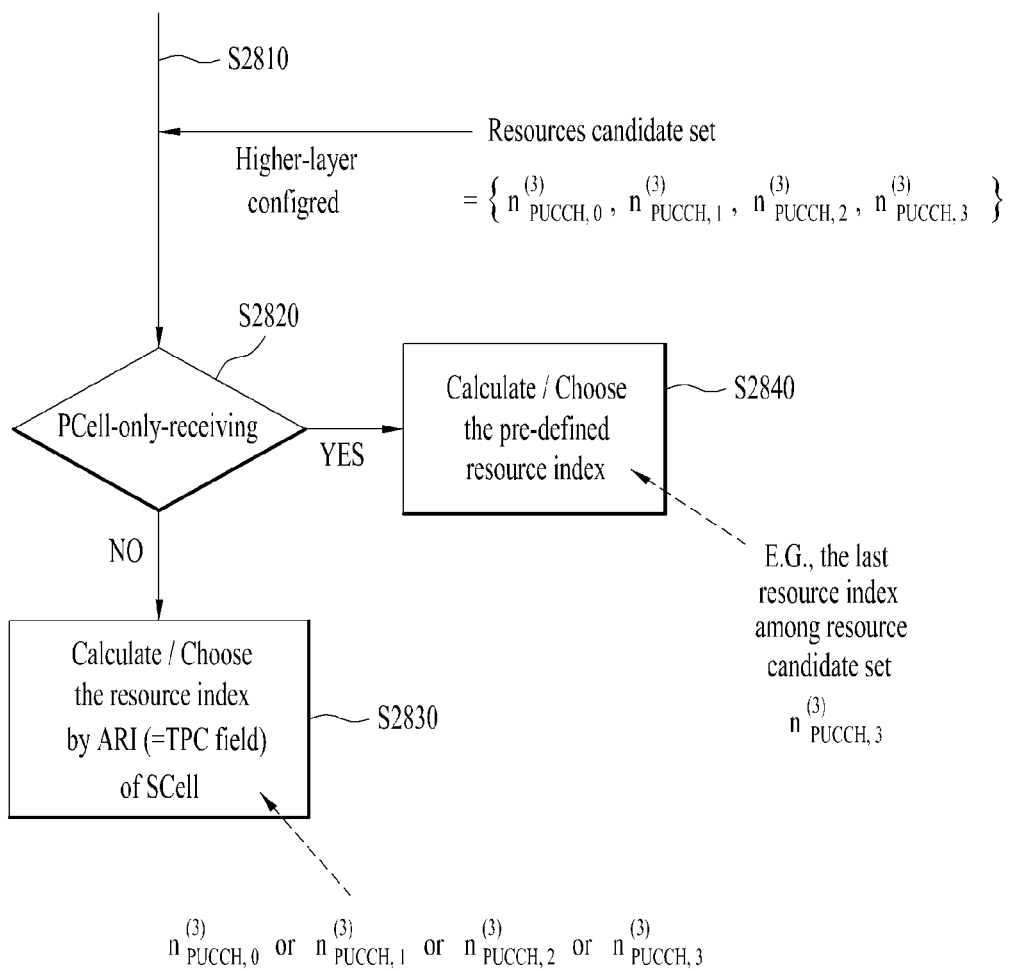
FIG. 28 is a flowchart illustrating predefined resource allocation for PUCCH resource determination in a PCell-only-receiving case.

FIG. 28 is a flowchart illustrating predefined resource allocation for PUCCH resource determination in a PCell-only-receiving case.

In step S2810, a UE may receive a PUCCH resource candidate set $\{n_{PUCCH,0}^{(3)}, n_{PUCCH,1}^{(3)}, n_{PUCCH,2}^{(3)}, n_{PUCCH,3}^{(3)}\}$ including four resources for PUCCH format 3 through higher-layer configuration (e.g., RRC signaling).

In step S2820, when PUCCH format 3 is used for ACK/NACK transmission, the UE may determine whether a situation is a PCell-only-receiving case. If a determination result in step S2820 is NO (i.e., a non-PCell-only-receiving case), step S2830 is performed and if YES (i.e., a PCell-only-receiving case), step S2840 is performed.

In step S2830, the UE may calculate/select one PUCCH resource (i.e., one resource index) to be used thereby from the four PUCCH resource candidates using an ARI indicated by reuse of a TPC field in a PDCCH(s) of an SCell.

Meanwhile, since a PDCCH is not received on the SCell in step S2840, the UE may select one PUCCH resource from among the four PUCCH resource candidates according to a predefined rule (or a predefined index). In the illustrated example of FIG. 28, the predefined rule is to select the last PUCCH resource index in the PUCCH resource candidate set. That is, in step S2840, the UE may calculate/select $n_{PUCCH,3}^{(3)}$.

After step S2830 or step S2840, the UE may transmit ACK/NACK information through PUCCH format 3 using a resource corresponding to the calculated/selected index.

Embodiment 2

The present embodiment 2 relates to a method for pre-determining an additional resource index and using the additional resource index for PUCCH resource allocation in a PCell-only-receiving case (i.e., the case of receiving only a PDSCH(s) for a PCell or the case of receiving a PDCCH(s) only on the PCell).

In the PCell-only-receiving case, it is possible to predetermine an additional resource index of PUCCH format 3. That is, the UE may derive a PUCCH resource index from an ARI received on an SCell in a non-PCell-only-receiving case, whereas the UE may use a predetermined additional PUCCH resource index in the PCell-only-receiving case. The predetermined index in the above Embodiment 1 is a predetermined index for one of the PUCCH resource candidates configured for the UE and Embodiment 2 is different from Embodiment 1 in that the additional resource index separate from the PUCCH resource candidates configured for the UE is predetermined.

According to this embodiment, for example, if a 2-bit ARI is used and a set of four RRC-configured resource candidates is defined, one additional resource candidate may be signaled to the UE through RRC signaling. Then, an RRC-configured resource candidate set includes five PUCCH resource indexes and one predetermined resource index (e.g., the last index) thereamong may be defined as being used only in the PCell-only-receiving case. Alternatively, one resource candidate for PCell-only-receiving may be defined separately from the four PUCCH resource candidates. In both of the above two cases, a reserved resource index for only the PCell-only-receiving case (i.e., a resource index which is not designated by an ARI on an SCell) may be allocated to the UE. Here, while it is preferable not to overlap one additional resource candidate for PCell-only-receiving with the four existing RRC-configured resource candidates, overlapping may be permitted in some cases.

Figure 29:
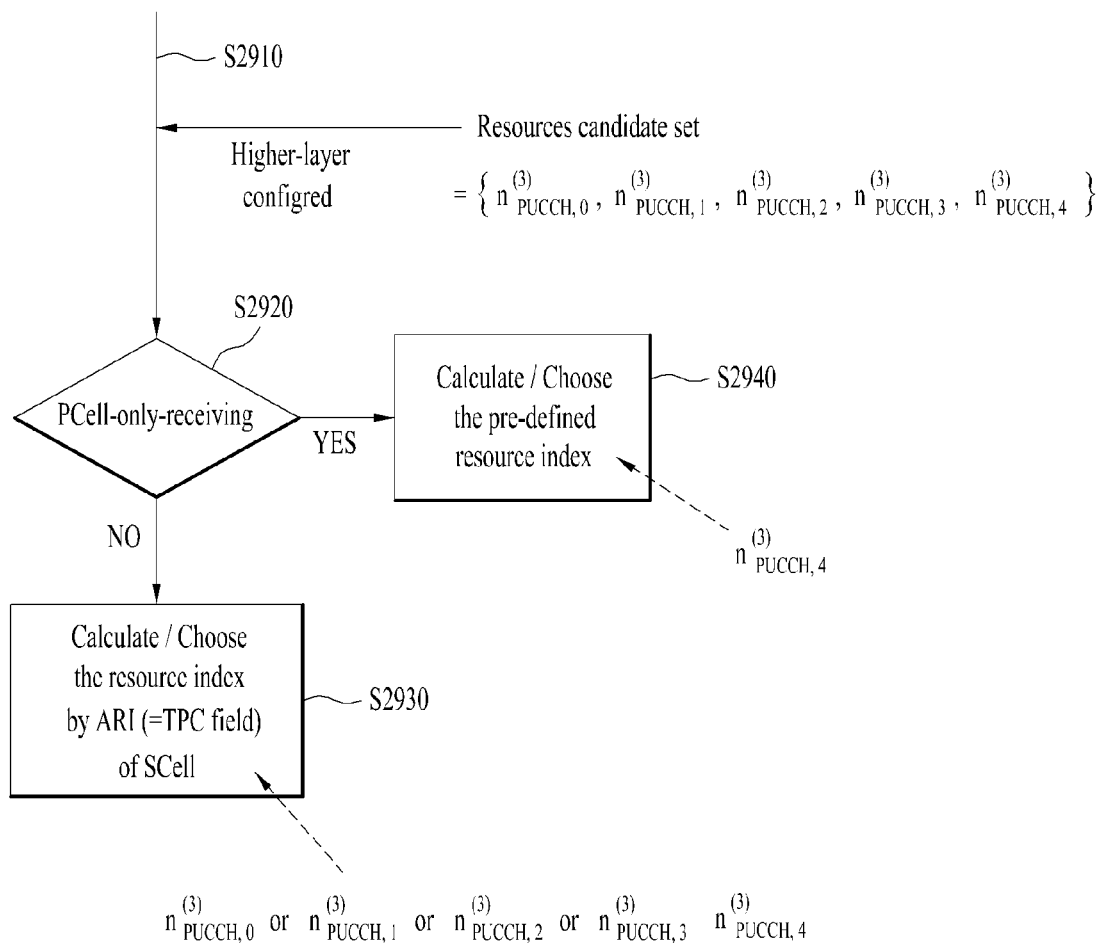
FIG. 29 is a flowchart illustrating additional predefined resource allocation for PUCCH resource determination in a PCell-only-receiving case.

FIG. 29 is a flowchart illustrating additional predefined resource allocation for PUCCH resource determination in a PCell-only-receiving case In step S2910, a UE may receive a PUCCH resource candidate set $\{n_{PUCCH,0}^{(3)}, n_{PUCCH,1}^{(3)}, n_{PUCCH,2}^{(3)}, n_{PUCCH,3}^{(3)}, n_{PUCCH,4}^{(3)}\}$ including four resources for PUCCH format 3 through higher-layer configuration (e.g., RRC signaling).

In step S2920, when PUCCH format 3 is used for ACK/NACK transmission, the UE may determine whether a situation is a PCell-only-receiving case. If a determination result in step S2920 is NO (i.e., a non-PCell-only-receiving case), step S2830 is performed and if YES (i.e., a PCell-only-receiving case), step S2940 is performed.

In step S2930, the UE may calculate/select one PUCCH resource to be used thereby from among four PUCCH resource candidates $(n_{PUCCH,0}^{(3)}, n_{PUCCH,1}^{(3)}, n_{PUCCH,2}^{(3)}, n_{PUCCH,3}^{(3)})$ using an ARI indicated by reuse of a TPC field in a PDCCH(s) of an SCell, among four PUCCH resource candidates (e.g., four low-index PUCCH resources $n_{PUCCH,0}^{(3)}, n_{PUCCH,1}^{(3)}, n_{PUCCH,2}^{(3)}$, and $n_{PUCCH,3}^{(3)}$) which are predetermined according to a prescribed rule from the five PUCCH resource candidates.

Meanwhile, since a PDCCH is not received on the SCell in step S2940, the UE may select one PUCCH resource according to a predefined rule. The predefined rule may be a rule for selecting the last resource $n_{PUCCH,4}^{(3)}$ from among the five RRC-configured PUCCH resource candidates. It may be defined not to overlap the rule for determining four among five PUCCH resource candidates in step S2930 with the rule for determining one among five PUCCH resource candidates in step S2940. However, in some cases, a rule may be defined such that an overlapped resource candidate is selected.

After step S2930 or step S2940, the UE may transmit ACK/NACK information through PUCCH format 3 using a resource corresponding to the calculated/selected index.

Embodiment 3

Embodiment 3 relates to a method of using a Downlink Assignment Index (DAI) for PUCCH resource allocation in a PCell-only-receiving case (i.e., the case of receiving only a PDSCH(s) for a PCell or the case of receiving a PDCCH(s) only on the PCell).

In the above-described Embodiments 1 and 2, the methods for deriving a resource index for PUCCH format 3 in PCell-only-receiving without additional physical layer signaling (e.g., PDCCH signaling) has been described. Embodiment 3 relates to a method defining and using information capable of performing the function of the ARI among physical layer signals received on a PCell, although the ARI cannot be received on an SCell as in an existing scheme due to absence of a PDCCH on the SCell. Specifically, this embodiment relates to a method of using DAI information included in a PDCCH as ARI information in the PCell-only-receiving case.

A DAI field in the PDCCH is defined in a TDD system and a DAI is assigned with respect to DL allocation (or PDSCH scheduling). When the UE transmits ACK/NACK signals for multiple DL assignments (PDSCHs) in one UL subframe, information about the number of DL assignments (PDSCHs) for which ACK/NACK signals are to be transmitted may be derived from the DAI. For example, when the UE transmits ACK/NACK signals (using ACK/NACK bundling) for multiple DL assignments (PDSCHs) to a BS, the case in which the UE fails to receive (i.e., miss) a part of multiple PDCCHs may occur. At this time, since the UE cannot be aware of the fact that a PDSCH corresponding to a reception-failed PDCCH has been transmitted thereto, an error may occur in ACK/NACK generation. Such a problem may be solved using the DAI. In an existing TDD system, for example, in the case in which one UL subframe corresponds to N DL subframes, if DAIs are sequentially assigned (i.e., sequentially counted) to PDCCHs transmitted in the N DL subframes, the UE is able to know whether previous PDCCHs have been correctly received through DAI information in the PDCCH.

In this embodiment, it is proposed to reuse a DAI as an ARI for determining PUCCH resource assignment in consideration of the case in which the DAI in the PDCCH of a PCell is not used for an original purpose when PUCCH format 3 is used. Specifically, even though PUCCH format 3 is used in the TDD system, DAI information is not needed in operation as ACK/NACK full multiplexing mode in which time-domain bundling or CC-domain (or frequency-domain) bundling is not performed. Accordingly, the DAI field may be reused as the ARI for PCell-only-receiving.

Figure 30:
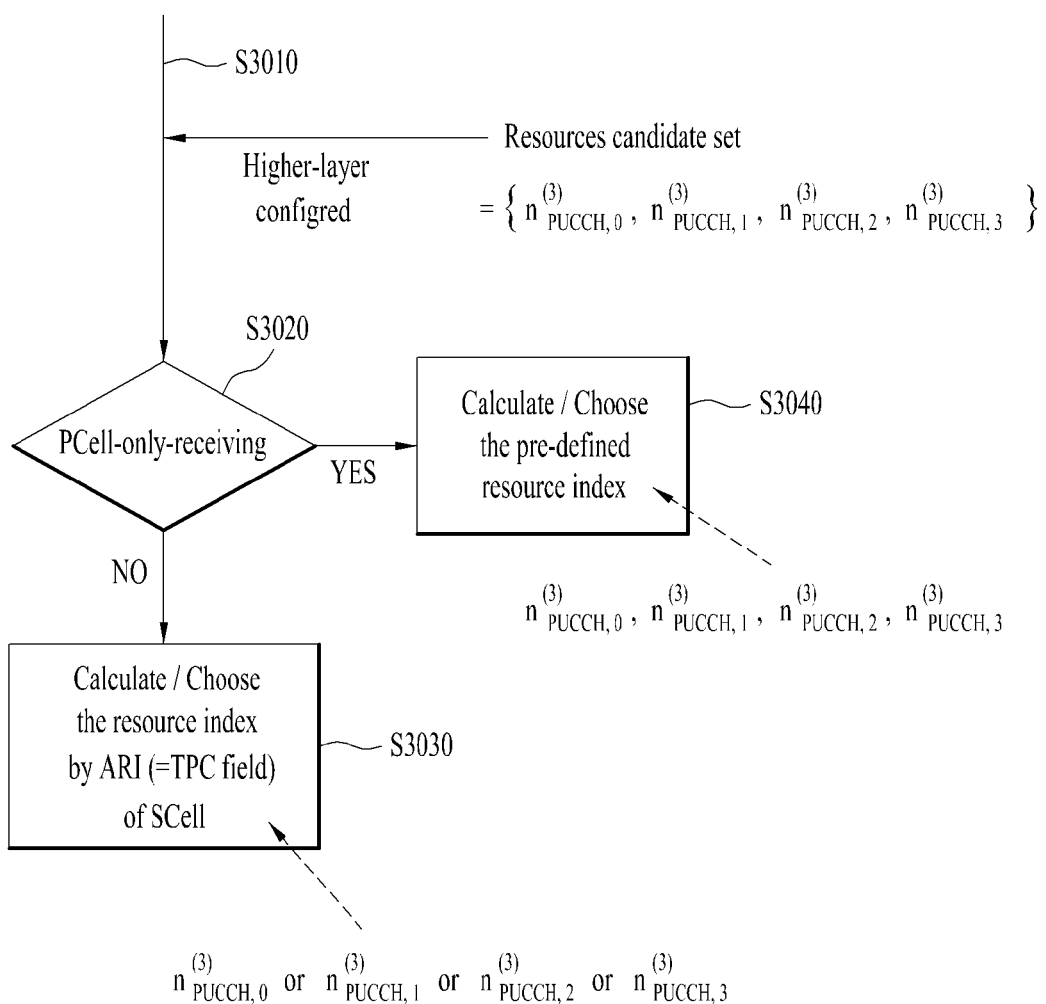
FIG. 30 is a flowchart illustrating an example of using a DAI field as an ARI for PUCCH resource determination in a PCell-only-receiving case.

FIG. 30 is a flowchart illustrating an example of using a DAI field as an ARI for PUCCH resource determination in a PCell-only-receiving case.

In step S3010, a UE may receive a PUCCH resource candidate set $\{n_{PUCCH,0}^{(3)}, n_{PUCCH,1}^{(3)}, n_{PUCCH,2}^{(3)}, n_{PUCCH,3}^{(3)}\}$ including four resources for PUCCH format 3 through higher-layer configuration (e.g., RRC signaling).

In step S3020, when PUCCH format 3 is used for ACK/NACK transmission, the UE may determine whether a situation is a PCell-only-receiving case. If the determination result in step S3020 is NO (i.e., a non-PCell-only-receiving case), step S3030 is performed and if YES (i.e., a PCell-only-receiving case), step S3040 is performed.

In step S3030, the UE may calculate/select one PUCCH resource (i.e., one resource index) to be used thereby from among the four PUCCH resource candidates using an ARI indicated by reuse of a TPC field in a PDCCH(s) of an SCell.

Meanwhile, in step S3040, since the PDCCH is not received on the SCell, the UE may select one PUCCH resource (i.e., one resource index) to be used thereby from among the four PUCCH resource candidates using an ARI indicated by reuse of the DAI field in a PDCCH of a PCell.

After step S3030 or step S3040, the UE may transmit ACK/NACK information through PUCCH format using a resource corresponding to the calculated/selected index.

Embodiment 3-1

Embodiment 3-1 relates to an example of applying the same ARI value in bundling subframes in a PCell-only-receiving case (i.e., the case of receiving only a PDSCH(s) for a PCell or the case of receiving a PDCCH(s) only on the PCell).

The term bundling subframes (or bundling window) used in description of the present invention means one unit consisting of DL subframes when ACK/NACK responses for the DL subframes in a bundling window are transmitted through one UL PUCCH, rather than a unit of really performing bundling in the time domain or CC domain (or frequency domain).

For instance, in an LTE release-8 TDD system, a definition as to which previous DL subframe(s) (subframe n−k) are used to transmit an ACK/NACK response to DL transmissions in a specific UL subframe (subframe n) is given as shown in the above Table 12 (showing a DL related set index K: $\{k_0, k_1, \ldots k_{M-1}\}$). In describing bundling subframes by way of example of Table 12, when an ACK/NACK response to DL transmission in a specific DL subframe(s) is transmitted in a specific UL subframe, the specific DL subframe(s) are referred to as bundling subframes. For example, in UL-DL configuration 4, bundling subframes for UL subframe 2 are DL subframes 12, 8, 7, and 11 and bundling subframes for UL subframe 3 are DL subframes 6, 5, 4, and 7.

If PUCCH format 3 is used in TDD, ACK/NACK responses to DL transmissions in multiple DL subframes may be transmitted through one UL PUCCH as described previously. Here, when one or more PDCCHs are detected in multiple DL subframes in a PCell-only-receiving case according to Embodiment 3, if ARI (or DAI) values indicated by the respective PDCCHs are different, it is unclear which ARI value is used to calculate/select a PUCCH resource.

To prevent this problem, the ARI values (i.e., values of the DAI fields) of PDCCHs transmitted on the PCell in bundling subframes should be identically maintained.

Embodiment 3-2

Embodiment 3-2 relates to an example of applying the same ARI value in bundled CCs. This embodiment may also be applied to a PCell-only-receiving case which may include the case in which a UE cannot detect DL transmission on an SCell(s) and receives DL transmission only on a PCell although a BS has performed DL transmission on the PCell and SCell(s).

The term bundling subframes (or bundling window) used in description of the present invention means one unit consisting of DL CCs when ACK/NACK responses to the DL CCs in a bundling window are transmitted through one UL PUCCH irrespective of presence/absence of bundling, rather than a unit of actually performing bundling in the time domain or CC domain (or frequency domain). For example, when ACK/NACK full multiplexing is applied, bundled CCs may have the same meaning as the number of CCs configured for the UE.

If PUCCH format 3 is used in a TDD or FDD system, the case in which ACK/NACK responses to multiple DL CCs are transmitted through one UL PUCCH may occur as described previously. Here, the meaning of 'ACK/NACK responses to multiple DL CCs are transmitted' may indicate that DL transmission exists in a PCell and one or more SCells. At this time, if an ARI value in a PDCCH of the PCell is different from an ARI value in a PDCCH of the SCell, it is unclear which ARI value is used to calculate/select a PUCCH resource.

Accordingly, to prevent the above problem, a value of a field (DAI field) used for an ARI purpose on the PCell and a value of a field (TPC field) used for an ARI purpose on the SCell should be identically maintained.

Embodiment 3-3

Embodiment 3-3 relates to an example of applying the same ARI value in bundled CCs and subframes.

When both Embodiments 3-1 and 3-2 are considered (e.g., when multiple CCs and multiple subframes are one bundling unit), if ARI values in respective cells or respective subframes are different, calculation/selection of PUCCH resources may be unclear. Therefore, ARI values in PDCCHs in multiple subframes should also be identically maintained in addition to maintenance of equality of the ARI values in the PDCCHs on the PCell and the SCell.

Embodiment 4

Embodiment 4 relates to a method of using a TPC field for PUCCH resource allocation in a PCell-only-receiving case (i.e., the case of receiving only a PDSCH(s) for a PCell or the case of receiving a PDCCH(s) only on the PCell). Embodiment 4 may be applied to both cases in which ACK/NACK full multiplexing is applied or is not applied. Embodiment 4 may also be applied to both cases in which spatial bundling (ACK/NACK bundling for multiple codewords) is applied or is not applied.

In the above Embodiments 3, the method for determining a resource index of a PUCCH resource (e.g., a resource of PUCCH format 3) even in PCell-only-receiving without additional physical layer signaling has been described. Embodiment 3 relates to an example of using the DAI for ARI purpose when the DAI is not used as original usage (usage of indexes sequentially assigned for DL allocation (or PDSCH scheduling)). Accordingly, when PUCCH format 3 is used in the TDD system, if time domain bundling or CC domain (or frequency domain) bundling is supported, DAI information needs to be used for an original purpose in order to generate correct ACK/NACK information.

Accordingly, in Embodiment 4, the DAI is not used for other purposes in a PCell-only-receiving case. The present embodiment 4 proposes a method of reusing a TPC field in a PDCCH(s) on the PCell as an ARI in the PCell-only-receiving case.

In a non-PCell-only-receiving case (i.e., there is PDCCH transmission in an SCell), the TPC field on the SCell is reused for the ARI as mentioned above. However, in the PCell-only-receiving case, since there is no transmission of the TPC field on the SCell, it is necessary to define a new method for transmitting correct ACK/NACK.

According to Embodiment 4, in the PCell-only-receiving case, a TPC field in a specific PDCCH(s) determined according to a predetermined rule on the PCell may be used for an original transmit power control purpose and a TPC field of the another PDCCH(s) may be used for an ARI purpose. The UE may use only a TPC field of a specific PDCCH(s) determined according to a predetermined rule on the PCell for an original power control purpose and, upon receiving the other PDCCH(s) on the PCell, the UE may interpret a TPC field of the corresponding PDCCH(s) as an ARI.

If the TPC field is not used for an original purpose, the UE may miss a PDCCH including the TPC field used for power control or if the BS does not schedule the PDCCH, dynamic control performance for UL transmission power determination of the UE may be slightly reduced. However, the TPC value in the PDCCH is not an absolute value and a relative offset value for previous transmission power. Further, even if the UE does not update the TPC value once or twice, preset transmission power may be maintained. In addition to the transmission power control method using the TPC field in the PDCCH, supplemental power control methods are provided (this departs from the scope of the present invention and, therefore, will not be described in detail). Accordingly, missing of the TPC value does not have a substantial influence on network performance.

In applying the present invention, the TPC fields of one or more PDCCHs on the PCell according to a predetermined rule may be used for an original purpose (power control purpose). Hereinafter, examples of the predetermined rule will be described.

As a first example, a TPC field of a PDCCH transmitted in an n-th subframe of bundling subframes may be defined as being used for an original purpose. Here, n may be a value indicating a partial subframe(s) among the bundling subframes. For example, if one of the bundling subframes is indicated, n may be determined as a value indicating a 0-th subframe or a last subframe. Moreover, n may be differently determined according to the number of bundling subframes (or the size of the bundling subframes). The number of bundling subframes may be, for example, 1, 2, 3, 4, or 9, in a similar manner as indicted in Table 12. Alternatively, a different number of subframes may be bundled according to a newly defined bundling scheme. Furthermore, n may indicate a set of multiple subframes among bundling subframes. For example, when n is 0 and 1, the TPC fields of PDCCHs transmitted in the 0-th and 1-th subframes among the bundling subframes may be used for an original purpose. Thus, if n has a plurality of values, the number of PDCCHs received for a fallback test, which will be described later, is increased by the number of n values. For example, if n has two values, the number of PDCCHs received for the fallback test should be 2. In the following exemplary description of the present invention, n has one value for convenience of description.

As a second example, the TPC field in a PDCCH having an n-th DAI value in bundling subframes may be defined as being used for an original purpose. Here, n may be one of 0, 1, 2, 3, . . . . Alternatively, if the DAI value is interpreted as 1, 2, 3, 4, . . . , n may be determined as one value of 1, 2, 3, 4, . . . . In this case, even in ACK/NACK full multiplexing mode (the case in which time domain or CC domain (or frequency domain) bundling is not applied), the DAI field may be included in a PDCCH(s) on the PCell. Further, n may be determined in the form of a set of multiple values. For example, when n is 0 and 1, this may indicate that the TPC fields in PDCCHs having zeroth and first DAI values are used for an original purpose. Alternatively, when the DAI value is interpreted as starting from 1, if n is 1 and 2, the TPC fields in PDCCHs having the first and second DAI values may be indicated as being used for an original purpose. Thus, when n has a plurality of values, the number of PDCCHs received for a fallback test, which will be described later, is increased by the number of n values. For example, if n has two values, the number of PDCCHs received for the fallback test should be 2. In the following description of the present invention, n has one value as an example for convenience of description.

In the above second example, the DAI value may mean successive (sequential) counters for a PDCCH(s) allocated with a size of two bits to the UE. An actually transmitted value of the DAI field may be one of 0, 1, 2, and 3 (or 00, 01, 10, and 11 when expressed as a 2-bit value) which may be interpreted by the UE as DAI values 1, 2, 3, and 4. This will be described as follows in terms of a DAI value actually transmitted and a DAI value interpreted by the UE.

An actually transmitted value of the DAI field may be 0, 1, 2, or 3 and the UE may interpret the value as a 1st, 2nd, 3rd, or 4th PDCCH. In this case, in terms of the actually transmitted DAI value, n=0 (among a set of 0, 1, 2, and 3) in a specific UE indicates the first PDCCH.

An actually transmitted value of the DAI field may be 0, 1, 2, or 3 and the UE may interpret the value as a 1st, 2nd, 3rd, or 4th PDCCH. In this case, in terms of the DAI value interpreted by the UE, n=1 (among a set of 1, 2, 3, and 4) in a specific UE indicates the first PDCCH.

In summary, the actual DAI field values 00, 01, 10, and 11 included in the PDCCHs may be mapped to the DAI values 1, 2, 3, 4 interpreted by the UE, respectively.

As described in the above examples, a TPC field in a PDCCH(s) of an n-th subframe or a PDCCH(s) of DAI=n, determined by the value of n, is used for an original purpose (power control) and a TPC field in the other PDCCH(s) may be reused as an ARI.

Figure 31:
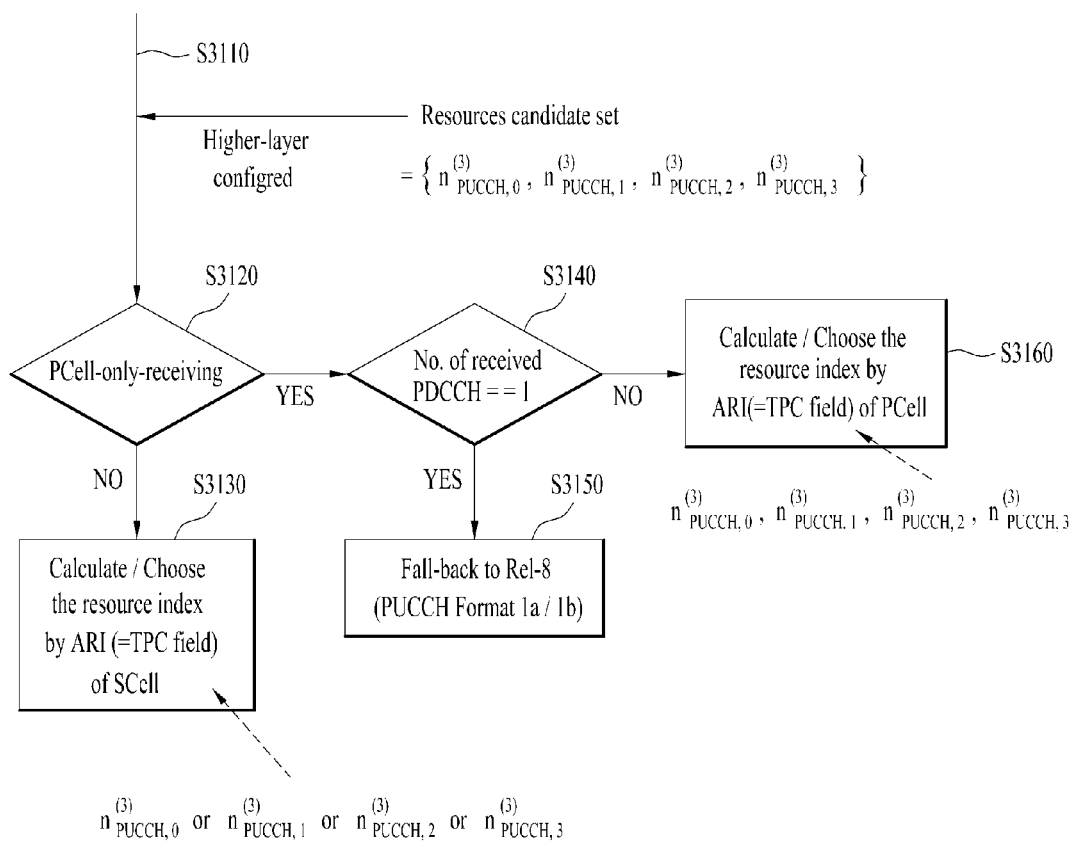
FIG. 31 is a flowchart illustrating an example of using a TPC field as an ARI for PUCCH resource determination in a PCell-only-receiving case.

FIG. 31 is a flowchart illustrating an example of using a TPC field as an ARI for PUCCH resource determination in a PCell-only-receiving case. In an example of FIG. 31, it is assumed that a TPC field of one specific PDCCH determined according to predefined rule is used for an original purpose and a TPC field of the other PDCCH(s) is reused as an ARI.

In step S3110, a UE may receive a PUCCH resource candidate set $\{n_{PUCCH,0}^{(3)}, n_{PUCCH,1}^{(3)}, n_{PUCCH,2}^{(3)}, n_{PUCCH,3}^{(3)}\}$ including four resources for PUCCH format 3 through higher-layer configuration (e.g., RRC signaling).

In step S3120, when PUCCH format 3 is used for ACK/NACK transmission, the UE may determine whether a situation is a PCell-only-receiving case. If a determination result in step S3120 is NO (i.e., a non-PCell-only-receiving case), step S3130 is performed and if YES (i.e., a PCell-only-receiving case), step S3140 is performed.

In step S3130, the UE may calculate/select one PUCCH resource (i.e., one resource index) to be used thereby from the four PUCCH resource candidates using an ARI indicated by reuse of a TPC field in a PDCCH(s) of an SCell.

Meanwhile, in step S3140, the UE may determine whether the number of received PDCCHs is 1. Since step S3140 is performed when PDCCHs are not received on the SCell, the number of received PDCCHs indicates the number of PDCCHs received on the PCell. If a determination result in step S3140 is YES (i.e., the number of PDCCHs received on the PCell is 1), step S3150 is performed and, if the determination result in step S3140 is NO (i.e., the number of PDCCHs received on the PCell is greater than 1), step S3160 is performed.

In step S3150, if the UE receives only one PDCCH on the PCell, the UE may use a TPC field of the PDCCH for an original purpose (power control) and, since there are no other PDCCHs, the UE may determine that an ARI value is not received. In this case, it is defined that the UE operates in legacy LTE release-8 mode. This may be referred to as operation in fallback mode. The fallback mode is the same as an ACK/NACK transmission operation using a conventionally defined PUCCH format 1a/1b and, therefore, a detailed description thereof will be omitted. Determination as to whether the number of received PDCCHs is 1 in step S3140 may be referred to as a fallback test in that whether to apply fallback mode is determined.

Meanwhile, since step S3160 is performed when the number of PDCCHs received on the PCell is greater than 1, the UE may use a TPC field in one of the PDCCHs for an original use purpose and may interpret a TPC field of the other PDCCH(s) as being used for an ARI. Then the UE may calculate/select one PUCCH resource (i.e., one resource index) to be used thereby from among the four PUCCH resource candidates using the ARI indicated by reuse of the TPC field in the PDCCH of the PCell.

After step S3130 or step S3160, the UE may transmit ACK/NACK information through PUCCH format 3 using a resource corresponding to the calculated/selected index.

In the illustrated example of FIG. 31, a description has been given under the assumption that the UE checks only the number of received (or detected) PDCCHs and the TPC field of the corresponding PDCCH is used for an original purpose when the number of received PDCCHs is 1.

However, if the number of received PDCCHs is 1, a TPC field of the PDCCH may be used for an original purpose or may be reused for an ARI purpose. Accordingly, when the number of received PDCCHs is 1, the fallback mode operation is not always performed and it is preferable that detailed determination be performed.

Figure 32:
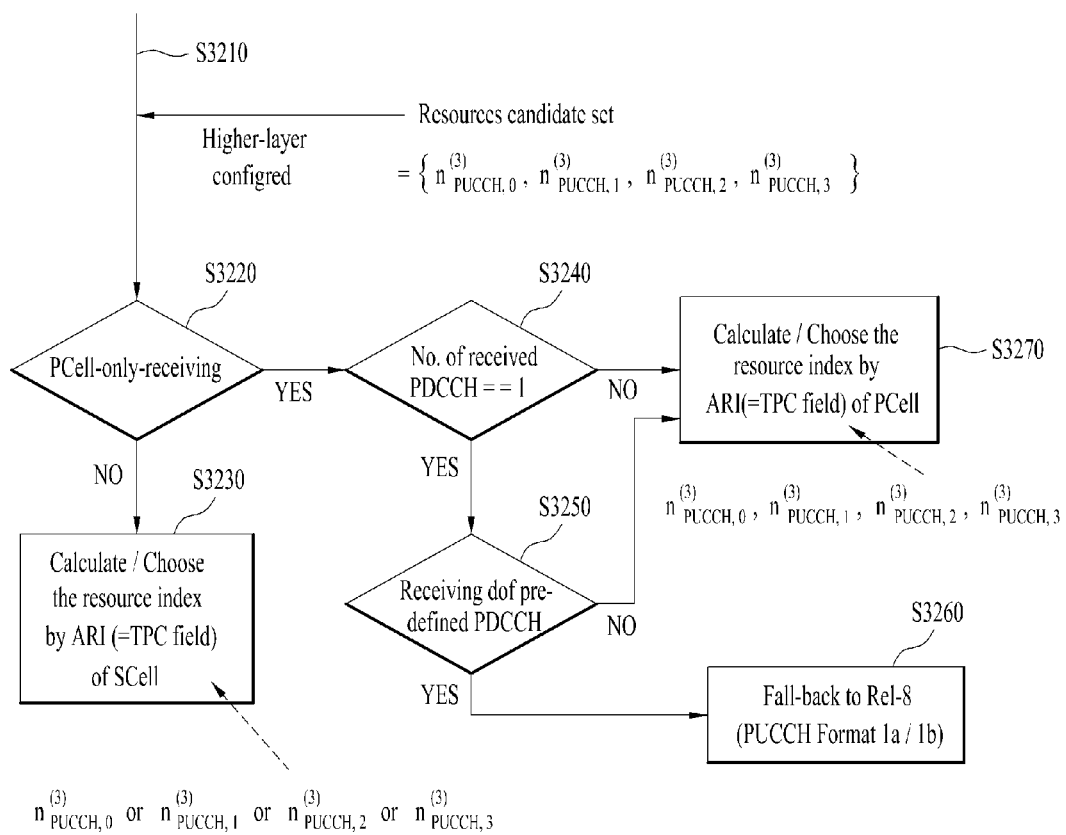
FIG. 32 is a flowchart illustrating another example of using a TPC field as an ARI for PUCCH resource determination in a PCell-only-receiving case.

FIG. 32 is a flowchart illustrating another example of using a TPC field as an ARI for PUCCH resource determination in a PCell-only-receiving case. In an example of FIG. 31, it is assumed that a TPC field of one specific PDCCH determined according to a predefined rule is used for an original purpose and a TPC field of the other PDCCH(s) is reused as an ARI.

In the illustrated example of FIG. 32, the description of the same operations (steps S3210, S3220, S3230, and S3240) as those of FIG. 31 is omitted.

Step S3250 is performed when a determination result of step S3240 is YES (i.e., when the number of PDCCHs received on the PCell is 1). In Step S3250, it is determined whether the one received PDCCH is a predefined PDCCH (i.e., whether the TPC field of the PDCCH is used for an original purpose). For example, it may be determined whether the received PDCCH is a PDCCH in the first subframe of bundling subframes. As another example, it may be determined whether the received PDCCH is a PDCCH with having a DAI value of 1 (hereinafter, DAI=1). If a determination result is YES, step S3260 is performed and, if NO, step S3270 is performed.

In step S3260, since the TPC field in one received PDCCH should be used for an original purpose, the UE may consider the ARI unknown and may operate in fallback mode (ACK/NACK transmission using PUCCH format 1a/1b).

Step S3270 may be performed when the result of step S3240 is NO. Namely, if the number of received PDCCHs is greater than 1, since it is assumed that there is only one PDCCH in which a TPC field is used for an original purpose, the UE may recognize that a TPC field of at least one PDCCH is reused as the ARI. The UE may calculate/select one PUCCH resource (i.e., one resource index) to be used thereby among the four PUCCH resource candidates using the ARI value from the TPC field of the corresponding PDCCH.

Step S3270 may also be performed when a determination result of step S3250 is NO. That is, if the number of received PDCCHs is 1, since the corresponding PDCCH is not a PDCCH in which the TPC field is used for an original purpose, the UE may recognize that the TPC field of the corresponding one PDCCH is reused for the ARI. The UE may calculate/select one PUCCH resource (i.e., one resource index) to be used thereby among the four PUCCH resource candidates using the ARI value from the TPC field of the corresponding PDCCH.

After step S3270, the UE may transmit ACK/NACK information through PUCCH format 3 using a resource corresponding to the calculated/selected index.

Embodiment 4-1

Embodiment 4 relates to an example of applying the same ARI value in bundling subframes in a PCell-only-receiving case (i.e., the case of receiving only a PDSCH(s) for a PCell or the case of receiving a PDCCH(s) only on the PCell).

The term bundling subframes (or bundling window) used in description of the present invention means one unit consisting of DL subframes when ACK/NACK responses to DL transmissions in the DL subframes in a bundling window are transmitted through one UL PUCCH, rather than a unit of actually performing bundling in the time domain or CC domain (or frequency domain).

For example, in an LTE release-8 TDD system, a definition as to which previous DL subframe(s) (subframe n–k) are used to transmit ACK/NACK responses to DL transmissions in a specific UL subframe (subframe n) is given as shown in the above Table 12 (showing a DL related set index K: $\{k_0, k_1, \ldots k_{M-1}\}$). In describing bundling subframes by way of example of Table 12, when ACK/NACK responses to DL transmissions in a specific DL subframe(s) is transmitted in a specific UL subframe, the specific DL subframe(s) is referred to as bundling subframes. For example, in the UL-DL configuration 4, bundling subframes for UL subframe 2 are DL subframes 12, 8, 7, and 11 and bundling subframes for UL subframe 3 are DL subframes 6, 5, 4, and 7.

If PUCCH format 3 is used in TDD, ACK/NACK responses to DL transmissions in multiple DL subframes may be transmitted through one UL PUCCH as described previously. Here, a plurality of PDCCHs is detected in multiple DL subframes in a PCell-only-receiving case according to the above-described Embodiment 4. If ARI (or TPC) values indicated by the PDCCHs having TPC fields reused as ARIs are different, it is ambiguous which ARI value is used to calculate/select a PUCCH resource.

Here, PDCCHs having TPC fields reused as ARIs may correspond to PDCCHs (e.g., PDCCHs with a DAI value greater than 1 (hereinafter, referred to as DAI>1) except for a PDCCH having a TPC field determined to be used for an original purpose according to a predefined rule (e.g., a PDCCH with DAI=1).

Accordingly, to prevent this problem, the ARI values (i.e., values of the TPC fields) of PDCCHs having TPC fields reused as ARIs (i.e., PDCCHs except for a PDCCH having a TPC field used for an original purpose), transmitted on the PCell in bundling subframes, should be identically maintained.

Embodiment 4-2

Embodiment 4-2 relates to an example of applying the same ARI value on bundled CCs.

The term bundled CCs (or bundling window) used in description of the present invention means one unit consisting of DL CCs when ACK/NACK responses to the DL CCs in a bundling window are transmitted through one UL PUCCH irrespective of presence/absence of bundling, rather than a unit of actually performing bundling in the time domain or CC domain (or frequency domain). For example, when ACK/NACK full multiplexing is applied, bundled CCs may have the same meaning as the number of CCs configured for the UE.

If PUCCH format 3 is used in a TDD or FDD system, ACK/NACK responses to multiple DL CCs may be transmitted through one UL PUCCH as described previously. Here, the meaning that ACK/NACK responses to multiple DL CCs are transmitted may correspond to the case in which DL transmissions exist on a PCell and one or more SCells. At this time, if an ARI value in a PDCCH having a TPC field used as an ARI on the PCell is different from an ARI value in a PDCCH on the SCell, it is ambiguous which ARI value is used to calculate/select a PUCCH resource.

Accordingly, to prevent such a problem, the value of the field (TPC field) used as the ARI on the PCell and the value of the field (TPC field) used as the ARI on the SCell should be identically maintained.

Here, ARI values for PDCCHs (e.g., PDCCHs with DAI>1), except for a PDCCH determined to use a TPC field for an original purpose according to a predefined rule (e.g., a PDCCH with DAI=1), on the PCell and ARI values on the SCell may be identically maintained.

Embodiment 4-3

Embodiment 4-3 relates to an example of applying the same ARI value in bundled CCs and subframes.

Namely, when the above-described Embodiments 4-1 and 4-1 are simultaneously considered (e.g., when a plurality of CCs and a plurality of subframes becomes one bundling unit), if ARI values in the respective cells or respective subframes are different, it may be ambiguous to calculate/select a PUCCH resource. Accordingly, ARIs in PUCCHs on the PCell and SCell should be identically maintained and simultaneously ARIs in PDCCHs in the plurality of subframes should be identically maintained.

Here, on the PCell, ARI values for PDCCHs (e.g., PDCCHs with DAI>1), except for a PDCCH determined to use a TPC field for an original purpose according to a predefined rule (e.g., a PDCCH with DAI=1), may be identically maintained.

Figure 33:
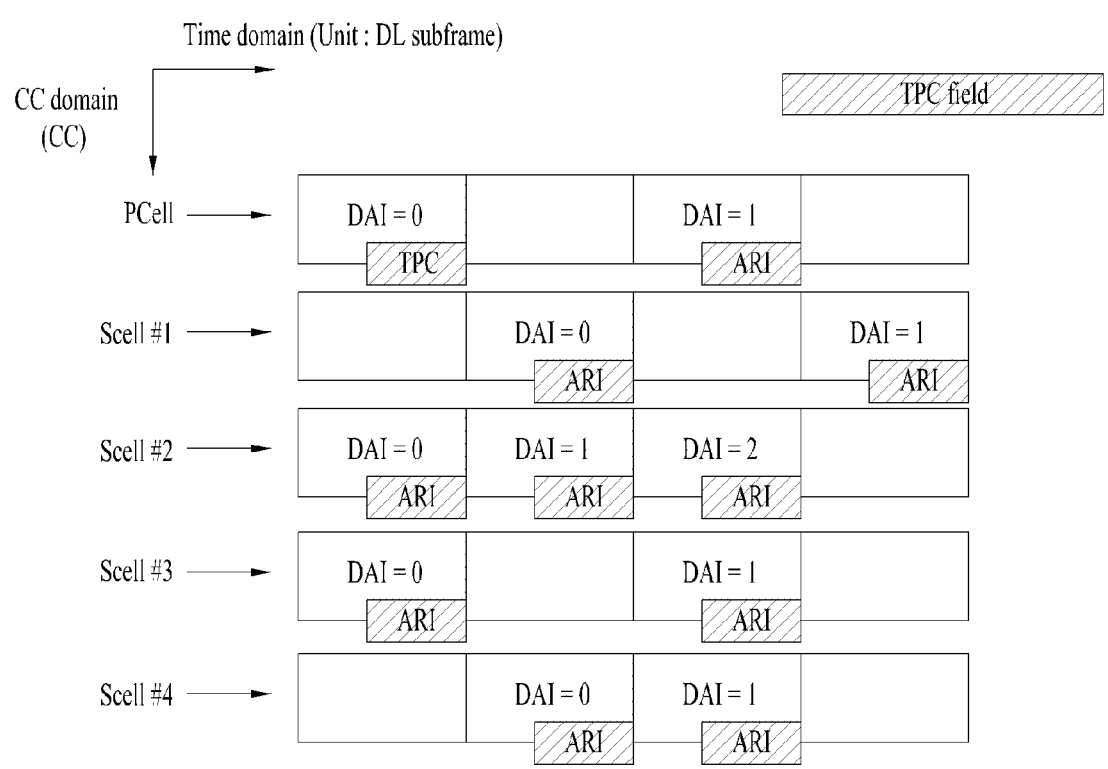
FIG. 33 is a diagram illustrating an embodiment of using a TPC field for an original purpose or an ARI purpose according to a DAI value on a PCell.

FIG. 33 is a diagram illustrating an embodiment of using a TPC field for an original purpose or an ARI purpose according to a DAI value on a PCell.

A DAI field value is used as an accumulation counter of PDCCHs per cell. That is, a DAI value is sequentially increased by one in every PUCCH of one cell. The PDCCH is not always present in all subframes.

In the illustrated example of FIG. 33, on a PCell, PDCCHs for DL allocation are present in first and third subframes. The DAI value is 0 in the PDCCH of the first subframe and is 1 in the PDCCH of the third subframe. On SCells, DAI values are sequentially given in PDCCHs for DL allocation. In FIG. 33, DAI values of 0, 1, 2, 3, 0, 1, 2, 3, . . . are illustrated but these values have the same meaning as DAI values of 1, 2, 3, 4, 1, 2, 3, 4, . . . from the viewpoint of the UE.

In relation to the above-described Embodiment 4, TPC fields in the PDCCHs may be used for an original purpose or an ARI purpose according to a DAI value on the PCell. For example, a TPC field in a PDCCH in which the DAI value on the PCell is 0 (or 1 from the viewpoint of the UE), i.e., a TPC field in a PDCCH in the first subframe of the PCell in FIG. 33, is used for an original purpose (i.e., power control) and a TPC field in the other PDCCH on the PCell is reused for an ARI purpose.

In relation to the above-described Embodiments 4-1 to 4-3, ARI values in bundled subframes and/or bundled cells may be identically maintained. For example, if a bundling window is applied over four subframes and five cells in the illustrated example of FIG. 33, the UE may assume that values of TPC fields of PDCCHs on the PCell and SCells (i.e., TPC fields used for an ARI purpose) are the same, except for the TPC field in the first subframe (where DAI is 0) of the PCell.

Embodiment 5

Embodiment 5 relates to a method of using a TPC field for PUCCH resource allocation in a PCell-only-receiving case (i.e., the case of receiving only a PDSCH(s) for a PCell or the case of receiving a PDCCH(s) only on the PCell). Embodiment 5 is applied to partial ACK/NACK bundling. Partial bundling refers to bundling only in a time domain or in a CC domain (or frequency domain).

A DAI field is basically used for an original purpose (i.e., for an accumulation counter of PDCCHs on each cell) as in the above Embodiment 4 and a TPC field in a PDCCH may be reused as an ARI. In this case, a TPC field of a predetermined specific PDCCH is used for an original purpose. The specific PDCCH may be determined as a PDCCH of an n-th subframe in bundling subframes (this part has been described in the above Embodiment 4 and, therefore, a repeated description is omitted). Alternatively, a PDCCH in which a TPC field is used for an original purpose may be determined based on a DAI value.

The above examples of FIG. 31 or 32 may be substantially identically applied to Embodiment 5 as a basic operation and a repeated description which has been given in the above Embodiment 4 is omitted.

Hereinafter, a detailed method of using the TPC field for an original purpose or an ARI purpose based on a DAI value when partial ACK/NACK bundling is applied will be described.

First, a TPC field in a PDCCH having an n-th DAI value in bundling subframes of a PCell may be defined as being used for an original purpose. Values of the DAI fields may be given as 0, 1, 2, 3, . . . or may be given as 1, 2, 3, 4, . . . from the viewpoint of the UE.

In this case, in an ACK/NACK partial bundling mode (applied to time domain bundling or CC domain (or frequency domain) bundling), DAI fields may be included in a PDCCH(s) on the PCell. Here, values of the DAI fields included in the PDCCH(s) of the PCell should be determined based on a predetermined rule and a detailed proposal of the present invention therefor will be described hereinbelow.

When ACK/NACK partial bundling is applied, if a TPC field in a PDCCH of DAI=n is used for an original purpose (power control), a DAI field of a PDCCH(s) may be determined in a various manner as follows.

Figure 34:
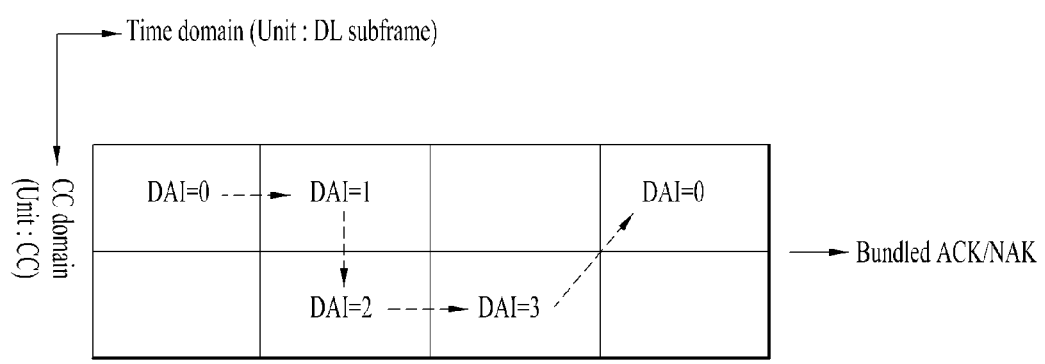
FIG. 34 is a diagram illustrating an example of increasing a DAI value in ascending order of CC index in a bundling window.

In legacy (LTE release-8) TDD mode, a DAI indicates an accumulated value of PDCCHs allocated to a UE and, if the DAI is simply applied to a multicarrier environment, the DAI may be used as an accumulated value of PDCCHs allocated to the UE over all cells (or CCs). For example, as shown in FIG. 34, when ACK/NACK bundling is applied in four subframes and on two CCs, the DAI value may be determined such that the DAI value is increased in the direction that a CC index in a bundling window is increased. However, it is difficult to apply this scheme to partial bundling. Accordingly, in LTE release-10 TDD mode in which a plurality of CCs (or cells) is configured, another method for determining the DAI value needs to be provided.

FIG. 35, including view (a) and view (b), is a diagram illustrating examples for determining DAI values in a CA TDD system.

As an example, a DAI value may indicate the accumulated number of PDCCHs allocated to the UE in a plurality of subframes per cell (FIG. 35(a)). For example, such a method for determining the DAI value is preferably used when bundling is applied in the time domain. The accumulated number of PDCCHs may be applied in a manner of counting PDCCHs in all subframes in one radio frame. Alternatively, the accumulated number of PDCCHs may be applied in a manner of counting PDCCHs in a real bundling window (a unit for actually performing ACK/NACK bundling) in the time domain. In the example of FIG. 35(a), DAIs in PDCCHs in three subframes in a real bundling window of a unit of four subframes on SCell #2 are determined as 0, 1, and 2 and this is an example of using DAI fields as accumulation counters indicating that corresponding PUCCHs are a first PDCCH, a second PDCCH, and a third PDCCH, respectively.

As another example, a DAI value may indicate the total number of PDCCHs allocated to the UE on a plurality of CCs (or cells) per subframe (FIG. 35(b)). For example, such a DAI value determination method is preferably used when partial bundling is applied in the CC domain. The total number of PDCCHs may be determined as the number of PDCCHs in all CCs configured for the UE. Alternatively, the total number of PDCCHs may be determined as the number of PDCCHs in a real bundling window (a unit for really performing ACK/NACK bundling) in the CC domain. In the example of FIG. 35(b), the DAI value in PDCCHs in the first subframe is 2 and this is an example of using a DAI field as an indicator indicating the total number of PDCCHs in the corresponding subframe is 3.

Alternatively, the DAI value may be determined as the accumulated counter of PDCCHs allocated to the UE in a plurality of CCs (or cells) per subframe. The accumulated number of PDCCHs may be counted for every PDCCH according to an increased order of a CC index (or a cell index) in all CCs configured for the UE or according to an increased order of CC indexes (or cell indexes) in a real bundling window in the CC domain. For instance, in the example of FIG. 35(b), DAI values in the third subframe are determined as DAI=0 on a PCell, DAI=1 on SCell #2, DAI=2 on SCell #3, and DAI=3 on SCell #4.

As illustrated in FIG. 35(a), if the DAI is used as the accumulation counter of PDCCHs allocated in a real bundling window in the time domain (i.e., if the DAI value is reset on each CC), the embodiment of the present invention using the TPC fields of PDCCHs on a PCell and SCells, except for a PDCCH having a specific DAI value (e.g., DAI=0) on the PCell, for an ARI purpose may be identically applied.

Meanwhile, as illustrated in FIG. 35(b), if the DAI is used as the total number (or accumulation counter) of PDCCHs allocated in a real bundling window in the CC domain (or frequency domain), the embodiment of the present invention using the TPC fields of PDCCHs on a PCell and SCells, except for a PDCCH having a specific DAI value (e.g., DAI=0) on the PCell, for an ARI purpose may be difficult to apply.

For example, it may be assumed that PDCCHs are allocated to a specific UE in the first subframe and the second subframe and PDCCHs are not allocated on SCells. Although this case corresponds to PCell-only-receiving, DAI values of the PDCCHs received by the UE are the same in the two subframes (e.g., DAI=0) (if the DAI field is used as an indicator or accumulation counter of the total number of PDCCHs in a corresponding subframe, a DAI value is 0 according to the above assumption). Then, it is ambiguous for the UE to determine which TPC field of a PDCCH of the two PDCCHs on the PCell is used for an ARI purpose and which TPC field of a PDCCH is used for an original purpose. In other words, if the DAI value is determined by the reset scheme of the DAI value per subframe, the embodiment of the present invention of using the TPC fields of PDCCHs on a PCell and SCells, except for a PDCCH having a specific DAI value (e.g., DAI=0) on the PCell, for an ARI purpose cannot be applied.

To solve the above problem, different DAI value determination methods may be applied on the PCell and SCell. For example, on the SCell, the DAI may be used as an accumulation counter of PDCCHs allocated in a real bundling window in the frequency domain (or CC domain) and, on the PCell, the DAI may be used as an indicator (or accumulation counter) of the total number of PDCCHs allocated in a real bundling window in the time domain.

Alternatively, to apply the present embodiment, it is necessary to define the DAI at least on the PCell as an accumulation counter of PDCCHs in the time domain. Accordingly, the DAI of the PDCCH(s) on the PCell may be used as the accumulation counter of the PDCCH allocated in a real bundling window in the time domain and the DAI of a PDCCH(s) on the SCell may be used in the same or different manner as or from the DAI used on the PCell.

In the examples of the present invention which will be described hereinbelow, it is assumed that a DAI field of a PDCCH is used as follows.

First, a DAI field in a PDCCH may be used as an accumulation counter of PDCCHs allocated in a plurality of subframes in a bundling window per CC. That is, DAI values are independently determined on each CC. Here, bit values 0, 1, 2, and 3 of the DAI field indicate accumulation counts 1, 2, 3, and 4, respectively. That is, bit values expressed as 0, 1, 2, and 3 from the viewpoint of the DAI field may also be expressed as 1, 2, 3, and 4 from the viewpoint of a DAI value interpreted by the UE.

Next, the DAI field of the PDCCH may also be used an indicator of the total number of PDCCHs allocated on a plurality of CCs in a bundling window in each subframe. The bit values 0, 1, 2, and 3 of the DAI field may mean the total numbers 1, 2, 3, and 4, respectively. That is, bit values expressed as 0, 1, 2, and 3 from the viewpoint of the DAI field may also be expressed as 1, 2, 3, and 4 from the viewpoint of the UE.

FIGS. 36 to 39 illustrate various examples of using DAI fields in CC domain bundling. In the examples of FIGS. 36 to 39, five CCs configured for a UE and a 4 DL-1UL configuration in TDD (i.e., ACK/NACK responses to DL transmissions in four DL subframes are gathered to transmit the responses through a PUCCH of one UL subframe) are illustrated. In addition, in the illustrated examples of FIGS. 36 to 39, a bundling window includes five CCs and four subframes. However, the cases in which the maximum size of a real bundling window is 4, 5, or 2 are illustrated in FIGS. 36 to 39.

Figure 36:
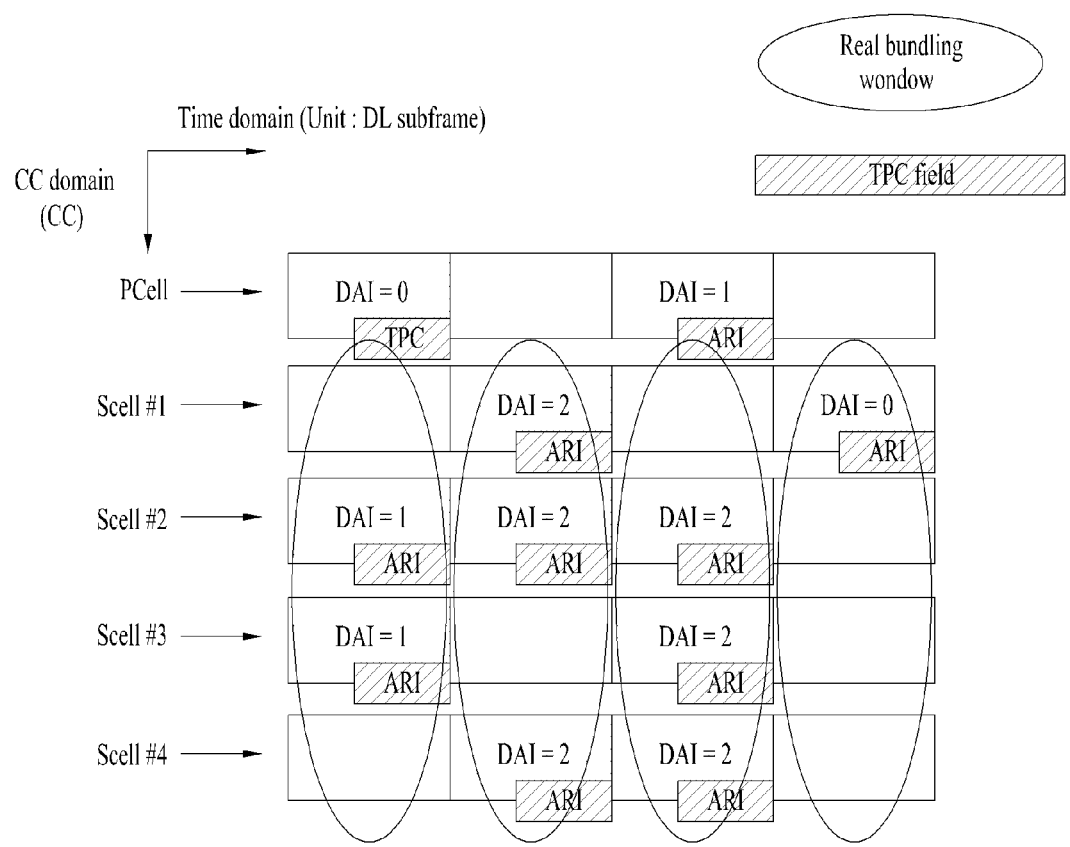
FIGS. 36 to 39 illustrate various examples of using DAI fields in CC domain bundling.

FIG. 36 illustrates an example in which CC domain bundling is not applied on a PCell (the maximum size of a real bundling window in the CC domain is 4). In this case, a DAI field of the PCell is used as an accumulation counter of PDCCHs allocated to subframes on the PCell. A DAI field of an SCell may be used as indicators of the total number of PDCCHs allocated to SCells except for the PCell in each subframe.

Figure 37:
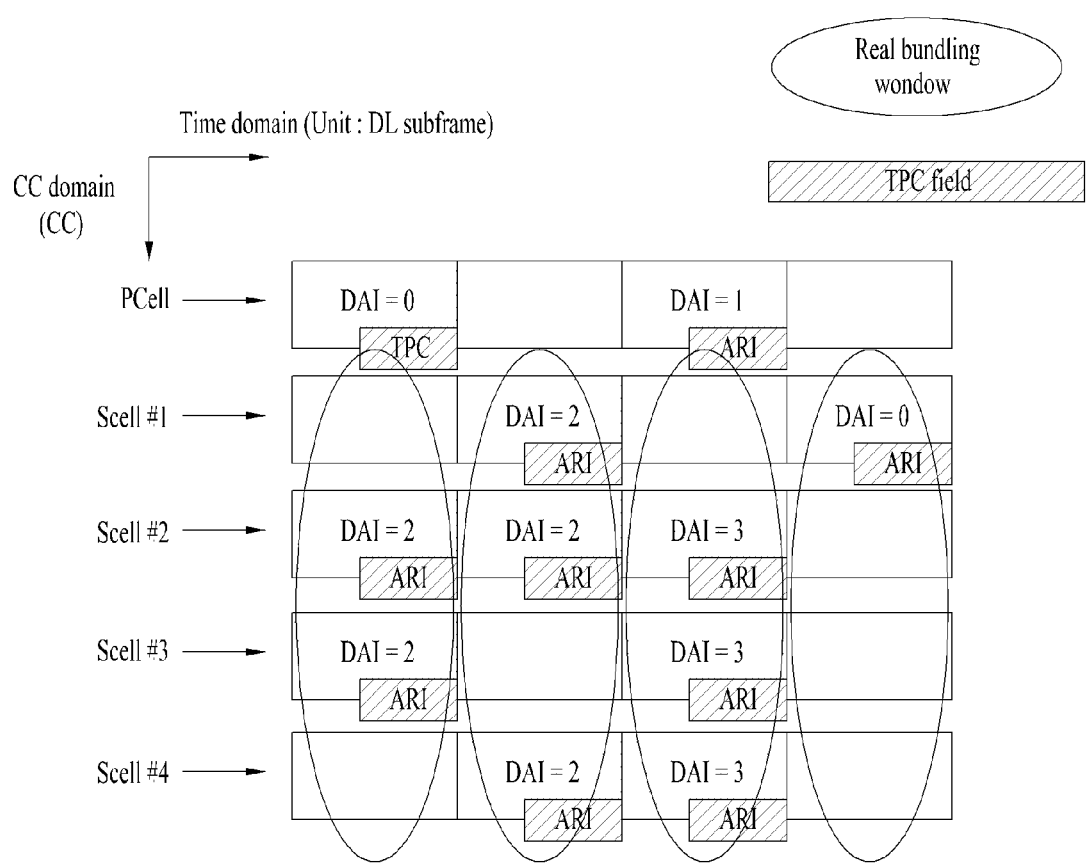

FIG. 37 illustrates an example in which CC domain bundling is not applied on a PCell (the maximum size of a CC-domain real bundling window is 4). In this case, a DAI field of the PCell is used as an accumulation counter of PDCCHs allocated to subframes on the PCell. A DAI field of an SCell may be used as an indicator of the total number of PDCCHs allocated to the PCell and SCells in each subframe. Accordingly, the UE can be aware of the total number of PDCCHs allocated by the BS (i.e., the total number of PDCCHs on both the PCell and the SCell) in a corresponding subframe from the DAI of the SCell. The UE may determine whether there is a PDCCH that the UE fails to detect/receive in a real bundling window, using the DAI of the PCell together with information about the total number of the allocated PDCCHs. Therefore, CC-domain ACK/NACK bundling in a corresponding subframe can be effectively performed.

For example, in the illustrated example of FIG. 37, if a DAI value in PDCCHs detected by the UE on SCells in the second subframe is 2, the UE can recognize that the total number of PDCCHs allocated on the PCell and SCells is 3. Here, it may be assumed that the UE does not receive a PDCCH in SCell#2. In this case, it cannot determined only by the DAI value on the SCells whether the PDCCH which is not received is a PDCCH in a real bundling window (i.e., on the SCell) or a PDCCH in a window (i.e., on the PCell) except for the real bundling window. Because a DAI value on the PCell is given as an accumulation count in the time domain, the UE may confirm that DAI values are sequentially provided in the first and third subframes on the PCell and thus confirm that there is no PDCCH that the UE fails to detect on the PCell. Consequently, the UE can be aware of the fact that PDCCH detection fails in one of the SCells in the second subframe.

Figure 38:
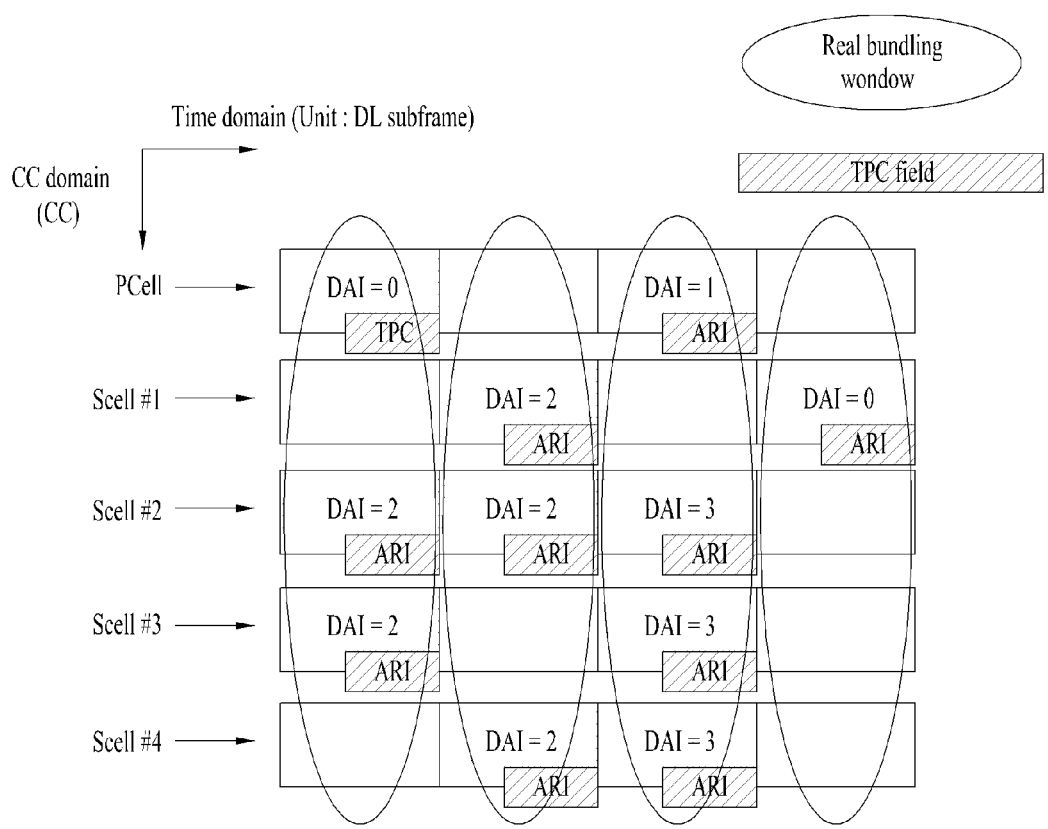

FIG. 38 illustrates an example in which CC domain bundling is applied irrespective of a PCell or SCells (the maximum size of a CC-domain real bundling window is 5). In this case, a DAI field of the PCell is used as an accumulation counter of PDCCHs allocated to subframes on the PCell. A DAI field of an SCell may be used to indicate the total number of PDCCHs allocated on both the PCell and the SCell in each subframe. Accordingly, the UE can be aware of the total number of PDCCHs allocated by the BS (the total number of PDCCHs in both the PCell and the SCell) in a subframe by the DAI of the SCell. Since the DAI value indicates the number of PDCCHs in a real bundling window, the UE may determine whether there is a PDCCH that the UE fails to detect/receive in the real bundling window. Hence, CC-domain ACK/NACK bundling in a corresponding subframe can be effectively performed.

Figure 39:
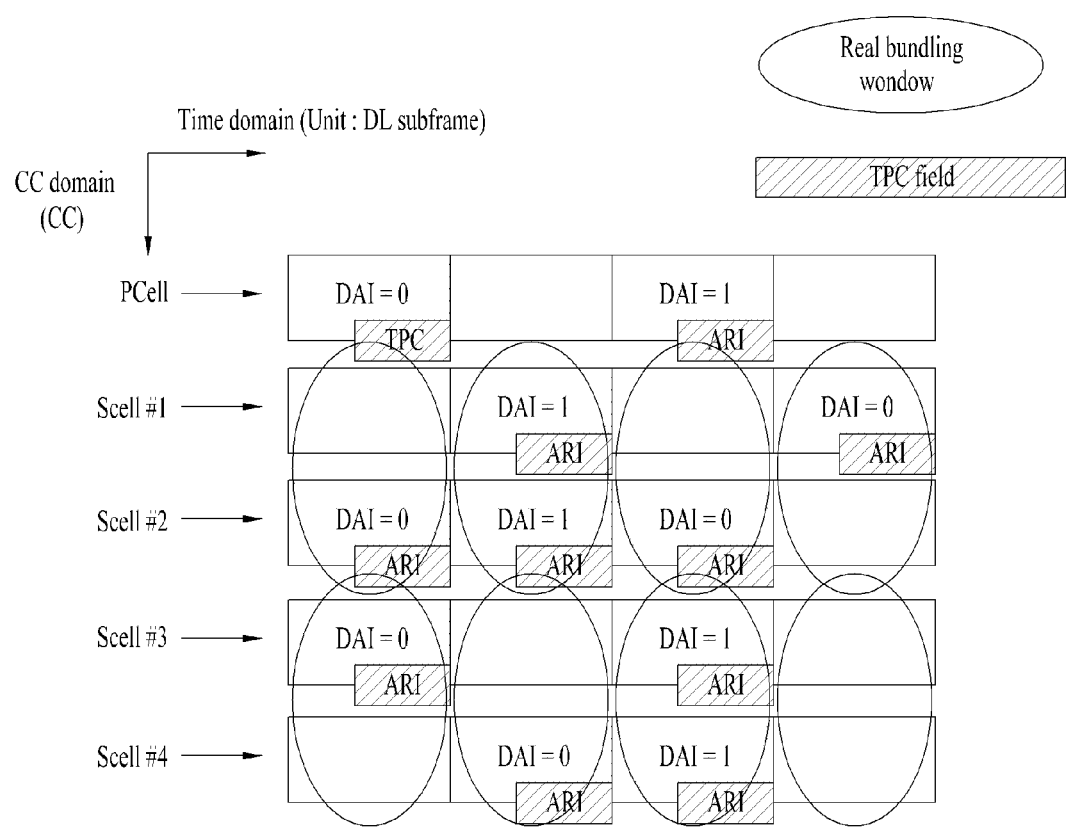

FIG. 39 illustrates the case in which the maximum size of a CC-domain real bundling window is 2. At this time, CC-domain bundling is not applied on a PCell and two real bundling windows having the maximum size of 2 may be configured on four SCells. A DAI field of the PCell is used as an accumulation counter of PDCCHs allocated to subframes on the PCell. A DAI field of the SCell may be used as an indicator of the total number of PDCCHs allocated on the SCells (a maximum of two SCells) in a real bundling window except for the PCell in each subframe.

ACK/NACK partial bundling (bundling in the time domain or frequency domain) is applied to Embodiment 5 and, even in this case, the ACK/NACK bundling operation may be unclear when ARI (=TPC field) values in a bundling window are different.

Accordingly, in a PCell-only-receiving case, ARI values of PDCCHs in which TPC fields on a PCell in bundled subframes are reused for an ARI purpose (i.e., except for a PDCCH in which a TPC is used for an original purpose) can be identically maintained. In addition, on bundled CCs, values of fields (=TPC fields) used for an ARI purpose on a PCell can be identically maintained with values of fields (=TPC fields) used for an ARI purpose) on an SCell. Further, on bundled CCs and subframes, ARI values for PDCCHs (e.g., PDCCHs with DAI>1), except for a PDCCH determined to use a TPC field for an original use according to a predefined rule (e.g., PDCCH with DAI=1), on a PCell can be identically maintained. In association therewith, the principle of the present invention described in the above Embodiments 4-1 to 4-3 may be applied in the same manner to the present Embodiment 5. For clarity, description of repetitive parts is omitted.

UL ACK/NACK Transmission for DL SRS Transmission in Multicarrier Support System

The LTE release-8 system supports SPS. If DL SPS transmission is activated, time/frequency resource for SPS transmission may be pre-allocated by a PDCCH and a PDSCH without a corresponding PDCCH may be transmitted through the allocated resource.

ACK/NACK feedback related to SPS may be divided into two types. One type is that ACK/NACK feedback for 'PDCCH indicating DL SPS release detected by a UE within a subframe(s) n–k' is transmitted in subframe n. The other type is that ACK/NACK feedback for 'PDSCH transmissions without a corresponding PDCCH within a subframe(s) n–k' is transmitted in subframe n. The first type corresponds to the case in which if a PDCCH is present in an (n–k)-th subframe(s) (where k may be one or multiple values), ACK/NACK feedback for the PDCCH is transmitted in an n-th subframe. The second type corresponds to the case in which if SRS transmission is received in an (n–k)-th subframe(s) without an additional PDCCH after SPS activation, ACK/NACK feedback for corresponding SPS transmission is regularly transmitted in an n-th subframe. For a detailed description related to SPS transmission, reference may be made to a document of 3GPP TS 36.213.

A PUCCH resource index for ACK/NACK feedback in the LTE release-8 system is basically determined based on a CCE index of a PDCCH. If an ACK/NACK response in one PUCCH in an n-th subframe includes an ACK/NACK response for one or more PDCCHs (including a general PDCCH and a PDCCH indicating DL SPS release) in an (n–k)-th subframe(s), a PUCCH resource index may be derived from a CCE index of the PDCCH. However, if only an ACK/NACK response to SPS without a PDCCH in an (n–k)-th subframe(s) should be transmitted, a PUCCH resource index for the ACK/NACK response cannot be determined. To solve such a problem, in the LTE release-8 system, a PUCCH resource index set (e.g., one set consisting of four PUCCH resource indexes) for the case in which only 'PDSCH transmission without a corresponding PDCCH' (i.e., SPS PDSCH transmission) is present is pre-indicated through RRC signaling. Moreover, it is determined through a TPC field in a PDCCH indicating SPS activation whether one PUCCH resource of the PUCCH resource index set is used. A mapping relationship between a PUCCH resource index $n_{PUCCH}^{(1)}$ for DL SPS and a value of a TPC field is defined in Table 14 shown below.

TABLE 14

| Value of 'TPC command for PUCCH' | $n_{PUCCH}^{(1)}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

If the above-mentioned DL SPS transmission is performed in a multicarrier support system, it is necessary to provide an ACK/NACK transmission method considering DL SPS transmission.

Various embodiments of the present invention therefor are described on the premise that, similarly to the above-described Embodiments 4 and 5, a TPC field of a first PDCCH (a PDCCH with DAI=1 (DAI=1, 2, 3, 4, . . . )) of a PCell for a specific UE is used for a power control purpose of an original purpose and a TPC field of the other PDCCH(s) is used for an ARI purpose. Notably, such an assumption is for clarity of description and application examples of the present invention are not limited thereto. Namely, ARI information may be provided by other methods.

When an ACK/NACK response to 'PDSCH transmission without a corresponding PDCCH' (hereinafter, referred to as 'SPS without a PDCCH') in an (n–k)-th subframe(s) is transmitted in an n-th subframe, SPS without a PDCCH may be received in the (n–k)-th subframe(s) and, in addition thereto, one PDCCH may be detected. Then, an ACK/NACK response to the PDCCH and an ACK/NACK response to the SPS without PDCCHs need to be transmitted. Here, if one detected PDCCH is a first PDCCH (e.g., a PDCCH with DAI=1), since a TPC field of the PDCCH is used for an original purpose, this case is when the UE does not receive ARI information. Therefore, the UE cannot determine a resource index for PUCCH format 3. Hereinafter, various embodiments of the present invention for solving the above problem will be described.

In the following description, ACK/NACK transmission is needed in one of the following three cases. In summary, Case 1 is ACK/NACK for a 'PDSCH with a PDCCH', Case 2 is ACK/NACK for a 'DL SPS release PDCCH', and Case 3 is ACK/NACK to a 'DL SPS PDSCH'.

Case 3 may be referred to as 'PDSCH without a corresponding PDCCH', ACK/NACK for 'SPS without a PDCCH', or simply ACK/NACK for 'SPS'. In Case 1, a PDCCH of 'PDSCH with a PDCCH' may be referred to as a 'PDCCH corresponding to a PDSCH'.

Embodiment 6

Embodiment 6 relates to a method for transmitting an ACK/NACK response always using PUCCH format 3.

A PUCCH format 3 resource index set for SPS only may be indicated to the UE through RRC signaling. For example, information about a set consisting of $n_{PUCCH,0}^{(3)}$, $n_{PUCCH,1}^{(3)}$, $n_{PUCCH,2}^{(3)}$, and $n_{PUCCH,3}^{(3)}$ in the form shown in the above Table 13 may be provided to the UE. In addition, it may be designated through a TPC field in a PDCCH indicating SPS activation which resource index of the PUCCH format 3 resource index set is to be used.

As an example, when ACK/NACK feedback for only SPS without a PDCCH is needed, a specific PUCCH format 3 resource index indicated through an SPS activation PDCCH out of an RRC configured set may be selected and used. That is, ACK/NACK only for SPS without a PDCCH may be transmitted using PUCCH format 3.

As another example, the following methods may be applied to the case in which ACK/NACK feedback for 'SPS without a PDCCH' and 'one PDSCH with a PDCCH' is needed.

A first method is to select and use a PUCCH format 3 resource index indicated through an SPS activation PDCCH, That is, ACK/NACK responses to the 'SPS without a PDCCH' and 'one PDSCH with a PDCCH' may also be transmitted PUCCH format 3.

A second method is again divided into two methods according to whether ARI information is included in one 'PDCCH corresponding to a PDSCH'.

When one 'PDCCH corresponding to a PDSCH' is a PDCCH which does not include ARI information (e.g., a PDCCH in which a first DAI (DAI=1)), a PUCCH format 3 resource index indicated through SPS activation PDCCH may be selected and used. That is, even though the ARI information is not acquired from the 'PDCCH corresponding to a PDSCH', ACK/NACK responses to the 'SRS without a PDCCH' and 'one PDSCH with a PDCCH' may be transmitted using PUCCH format 3.

If one 'PDCCH corresponding to a PDSCH' is a PDCCH including the ARI information (e.g., a PDCCH which does not have a first DAI (DAI>1) (this case may be when the UE misses a PDCCH having the first DAI), a PUCCH format 3 resource index using an ARI value indicated by a TPC field in the 'PDCCH corresponding to a PDSCH' may be selected and used.

Meanwhile, when a plurality of ACK/NACK feedbacks including ACK/NACK for the 'SPS without a PDCCH' is transmitted, the PUCCH format 3 resource index may be determined by an ARI value indicated by a TPC field of second or more PDCCHs on a PCell (e.g., PDCCH(s) in which DAI>1) or a PDCCH(s) on an SCell(s).

Embodiment 7

Embodiment 7 relates to a method for operating ACK/NACK for transmission of 'only' SPS without a PDCCH always in fallback mode. Here, the fallback mode refers to ACK/NACK transmission according to an operation defined in LTE release-8, for example, ACK/NACK transmission using PUCCH format 1a/1b. On the other hand, for ACK/NACK transmission for 'SPS without a PDCCH' and other DL transmission (a PDSCH with a PDCCH), PUCCH format 3 may be used.

To this end, a PUCCH format 1a/1b resource index set to be used for transmission of 'only' SPS may be indicated to the UE through RRC signaling. The PUCCH format 1a/1b resource index set may be configured as shown in Table 14 or may be configured according to other schemes. When SPS activation is indicated, which index of the PUCCH resource index set is to be used may be designated through a TPC field in an SPS activation PDCCH.

Because time/frequency resources for SPS transmission are preset between the BS and the UE, the BS and the UE know when ACK/NACK feedback for the 'SPS without a PDCCH' is transmitted and received. Accordingly, in a bundling window including SPS to a specific UE, the BS may use TPC fields of all PDCCHs for an ARI purpose without separately distinguishing between PDCCHs on a PCell. That is, during transmission of ACK/NACK feedback for only the SPS without a PDCCH, a PDCCH(s) transmitted in a bundling window including SPS without a PDCCH may use all TPC fields for an ARI purpose without distinguishing between a PCell and SCells.

In this case, a TPC field of a PDCCH is not used for an original purpose (UL transmit power control) with respect to a PUCCH transmitting ACK/NACK feedback for the SPS without a PDCCH. However, a TPC value in a PDCCH is a relative offset value for previous transmit power rather than an absolute value and, even if the UE does not update the TPC value once or twice, preset transmit power is maintained. In addition to the transmit power control method of using the TPC field in the PDCCH, supplemental power control methods are provided. Furthermore, when transmission of SPS without a PDCCH is needed in FDD mode, it is defined that the UE cannot obtain a TPC value of an original purpose. Accordingly, even when TPC of an original purpose is not applied, network performance is not substantially influenced by operation described in the above examples of the present invention in TDD.

According to the example of Embodiment 7, when ACK/NACK feedback for only SPS without a PDCCH is needed, a specific PUCCH format 1a/1b resource index indicated through an SPS activation PDCCH of an RRC configured set may be selected and used. That is, for ACK/NACK for only the SPS without a PDCCH, a fallback mode operation using PUCCH format 1a/1b may be performed.

As another example, when ACK/NACK feedbacks for 'SPS without a PDCCH' and 'one PDSCH with a PDCCH' are needed, since TPC fields of all PDCCHs in a bundling window are used for an ARI purpose as described previously, a PUCCH format 3 resource index may be selected and used according to an ARI value indicated by a TPC field of one detected PDCCH.

Meanwhile, when a plurality of ACK/NACK feedbacks including ACK/NACK for SPS without a PDCCH is transmitted, since TPC fields of all PDCCHs in a bundling window are used for an ARI purpose as described above, the PUCCH format 3 resource index may be determined by an ARI value(s) indicated by a TPC field of a PDCCH(s) on a PCell and/or an SCell.

Embodiment 8

Embodiment 8 relates to a method for performing ACK/NACK for DL transmission 'including' SPS transmission without a PDCCH always in fallback mode.

To this end, a PUCCH format 1a/1b resource index set to be used for transmission of 'only' SPS without a PUCCH may be indicated to the UE through RRC signaling. The PUCCH format 1a/1b resource index set may be configured as shown in Table 14 or may be configured according to other schemes. When SPS activation is indicated, which index of the PUCCH resource index set is to be used may be designated through a TPC field in an SPS activation PDCCH.

According to an example of Embodiment 8, when ACK/NACK feedback for 'only' SPS without a PDCCH is needed, a specific PUCCH format 1a/1b resource index indicated through an SPS activation PDCCH of an RRC configured set may be selected and used. That is, for ACK/NACK of only SPS without a PDCCH, fallback mode using PUCCH format 1a/1b may be performed. Here, ACK/NACK feedback for SPS without a PDCCH may have a size of 1 or 2 bits according to the number of codewords and PUCCH format 1 a or 1b may be used.

As another example, ACK/NACK feedbacks for 'SPS without a PDCCH' and 'one PDSCH with a PDCCH' are needed, a specific PUCCH format 1a/1b resource index indicated through an SPS activation PDCCH of an RRC configured set may be selected and used. That is, even for ACK/NACK feedback for transmission including SPS without a PDCCH, fallback mode using PUCCH format 1a/1b may be performed. Here, a 2-bit to 4-bit feedback payload is needed according to the number of codewords for each of the 'SPS without a PDCCH' and 'one PDSCH with a PDCCH' (this is because a 1-bit ACK/NACK response bit is generated with respect to one codeword when spatial bundling is not applied).

Hereinafter, detailed examples of the present invention will be described when ACK/NACK feedbacks for SPS without a PDCCH' and 'one PDSCH with a PDCCH' are needed.

Embodiment 8-1

Embodiment 8-1 relates to a method of using a channel selection scheme of M=2, 3, or 4 when ACK/NACK feedbacks for SPS without a PDCCH' and 'one PDSCH with a PDCCH' are needed. Namely, the size of an ACK/NACK feedback payload for 'SPS without a PDCCH' and 'one PDSCH with a PDCCH' is 2 to 4 bits and, to transmit the ACK/NACK feedbacks without any loss, a channel selection scheme using two, three, or four PUCCH formats 1b (or PUCCH formats 1a) may be applied. When use of a channel selection scheme for PUCCH format 1b (or 1a) defined in LTE release-8 may be expressed as operation in fallback mode using a channel selecting scheme of LTE release-8.

Among a plurality of resources used for channel selection, one PUCCH format 1b (or 1a) resource is derived from a CCE index of a 'PDCCH corresponding to a PDSCH' and another PUCCH format 1b (or 1a) resource may be indicated through a PDCCH indicating SPS activation. ACK/NACK information may be transmitted by the channel selection scheme of selecting one of the two PUCCH format 1b (or 1a) resources.

Additionally, if a PUCCH resource is further needed (e.g., M=3 or 4), a PUCCH resource corresponding to a value (CCE index+offset) obtained by adding a prescribed offset (e.g., 1) to a CCE index of a 'PDCCH corresponding to a PDSCH' may be used for channel selection. A PUCCH resource corresponding to a value obtained by adding a resource index assigned through an SPS activation PDCCH to the prescribed offset (e.g., 1) may be used for channel selection, instead of or together with an additional resource based on the CCE index of the 'PDCCH corresponding to a PDSCH'.

Alternatively, similarly to the above scheme, a channel selection scheme using PUCCH format 1a/1b resource indexes explicitly and/or implicitly determined from information related to the 'SPS without a PDCCH' and 'one PDSCH with a PDCCH' may be applied.

When the UE determines PUCCH resources for transmitting ACK/NACK information according to Embodiment 8-1, the BS may attempt to receive ACK/NACK information with respect to three cases of a PUCCH format 3 region, a PUCCH format 1a/1b region, and a channel selection (PUCCH format 1b (or 1a)) region.

Since the UE may transmit ACK/NACK information using any one of the three cases, the BS should perform blind decoding in the above three cases.

Embodiment 8-2

Embodiment 8-2 relates to a method of using fallback mode using PUCCH format 1b (or 1a) defined in LTE release-8 using spatial bundling (i.e., ACK/NACK bundling for multiple codewords) when ACK/NACK feedbacks for 'SPS without a PDCCH' and 'one PDSCH with a PDCCH' are needed.

First, when an 'SPS without a PDCCH' corresponds to transmission of multiple (e.g., two) codewords, spatial bundling is performed on an ACK/NACK response thereto. Similarly, when 'one PDSCH with a PDCCH' corresponds to transmission of multiple (e.g., two) codewords, spatial bundling is performed on an ACK/NACK response thereto. If only one of the 'SPS without a PDCCH' and 'one PDSCH with a PDCCH' is one-codeword transmission and the other is two-codeword transmission, spatial bundling is performed only with respect to two-codeword transmission.

Accordingly, the size of an ACK/NACK payload for the 'SPS without a PDCCH' and 'one PDSCH with a PDCCH' is reduced to two bits when spatial bundling is performed from as compared with two or four bits when spatial bundling is not performed.

2-bit ACK/NACK feedback may be transmitted through PUCCH format 1b (or 1a) of legacy LTE release-8. That is, if spatial bundling is performed, ACK/NACK feedback may operate in fallback mode using PUCCH format 1b (or 1a) of LTE release-8.

In this case, a PUCCH format 1a/1b resource index derived from a CCE index of one 'PDCCH corresponding to a PDSCH' may be selected and used. Alternatively, a PUCCH format 1a/1b resource index indicated through an SPS activation PDCCH out of an RRC configured resource index set may be selected and used. In other words, respective ACK/NACK responses fall back to PUCCH format 1 a and multiplexed through phase rotation, i.e., one of two ACK/NACK responses is mapped to an I channel and the other is mapped to a Q channel. Alternatively, two ACK/NACK responses fall back to PUCCH format 1b and multiplexed.

For example, in two-bit ACK/NACK used in PUCCH format 1b used in LTE release-8, a Most Significant Bit (MBS) may be mapped to ACK/NACK for the 'SPS without a PDCCH' and a Least Significant Bit (LSB) may be mapped to ACK/NACK for the 'one PDSCH with a PDCCH' (e.g., a PDCCH with DAI=1). Alternatively, ACKs/NACKs may be mapped in the reverse of the above example.

As another embodiment, ACK/NACK for the 'SPS without a PDCCH' is mapped to the I axis of a QPSK constellation and ACK/NACK for the 'one PDSCH with a PDCCH' (e.g., a PDCCH with DAI=1) may be mapped to the Q axis of a QPSK constellation. Alternatively, ACKs/NACKs may be mapped in the reverse manner to the above example. In addition, according to a received time order, ACK/NACK for first reception of the 'SPS without a PDCCH' and 'one PDSCH with a PDCCH' is mapped to the I axis and ACK/NACK for later reception may be mapped to the Q axis. Alternatively, ACKs/NACKs may be mapped in the reverse manner to the above example.

For example, when ACK/NACK for the 'SPS without a PDCCH' is mapped to the I axis and the 'one PDSCH with a PDCCH' (e.g., a PDCCH with DAI=1) is mapped to the Q axis, even if the UE fails to detect a PDCCH (i.e., a 'PDCCH corresponding to a PDSCH'), the BS may receive an ACK/NACK response for at least SPS. This is because, when the UE fails to detect a PDCCH, a constellation location when ACK/NACK for the 'SPS without a PDCCH' is mapped to the I axis is equal to a constellation location when ACK/NACK for 'only' the 'SPS without a PDCCH' is transmitted using BPSK constellation (i.e., I axis) using PUCCH format 1a.

As another example, '1,1' and '0,0' of the QPSK constellation may be mapped to ACK/NACK for the 'SPS without PDCCH' and '0,1' and '1,0' may be mapped to ACK/NACK for the 'one PDSCH with a PDCCH' (e.g., a PDCCH with DAI=1). Alternatively, the respective ACKs/NACKs may be mapped in the reverse manner to the above example.

The above constellation mapping may be identically applied to the case where transmission mode in each cell is MIMO mode and the other cases. The above constellation mapping may also be applied irrespective of whether spatial bundling is actually applied (i.e., irrespective of whether 2-codeword transmission is present).

In applying Embodiment 8-2, spatial bundling may be applied even to ACK/NACK feedback for 'only' SPS without PDCCH. In this case, the BS should perform blind decoding for three cases of a PUCCH format 1a/1b region for ACK/NACK for 'only' SPS, a PUCCH format 1a/1b region for ACK/NACK for the 'SPS without a PDCCH' and 'the PDSCH with a PDCCH', and a PUCCH format 3 region.

Additionally, in applying Embodiment 8-2, instead of a resource index derived from a CCE index of the 'PDCCH corresponding to a PDSCH' as a PUCCH resource, a PUCCH resource index designated through an SPS activation PDCCH of an RRC configured PUCCH resource set may be used and the other parts may be identically applied.

Embodiment 8-3

Embodiment 8-3 relates to a method for applying spatial bundling (i.e., ACK/NACK bundling for multiple codewords) and using a channel selection scheme of M=2, when ACK/NACK feedbacks for an 'SPS without a PDCCH' and 'one PDSCH with a PDCCH' are needed. When a channel selection scheme for PUCCH format 1b (or 1a) defined in LTE release-8 is used, this may be expressed as a fallback mode operation using the channel selection scheme of LTE release-8.

First, in the case of transmission of multiple (e.g., two) codewords for the 'SPS without a PDCCH', spatial bundling is performed on an ACK/NACK response thereto. Similarly, in the case of transmission of multiple (e.g., two) codewords for the 'one PDSCH with a PDCCH', spatial bundling is performed on an ACK/NACK response thereto. If one of the 'SPS without a PDCCH' and 'one PDSCH with a PDCCH' is one codeword and the other is two codewords, spatial bundling is performed only with respect to transmission of the two codewords.

Accordingly, the size of an ACK/NACK payload for the 'SPS without a PDCCH' and 'one PDSCH with a PDCCH' is reduced to two bits when spatial bundling is performed from two or four bits when spatial bundling is not performed.

2-bit ACK/NACK feedback may be transmitted through PUCCH format 1b (or 1a) of legacy LTE release-8. Here, a channel selection scheme of M=2 using PUCCH format 1b (/1a) may be used. That is, 2-bit ACK/NACK feedback as a result of performing spatial bundling may be transmitted using fallback mode of PUCCH format 1b (/1a).

Here, M=2 may mean transmission of two types of ACK/NACK information (2-bit ACK/NACK information) as a spatial bundling result or may mean channel selection using two PUCCH resources. Thus, detection performance of the BS can be improved by using channel selection.

Of two PUCCH resources for channel selection, the first PUCCH resource may use a PUCCH format 1a/1b resource index designated through an SPS activation PDCCH and the second PUCCH resource may use a PUCCH format 1a/1b resource index derived from a CCE index of the 'PDCCH corresponding to a PDSCH'. As opposed to the above example, the first and second PUCCH resources may be mapped to a PUCCH resource index designated through the SPS activation PDCCH and a PUCCH resource index derived from a CCE index of the 'PDCCH corresponding to a PSDCH', respectively. ACK/NACK information can be transmitted by the channel selection scheme of selecting one of two PUCCH format 1b (or 1a) resources.

In the present embodiment, a channel selection mapping relationship between ACK/NACK information and a PUCCH resource may be configured as shown in, for example, Table 5 or Table 8. However, this is purely exemplary and a new channel selection mapping relationship may be defined and used.

As an example of this embodiment, it is assumed that a channel mapping relationship using PUCCH format 1b is given as shown in Table 5. Of two PUCCH resources ($n_{PUCCH,0}^{(1)}$ and $n_{PUCCH,1}^{(1)}$) used for channel mapping, a PUCCH resource designated through the SPS activation PDCCH may be mapped to $n_{PUCCH,0}^{(1)}$ and a PUCCH resource derived from a CCE index of the 'PDCCH corresponding to a PDSCH' may be mapped to $n_{PUCCH,1}^{(1)}$. Such mapping configuration may be determined regardless of a reception order (a received time) of the 'SPS without a PDCCH' and the 'PDCCH corresponding to a PDSCH'. For example, even when a specific UE transmits a response after missing a PDCCH (i.e., 'PDCCH corresponding to a PDSCH') and receiving only SPS, the UE may receive an ACK/NACK response to at least the SPS. This is because, when the UE fails to detect a PDCCH, a PUCCH resource ($n_{PUCCH,0}^{(1)}$) used for ACK/NACK transmission for the 'SPS without a PDCCH' is identical to a PUCCH resource ($n_{PUCCH,0}^{(1)}$) used for ACK/NACK transmission for 'only' the SPS without a PDCCH. Meanwhile, as a modified example of this embodiment, the respective PUCCH resources and DL transmission types (PDCCH or SPS) may be mapped oppositely to the above example or may be mapped according to order of received time.

As another example of this embodiment, in a channel mapping relationship using PUCCH format 1b, ACK/NACK for SPS may be mapped to an MSB of 2-bit ACK/NACK (i.e., ACK/NACK for SPS is mapped to the first bit) and ACK/NACK for the 'one PDSCH with a PDCCH' (e.g., a PDCCH with DAI=1) may be mapped to an LSB (i.e., ACK/NACK for PDSCH with PDCCH is mapped to the second bit). Alternatively, even if the UE fails to detect a PDCCH (i.e., the 'PDCCH corresponding to a PDSCH') when ACK/NACK for SPS is mapped to I axis and ACK/NACK for the 'one PDSCH with a PDCCH' (e.g., PDCCH with DAI=1) is mapped to the Q axis, the BS may receive an ACK/NACK response to at least SPS transmission. This is because a constellation location when ACK/NACK for the 'SPS without a PDCCH' is mapped to the I axis in the case of failure of PDCCH detection is identical to a constellation location when the UE transmits an ACK/NACK response for 'only' the SPS without a PDCCH using BPSK constellation (i.e., I axis) using PUCCH format 1a. Alternatively, a mapping relationship opposite to the above example may be configured and mapping may be performed according to order of received time.

In order to guarantee the BS to receive an ACK/NACK response for at least SPS, it is possible to map specific information to a specific PUCCH resource in various ACK/NACK feedback transmission cases. For example, the channel selection mapping relationship may be configured such that a PUCCH resource to which ACK/NACK for SPS transmission is mapped is identical to a PUCCH resource on which ACK/NACK for 'only' SPS is transmitted.

The following Table 15 shows modulation symbols (or constellation) for PUCCH formats 1a and 1b in legacy LTE release-8/9.

TABLE 15

| PUCCH format | $b(0), \ldots, b(M_{bit}-1)$ | $d(0)$ |
|---|---|---|
| 1a | 0 | 1 |
|  | 1 | $-1$ |
| 1b | 00 | 1 |
|  | 01 | $-j$ |
|  | 10 | $j$ |
|  | 11 | $-1$ |

In Table 15, it is assumed that a value '0' of b(0) is NACK and '1' is ACK. Then, a value '00' of b(0),b(1) denotes ACK/ACK and '11' denotes NACK/NACK. In this case, at least one preceding bit b(0) has the same modulation symbol as in PUCCH formats 1a and 1b. In other words, b(0) is always 0 in both PUCCH formats 1a and 1b when d(0)=1 and is always 1 in both PUCCH formats 1a and 1b when d(0)=−1. Accordingly, the BS may receive and detect information about at least one preceding bit b(0) even through the BS does not know whether received ACK/NACK feedback is transmitted using PUCCH format 1a or PUCCH format 1b. A channel selection mapping relationship may be configured such that ACK/NACK for the 'SPS without a PDCCH' uses a PUCCH resource mapped to one preceding bit b(0). Therefore, the BS can guarantee reception of ACK/NACK for at least SPS.

For example, when M=2, a channel selection mapping relationship shown in the following Table 16 may be used.

TABLE 16

| HARQ-ACK(0), HARQ-ACK(1) | $n_{PUCCH}^{(1)}$ | $b(0)b(1)$ |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX |  | No Transmission |

In Table 16, ACK/NACK for SPS is mapped to HARQ-ACK(0) and ACK/NACK for 'PDSCH with a PDCCH' may be mapped to HARQ-ACK(1).

For example, it is assumed that only the SPS having one codeword is received and the 'PDSCH with a PDCCH' is not received. In this case, an ACK/NACK response to the SPS may be transmitted using PUCCH format 1 a.

Meanwhile, when the 'PDSCH with a PDCCH' is received together with the SPS, channel selection according to the present invention may be used. In this case, a PUCCH resource indicated through an SPS activation PDCCH out of a higher-layer configured PUCCH resource set for the SPS may be used as $n_{PUCCH,0}^{(1)}$ of Table 16. In addition, a PUCCH resource derived (implicitly by a predetermined rule) from a CCE index of the 'PDCCH corresponding to a PDSCH' may be used as $n_{PUCCH,1}^{(1)}$ of Table 16. In this case, the BS should be capable of receiving an ACK/NACK response to the SPS irrespective of whether the UE misses the 'PDCCH corresponding to a PDSCH'.

As described above, if the UE transmits an ACK/NACK response to the SPS, $n_{PUCCH,0}^{(1)}$ is used. Here, ACK corresponds to a modulation symbol in which b(0)=1 and d(0)=−1 and NACK corresponds to a modulation symbol in which b(0)=0 and d(0)=1. Meanwhile, when the UE transmits ACK/NACK responses to the SPS and the 'PDSCH with a PDCCH', a resource on which an ACK/NACK response to the SPS may be confirmed in Table 16. The cases of 'ACK, NACK/DTX' and 'NACK, NACK/DTX' using $n_{PUCCH,0}^{(1)}$ in Table 16 will now be described. 'ACK, NACK/DTX' corresponds to a modulation symbol in which b(0)b(1)=1 and d(0)=1 and 'NACK, NACK/DTX' corresponds to a modulation symbol in which b(0)b(1)=00 and d(0)=1. In summary, in both of transmission of an ACK/NACK response for only the SPS and transmission of ACK/NACK responses for the SPS and the 'PDSCH with a PDCCH', an ACK/NACK response for the SPS in ACK/NACK transmission using $n_{PUCCH,0}^{(1)}$ is transmitted through the same modulation symbol (i.e., d(0)=−1 for ACK and d(0)=1 for NACK). Accordingly, the BS may confirm an ACK/NACK response for at least SPS upon detecting a signal on $n_{PUCCH,0}^{(1)}$ irrespective of whether the BS has received an ACK/NACK response for the SPS or ACK/NACK responses for the SPS and the 'PDSCH with a PDCCH'.

Meanwhile, in the case of 'ACK, ACK' and the case of 'NACK/DTX, ACK' in Table 16, an ACK/NACK response may be transmitted using a resource derived from a CCE index of the 'PDCCH corresponding to a PDSCH', i.e., using $n_{PUCCH,1}^{(1)}$. Upon receiving a signal on $n_{PUCCH,1}^{(1)}$, the BS may confirm that an ACK/NACK response to the 'SPS without a PDCCH' and the 'PDSCH with a PDCCH' is received.

In the above example, while PUCCH format 1a has been described for convenience, the same principle of the present invention may be applied to PUCCH format 1b.

For example, an ACK/NACK response to 'only' the SPS having two codewords may be transmitted using PUCCH format 1b. Meanwhile, when the 'PDSCH with a PDCCH' is received along with the SPS, spatial bundling may be used according to the example of the present invention. In the above two cases, ACK/NACK information for the SPS is transmitted through the same channel (PUCCH resource) and modulation symbol. More specifically, ACK/ACK, ACK/NACK, NACK/ACK, and NACK/NACK for two codewords of the SPS become ACK, NACK, NACK, and NACK by applying spatial bundling (e.g., logical product). If ACK/NACK responses to the SPS and the 'PDSCH with a PDCCH' are simultaneously transmitted, the ACK/NACK response to the SPS becomes ACK or NACK according to a spatial bundling result and the responses are the same as ACK/NACK and NACK/NACK, respectively, of a channel and modulation symbol used for an ACK/NACK response to only the SPS. Therefore, upon detecting a signal $n_{PUCCH,0}^{(1)}$, the BS may confirm an ACK/NACK response as a spatial bundling result according to whether a preceding signal (e.g., b(0)) for at least the SPS is ACK or NACK, irrespective of whether the BS has received an ACK/NACK response to the SPS or ACK/NACK responses for the SPS and the 'PDSCH with a PDCCH'.

The above constellation mapping may be identically applied to the case where the transmission mode in each cell is MIMO mode and the other cases. The constellation mapping may also be applied irrespective of whether spatial bundling is actually applied (i.e., irrespective of whether 2-codeword transmission is present).

In applying Embodiment 8-3, spatial bundling may be applied to ACK/NACK feedback transmission even for 'only' the SPS without a PDCCH. Compared with Embodiment 8-1 or 8-2, this case can reduce the number of regions in which blind decoding should be performed by the BS.

More specifically, in a channel selection scheme defined in LTE release-8, a channel selection scheme for M of a large value is comprised of a superset of a channel selection scheme for M of a small value. For example, transmission of one preceding bit (e.g., b(0)) or only ACK/NACK in channel selection of M=2 has the same result as transmission of 1-bit ACK/NACK using PUCCH format 1 without applying channel selection. Accordingly, when a PUCCH format 1a/1b resource index indicated through an SPS activation PDCCH for ACK/NACK for 'only' the SPS is used as a first resource index used for channel selection, it is possible to distinguish between the case in which channel selection is used and the case in which channel selection is not used. In this case, ACK/NACK responses to the 'SPS without a PDCCH' and the 'PDSCH with a PDCCH' are detected, an ACK/NACK response for 'only' the SPS is automatically detected. Accordingly, the BS may perform blind decoding in two regions for ACK/NACK detection (including ACK/NACK detection for 'only' the SPS) on a PUCCH format 1a/1b resource for channel selection and for ACK/NACK detection on a PUCCH format 3.

Hereinafter, detailed application examples of Embodiment 8-3 will be described.

Embodiment 8-3-1

As described above, an ACK/NACK response is generated with respect to three cases. Case 1 relates to a PDSCH with a corresponding PDCCH, Case 2 relates to a PDCCH indicating DL SPS release, and Case 3 relates to a PDSCH without a corresponding PDCCH. Case 3 is also referred to as ACK/NACK for an SPS PDSCH.

In description of this embodiment, a 'PDCCH' related to an ACK/NACK response indicates Case 1 or Case 2 and an 'SPS PDSCH' indicates Case 3. An operation in which a specific UE performs DL reception for the above three cases and performs ACK/NACK for DL reception. An ACK/NACK response transmitted in an n-th UL subframe has a relationship of an ACK/NACK response to DL transmission for the above three cases in an (n−k)-th subframe(s) (where k∈K and K: $\{k_0, k_1, \ldots k_{M-1}\}$ and see Table 12). Description of an ACK/NACK transmission subframe location will be omitted hereinbelow.

In this embodiment, to support dynamic transmit power caused by a TPC command without lowering performance, a predefined channel selection scheme (defined in LTE release-8 or release-10) through PUCCH format 1a may be used.

The case in which one serving cell is configured will now be described first.

In this case, use of a TPC field is determined as follows.

A (2-bit) TPC field in a PDCCH in which DL DAI=1 is used for a TPC command of an original purpose.

A (2-bit) TPC field in a PDCCH in DL DAI>1 is used for an ARI purpose. The UE assumes that, in all PDCCHs in which DL DAI>1, ARI values are the same.

In addition, the use of a PUCCH format is determined as follows.

If the UE receives only an SPS PDSCH, an LTE release-8 PUCCH format 1a/1b resource is used (i.e., operation in fallback mode).

If the UE receives one PDCCH in which DL DAI=1, an LTE release-8 PUCCH format 1a/1b resource is used (i.e., operation in fallback mode).

If the UE receives an SPS PDSCH and an additional PDCCH with DL DAI=1, a predefined channel selection scheme through PUCCH format 1a (a channel selection scheme defined in LTE release-8 or release-10) is used. Here, a first PUCCH resource is determined by higher layer configuration (e.g., by a resource indicated by an ARI of an SPS PDCCH out of an RRC configured resource set) and a second PUCCH resource is determined based on a number (or index) of a first CCE used for transmission of a corresponding PDCCH (i.e., a PDCCH in which DL DAI=1).

In the other cases, PUCCH format 3 is used as a configured PUCCH format.

Meanwhile, the case in which more than one serving cell is configured will now be described.

Here, the use of a TPC field is determined as follows.

A (2-bit) TPC field in a PDCCH in which DL DAI=1 only on a PCell is used for a TPC command of an original purpose.

A (2-bit) TPC field of each of all other PDCCH(s) on the PCell and SCell(s) is used for a TPC command of an original purpose. The UE assumes that, in all PDCCH(s) on the PCell and SCell(s), ARI values are the same.

In addition, the use of a PUCCH format is determined as follows.

If the UE receives only an SPS PDSCH, an LTE release-8 PUCCH format 1a/1b resource is used (i.e., operation in fallback mode).

If the UE receives one PDCCH in which DL DAI=1, an LTE release-8 PUCCH format 1a/1b resource is used (i.e., operation in fallback mode).

If the UE receives an SPS PDSCH and an additional PDCCH in which DL DAI=1 only on the PCell, a predefined channel selection scheme through PUCCH format 1 a (a channel selection scheme defined in LTE release-8 or release-10) is used. Here, a first PUCCH resource is determined by higher layer configuration (e.g., by a resource (see Table 14) indicated by an ARI of an SPS activation PDCCH out of an RRC configured resource set) and a second PUCCH resource is determined based on a number (or index) of a first CCE used for transmission of a corresponding PDCCH (i.e., a PDCCH in which DL DAI=1).

In the other cases, PUCCH format 3 is used as a configured PUCCH format.

Embodiment 8-3-2

In description of this embodiment, a 'PDCCH' related to an ACK/NACK response indicates Case 1 or Case 2 and an 'SPS PDSCH' indicates Case 3, as described in the above Embodiment 8-3-1. The term 'PDSCH with DAI=1' or 'PDSCH with DL DAI>1' refers to a DL DAI indicated by a PDCCH corresponding to the PDSCH is 1 or is greater than 1. Description of an ACK/NACK transmission subframe location will be omitted hereinbelow.

If the UE receives an SPS PDSCH and a PDSCH with DL DAI=1, since there is no ARI information, the UE cannot be aware of available PUCCH resources. To solve this problem, the following methods may be considered.

The case in which channel selection of M=2 in LTE release-8 is used will now be described first.

If the UE receives only an SPS PDSCH and a PDSCH with DL DAI=1 and does not receive a PDSCH with DL DAI>1, the UE transmits ACK/NACK by TDD channel selection of M=2 in LTE release-8 while applying spatial bundling for the PDSCHs. When LTE release-8 TDD channel selection is used, the UE transmits two ACK/NACK bits. Here, one of a channel selection mapping relationship in LTE release-8 (e.g., the above Tables 5 to 7) and a channel selection mapping relationship in LTE release-10 (e.g., the above Tables 8 to 11) may be used and this may be determined by RRC configuration.

In applying LTE release-8 channel selection, a value of $n_{PUCCH,0}^{(1)}$ is determined by an SPS PUCCH resource (i.e., a resource indicated by an SPS activation PDCCH of a higher-layer configured resource set, see Table 14). In addition, HARQ-ACK(O) is an ACK/NACK/DTX response to SPS PDSCH transmission. This is to solve ambiguity for the case in which the UE misses a PDSCH with DAI=1 and an ACK/NACK response to SPS transmission can be certainly transmitted.

In this case, a TPC field of a PDCCH with DL DAI=1 may be actually used for PUCCH power control. However, in a cell supporting MIMO transmission (or 2-codeword transmission), loss of an ACK/NACK bit may occur due to spatial bundling for a PDSCH with DAI=1 may occur.

Meanwhile, the case in which PUCCH format 3 is used may be considered.

If the UE receives both an SPS PDSCH and a PDSCH with DL DAI=1, the UE may assume that a TPC field of a PDCCH with DL DAI=1 is used for an ARI purpose. Then, the UE may transmit 2-bit ACK/NACK (on a non-MIMO cell) or 3-bit ACK/NACK (on a MIMO cell) using PUCCH format 3.

In this case, since ACK/NACK bundling is not applied, ACK/NACK bits may be transmitted without loss of ACK/NACK information. Meanwhile, since a TPC field used for an original TPC command purpose is not present (since a TPC field of a PDCCH with DL DAI=1 is used for an ARI purpose), PUCCH power control may not be correctly performed.

In consideration of this fact, the following two methods are proposed for resource allocation for TDD PUCCH format 3 in CA.

The first method is to reuse resource allocation for FDD PUCCH format 3 in CA. In this case, a TPC field(s) on a PCell may be used for an original purpose and a TPC field(s) on an SCell(s) may be used for an ARI purpose. If the UE receives PDSCHs only on the PCell, ACK/NACK bundling defined in LTE release-8 may be used.

The second method is to reuse resource allocation for TDD PUCCH format 3 when CA is not supported (i.e., in non-CA). Then, a TPC field of a PDCCH with DAI=1 on a PCell may be used for an original purpose and TPC fields of all other PDCCHs on the PCell and SCells may be used for an ARI purpose. When the UE receives an SPS PDSCH or a PDSCH with DL DAI=1 only on the PCell, LTE release-8 PUCCH format 1a/1b may be used (i.e., fallback mode operation). When the UE receives an SPS PDSCH and a PDSCH with DL DAI=1 but does not receive PDSCHs with DL DAI>1, LTE release-8 channel selection is used.

ACK/NACK Transmission Through PUCCH in TDD System

An ACK/NACK bundling method and a resource allocation method in LTE-A (or LTE release-10) are described.

For ACK/NACK feedback in TDD using PUCCH format 3, mode 1 and mode 2 are defined. Mode 1 may support an ACK/NACK payload size of up to 20 bits. If the number of indicated ACK/NACK bits exceeds 20, spatial bundling is used. If the number of ACK/NACK bits indicated in Mode 1 is less than 20, no bundling is supported. Meanwhile, Mode 2 is a scheme in which partial bundling (bundling in a time domain or bundling in a CC domain) is applied along with spatial bundling. That is, in Mode 2, if the number of indicated ACK/NACK bits exceeds x, spatial bundling is performed simultaneously with partial bundling.

When channel selection is applied to ACK/NACK feedback in TDD using PUCCH format 1b, Mode a and Mode b are defined. Mode a is a scheme in which no bundling is supported when the number of indicated ACK/NACK bits is less than 4. Mode b is a scheme in which partial bundling (bundling in a time domain or bundling in a CC domain) is applied along with spatial bundling when the number of indicated ACK/NACK bits exceeds 4.

On the other hand, resource allocation for PUCCH format 3 is defined as follows. A (2-bit) TPC field in a PDCCH corresponding to a PDSCH on a PCell is used for a TPC command of an original purpose. A (2-bit) TPC field of a PDCCH corresponding to a PDSCH on an SCell is used for an ARI purpose. If a PDCCH corresponding to a PDSCH on an SCell is not received and a PDSCH on a PCell is received, PUCCH format 1a/1b is used by a scheme defined LTE release-8.

Hereinafter, when DL reception is present only on a PCell, an ACK/NACK bundling method and a resource allocation method will be described.

Embodiment 9

Embodiment 9 relates to spatial bundling in Mode 1.

Mode 1 for TDD may support individual ACK/NACK transmission of up to 20 bits. However, if the number of indicated ACK/NACK bits exceeds 20, spatial bundling needs to be applied. Since individual ACK/NACK information is not sure to be fed back when spatial bundling is applied, efficiency of a HARQ operation may be reduced and thus it is necessary to maximally transmit individual ACK/NACK information without bundling. That is, simple application of spatial bundling to all ACK/NACK bits is not desirable in terms of DL throughput performance. Moreover, since Mode 1 is a scheme for transmitting individual ACK/NACK feedback without change, spatial bundling should be minimally applied. Therefore, spatial bundling needs to be performed such that the number of ACK/NACK bits is nearest 20 but less than 20.

A detailed method for performing spatial bundling when the number indicated ACK/NACK bits exceeds 20 will be described hereinbelow.

As a first method, spatial bundling in the unit of CCs (CC-wise) may be considered.

According to the first method, spatial bundling may be applied over all DL subframes in one specific CC. In this way, spatial bundling may be performed throughout all subframes with respect to other CCs until the number of ACK/NACK bits to be actually transmitted is less than 20. Assuming that a PCell is more frequently scheduled relative to an SCell, spatial bundling may be applied lastly on the PCell.

When TTD is configured as 9 DL: 1UL (i.e., configuration for transmitting ACK/NACK for DL transmission in 9 DL subframes is transmitted in one UL subframe, e.g., see subframe 2 of UL-DL configuration 5 of Table 12), if the number of configured CCs exceeds 2, an ACK/NACK payload size exceeds 20 bits even though spatial bundling is applied to all CCs. Accordingly, when the number of configured CCs is 2, spatial bundling may be applied to all CCs.

When TDD configuration is not 9 DL:1UL, spatial bundling is applied to $(N_{configuredDLsubframe}+N_{CW\_SF}-9)$ CC(s) having two configured codewords starting from a CC having the last index (or highest index) on a logical index. Spatial bundling may be applied lastly to the PCell (i.e., the lowest logical index may be assigned to the PCell). Here, $N_{configuredDLsubframe}$ is the number of DL subframes in which ACK/NACK is fed back on one CC. $N_{CW\_SF}$ is the total number of codewords for which ACK/NACK is fed back in one subframe on all DL CCs. That is, $N_{CW\_SF}$ may be determined as indicated by Equation 2.

$$N_{CW\_SF} = \sum_{i=0}^{N_{configuredCCs}-1} N_{CW,i} \qquad \text{Equation 2}$$

In Equation 2, $N_{CW,i}$ is the number of codewords configured on an i-th CC.

As a second method, spatial bundling in the unit of subframes (subframe-wise) may be considered. According to the second method, spatial bundling may be applied over all CCs in one specific DL subframe. In this way, spatial bundling may be performed throughout all CCs with respect to other DL subframes until the number of ACK/NACK bits to be actually transmitted is less than 20.

According to the aforementioned first or second method, the number of bundled ACK/NACK bits is 18, 19, or 20. According to the number of CCs configured for the UE, the number of ACK/NACK bits when the first or second method is applied is shown in the following Table 17.

TABLE 17

| No. of configured CCs | Option 1 | Option 2 |
| --- | --- | --- |
| 2 | 18, or 18 | 18, or 18 |
| 3 | 20 | 18 |
| 4 | 20, 18, 20, 18, or 20 | 20, 18, 19, 20, or 20 |
| 5 | 20, 18, 20, 18, 20, 18, 20, 18, or 20 | 20, 19, 20, 18, 20, 19, 20, 20, or 20 |

The first method may maximally support individual ACK/NACK transmission for a PCell relative to the second method and may be simply expressed. If the number of indicated ACK/NACK bits exceeds 20, it is preferable to perform spatial bundling in CC-wise (i.e., to apply the first method).

Embodiment 10

In Embodiment 10, a detailed application example of the aforementioned Mode 2 and Mode b is described. Mode 2 is a scheme in which partial bundling (bundling in a time domain or bundling in a CC domain) is applied along with spatial bundling for ACK/NACK feedback in TDD using PUCCH format 3. Mode b is a scheme in which partial bundling (bundling in a time domain or bundling in a CC domain) is applied along with spatial bundling for ACK/NACK feedback in TDD using PUCCH format 1b, when channel selection is applied in the case in which the number of indicated ACK/NACK bits exceeds 4.

Mode 2 may be favorably applied to improve ACK/NACK performance with respect to a power-limited UE. When comparing FDD supporting ACK/NACK of up to 10 bits with TDD supporting ACK/NACK of up to 20 bits, TDD has less UL coverage than FDD. In addition, Mode 1 (in which spatial bundling is applied when the number of indicated ACK/NACK bits exceeds 20 and spatial bundling is not applied when the number of indicated ACK/NACK bits is 20 or less) cannot support ACK/NACK feedback when the number of DL CCs exceeds 2 in TDD 9 DL-1UL configuration. For example, to support ACK/NACK feedback on 5 DL CCs and in the TDD 9 DL-1UL configuration, a total of 45 ACK/NACK bits is needed even if spatial bundling is applied. Accordingly, to support ACK/NACK feedback in at least TDD 9 DL-1UL configuration, it is necessary to support the above-mentioned Mode 2 for PUCCH format 3.

Hereinafter, spatial bundling applied to Mode 2 and Mode b will be described in detail.

Embodiment 10-1

In Embodiment 10-1, spatial bundling in a time domain is described. Time-domain bundling in this embodiment may be performed in addition to spatial bundling.

Time-domain bundling as spatial bundling may be performed without additionally modifying a 2-bit DAI defined in LTE release-8 on each CC. Further, in applying time-domain bundling, time-domain bundling may be simply applied on each CC without the need to consider various forms of CA. That is, it is sufficient to determine one time-domain bundling method for various cases of CA. Since the size of ACK/NACK information bits which are an application result of time-domain bundling is 10 bits, a PUCCH format 3 structure of LTE release-10 may be used as a PUCCH format to be used for ACK/NACK transmission.

A DAI value is sequentially increased with respect to allocated PDCCHs. Therefore, when a DAI is used, a UE cannot recognize the case of missing the last PDCCH in a time-domain bundling window. To solve this problem, a DAI value for the last detected PDCCH on each CC may be input to an ACK/NACK mapper and then encoded.

Figure 40:
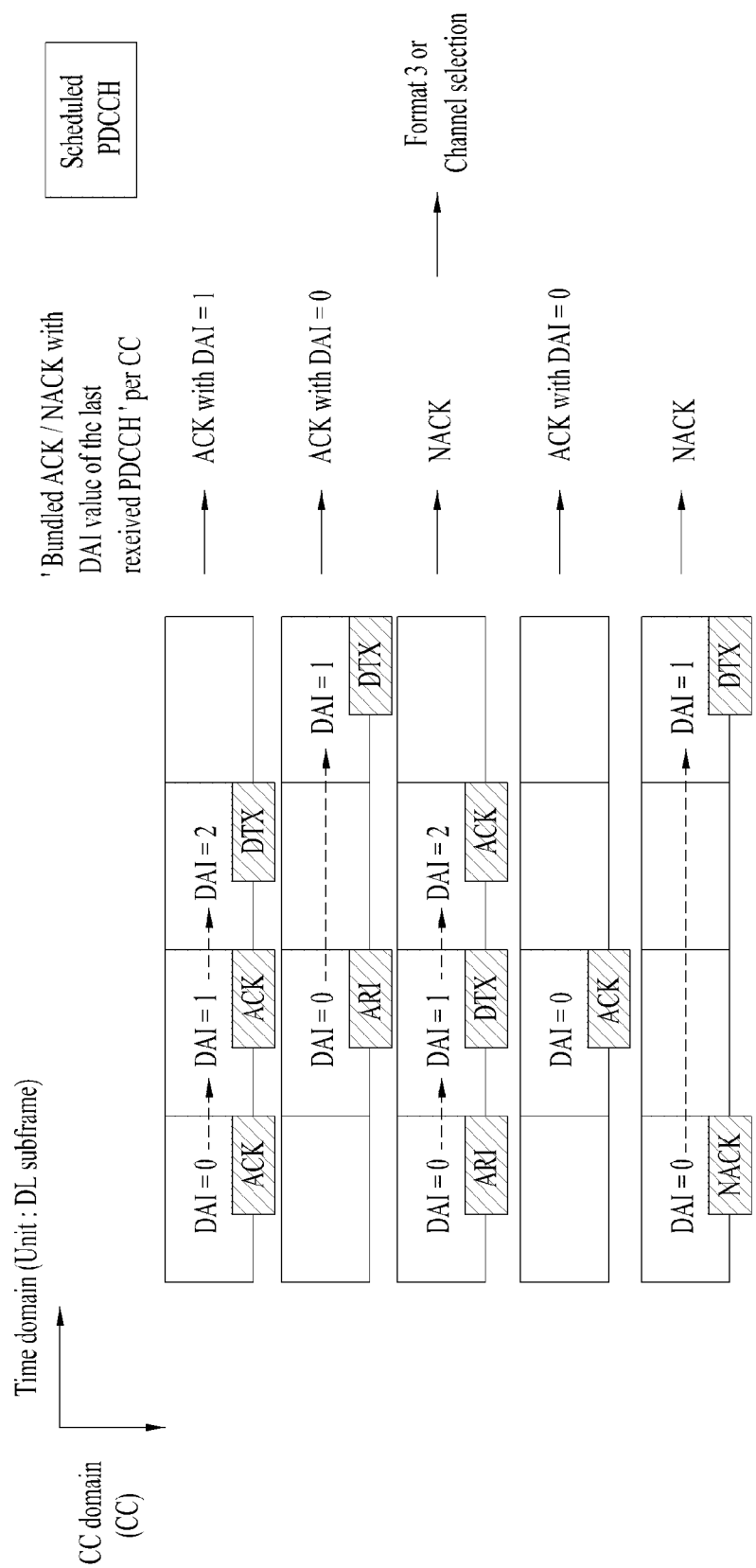
FIG. 40 is a diagram illustrating exemplary time-domain partial bundling.

FIG. 40 is a diagram illustrating exemplary time-domain partial bundling. In the example of FIG. 40, ACK/NACK bundling is applied over 4 subframes on each CC.

In the first CC of FIG. 40, the UE has received a PDCCH with DAI=0 in the first subframe and a PDCCH with DAI=1 in the second subframe but has not received a PDCCH with DAI=2 in the third subframe. Then, since the UE does not know whether the last PDCCH (DAI=2) has been transmitted, the UE may recognize that all PDCCHs in a time-domain bundling window have been received. In addition, FIG. 40 shows the case in which each of PDSCHs scheduled by the received PDCCHs is successfully decoded (i.e., ACK) and, as a result, ACK is generated as bundled ACK/NACK information. Together with the generated ACK information, the UE may encode the last received DAI value, i.e., DAI=1. The UE encodes and transmits ACK and DAI (DAI=1) and then the BS may recognize that the UE misses a PDCCH (DAI=2).

The time-domain bundling operation on the second CC of FIG. 40 is similar to that on the first CC. The UE may encode a last received DAI value (i.e., DAI=0) together with ACK information. Since the UE encodes and transmits ACK and a DAI (DAI=0), the BS may recognize that the UE misses a PDCCH (DAI=1).

In the third CC of FIG. 40, the UE receives a PDCCH (DAI=0) in the first subframe and receives a PDCCH (DAI=2) in the third subframe. Even though the UE does not recognize transmission of PDCCH (DAI=1) in the second subframe, the UE may recognize that itself misses a PDCCH (DAI=1) because DAI values of received PDCCHs are not sequentially increased. Although FIG. 40 shows the case in which each of PDSCHs scheduled by the received PDCCHs is successfully decoded (i.e., ACK), the UE may generate NACK as bundled ACK/NACK information because transmission of one PDCCH is missed.

In the fourth CC of FIG. 40, the UE receives only a PDCCH (DAI=0) and generates ACK information upon successfully decoding a PDSCH scheduled by the PDCCH. The generated ACK information may be encoded together with the last received DAI value (DAI=0).

In the fifth CC of FIG. 40, the UE receives only a PDCCH with DAI=0. The UE does not know that a PDCCH with DAI=1 has been transmitted in the fourth subframe. FIG. 40 shows the case in which a PDSCH scheduled by a PDCCH received by the UE is not successfully decoded (i.e., NACK). Accordingly, the UE may generate NACK information.

Thus, when time-domain spatial bundling is applied, a (2-bit) TDD DAI of LTE release-8 may be reused (i.e., as a PDCCH accumulation counter) on each CC without modification.

As an example of PUCCH format 3 for application of Mode 2, an ACK/NACK state per CC before channel coding may be defined as indicated in Table 18.

TABLE 18

| Bundled ACK/NACK with DAI value of the last received PDCCH | A/N states per CC [information bits] |
|---|---|
| ACK w DAI = 0 or 3 | 00 |
| ACK w DAI = 1 | 01 |
| ACK w DAI = 2 | 10 |
| NACK w any DAI | 11 |

A result of bundled ACK/NACK encoded together with a DAI value of a last received PDCCH on each CC in FIG. 40, using the ACK/NACK state of Table 18, is expressed as follows: '01 (DAI=1)' on the first CC, '01 (DAI=0)' on the second CC, '11 (NACK)' on the third CC, '00 (DAI=0)' on the fourth CC, and '11 (NACK)' on the fifth CC.

An aggregate of ACK/NACK payloads for five CCs before channel coding is performed in PUCCH format 3 to which Mode 2 is applied is '0100110011'.

The principle of the present invention for the above-described Mode 2 may be identically applied to Mode b. For application to Mode b, a relationship between a channel selection mapping relationship (a mapping relationship between a PUCCH resource and ACK/NACK bits) and a NACK/DAI value may be defined.

Accordingly, when time-domain bundling is used, each ACK/NACK response on each CC may be expressed as bundling ACK/NACK information.

Embodiment 10-2

In Embodiment 10-2, CC-domain partial bundling is described. Time-domain bundling in this embodiment may be performed in addition to spatial bundling.

In CC-domain bundling, it is preferable to use a DAI as an indicator indicating the total number of scheduled PDSCHs (or corresponding PDCCHs) in a bundling window comprised of a plurality of CCs in one subframe, rather than a DAI as an accumulation counter of scheduled PDSCHs (or corresponding PDCCHs) in a plurality of subframes on each CC as in a conventional DAI. This is because, when the DAI indicates the total number of PDSCHs (or PDCCHs) per subframe, there is no need to provide a solution for the case in which the UE misses the last PDCCH in time.

Then, the UE may transmit ACK when the number of ACKs generated for successfully decoded DL transmission in a bundling window is equal to the total number of PDSCHs (or PDCCHs) in the bundling window and, otherwise, the UE transmits NACK (at this time, DTX is expressed as NACK).

Hereinafter, application of CC-domain bundling to Mode b and Mode 2 will be described in detail.

Channel selection for application of CC-domain bundling to Mode b is described with reference to FIG. 41.

In this case, it is basically assumed that a channel selection mapping relationship of LTE release-10 (e.g., the above Tables 8 to 11) is applied.

If an ACK/NACK PUCCH resource which is implicitly determined (i.e., derived from a CCE index of a PDCCH) is used, a PUCCH resource linked dynamically with a PDCCH for scheduling on a PCC (or PCell) may be selected first in each subframe.

If PDSCHs are scheduled only on a PCC (or PCell) in a multi-CC configuration, ACK/NACK resource mapping in LTE release-8 (e.g., the above Tables 5 to 7) may be applied. That is, an operation of fallback mode in LTE release-8 may be performed.

Figure 41:
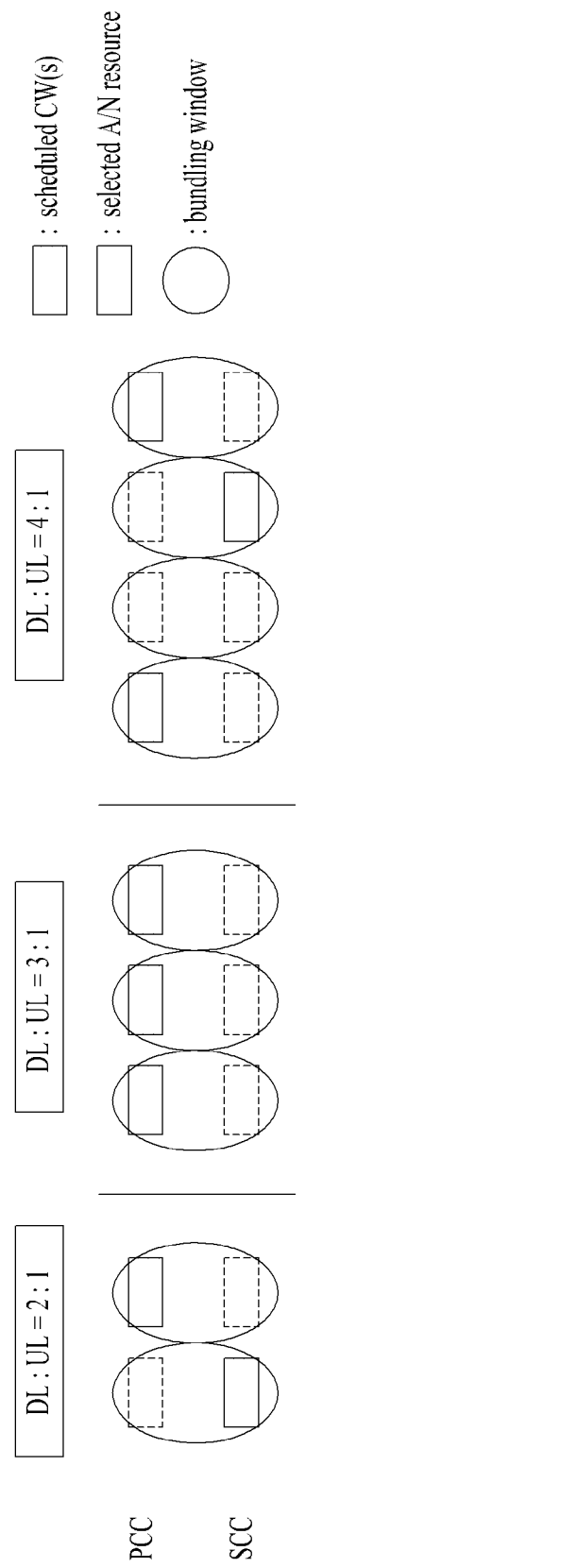
FIG. 41 is a diagram explaining channel selection using PUCCH format 1b in CC-domain bundling.

In the example of FIG. 41, it is assumed that two cells (a PCC and an SCell) are configured in each subframe.

In a TDD 2 DL:1UL configuration of FIG. 41, in the first subframe, since a PDSCH is not scheduled on a PCC and is scheduled on an SCC, a PUCCH resource is determined from a CCE index of a PDCCH for scheduling the SCC PDSCH. In the second subframe, a PUCCH resource may be determined from a CCE index of a PDCCH for scheduling a PCC PDSCH. A channel selection operation may be used using such PUCCH resources. For example, ACK/NACK transmission may be performed using the channel selection mapping relationship as shown in Table 8.

In a TDD 3 DL:1UL configuration, PDSCHs are scheduled only on a PCC in all subframes. In this case, a fallback mode operation may be performed as described above. For example, ACK/NACK transmission may be performed through PUCCH format 1b using the channel selection mapping relationship as shown in Table 6.

In a TDD 4 DL:1UL configuration, since PDSCHs are scheduled on both a PCC and an SCC in the first subframe, PUCCH resources may be determined based on a CCE index of a PDCCH for scheduling a PDSCH on the PCC. Since a PDSCH is not scheduled in the second subframe and is scheduled only on one cell (PCC or SCC) in the third and fourth subframes, PUCCH resources may be determined based on a CCE index of PDCCHs of the corresponding PDSCHs. In this way, a channel selection operation may be performed using the determined PUCCH resources. For example, ACK/NACK transmission may be performed using the channel selection mapping relationship shown in Table 10.

An example of applying CC-domain bundling to Mode 2 is described with reference to FIG. 42.

Figure 42:
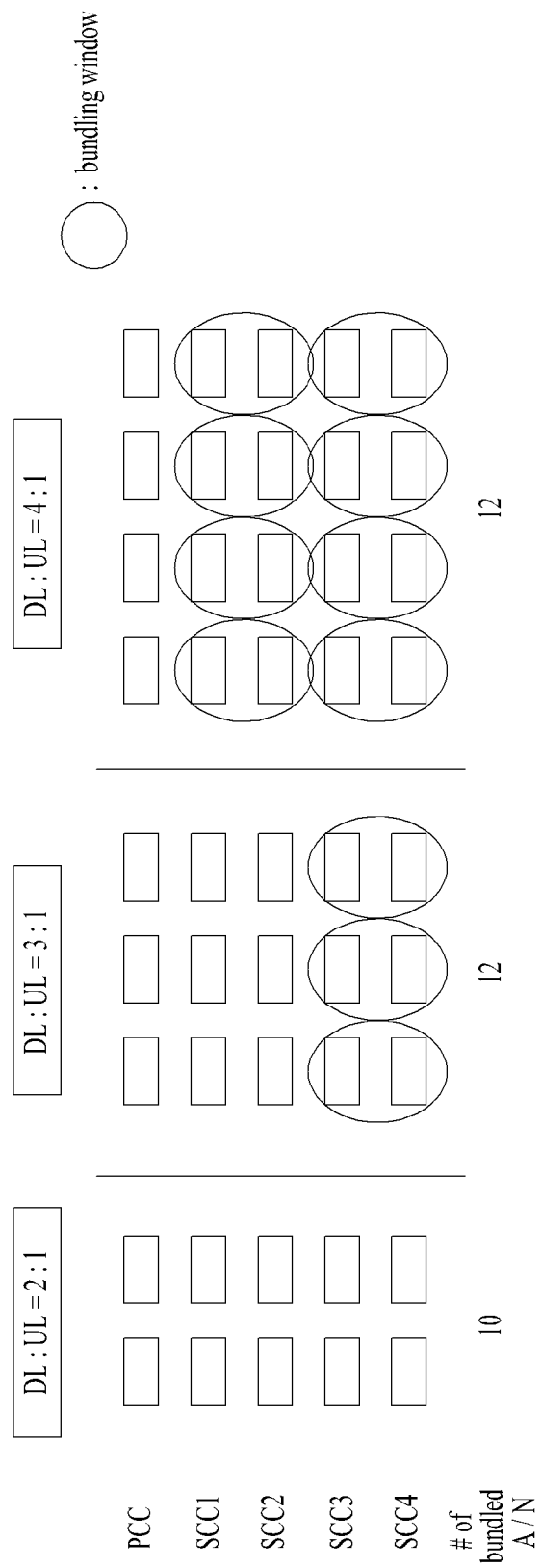
FIG. 42 is a diagram explaining channel selection using PUCCH format 3 in CC-domain bundling.

In the example of FIG. 42, it is assumed that the maximum number of ACK/NACK bits is 12 and a maximum bundling window is 2 (i.e., a maximum of two CCs is included in one bundling window).

To keep individual ACK/NACK transmission, bundling is gradually applied until the number of ACK/NACK bits is nearest 12 and less than 12.

In addition, a PCell (or PCC) is not included in a bundling window. That is, the bundling window is configured for only SCells (SCCs). The bundling window may be applied in ascending order of CC index.

As illustrated in FIG. 42, CC-domain bundling may gradually apply a bundling window (comprised of 2 CCs)

until the number of ACK/NACK bits (the number of ACK/NACK bits after spatial bundling is applied) becomes 12 or less.

In a 2 DL:1UL configuration of FIG. 42, since the number ACK/NACK bits after spatial bundling is performed is 10, the bundling window is not configured.

In a 3 DL: 1UL configuration, since the number ACK/NACK bits after spatial bundling is performed is 15, a bundling window is configured. The number of ACK/NACK bits after the bundling window for two CCs (SCC3 and SCC4) is configured is 12 and, therefore, the bundling window is not configured any more.

In a 4 DL:1UL configuration of FIG. 42, since the number of ACK/NACK bits after spatial bundling is performed is 20, a bundling window is configured. When a bundling window for two CCs (SCC3 and SCC4) is configured, a 16-bit ACK/NACK is generated and thus an additional bundling window is configured. If the additional bundling window is configured for two CCs (SCC1 and SCC2), 12-bit ACK/NACK is generated and, therefore, a bundling window is not configured any more.

Accordingly, when CC-domain partial bundling is used, a bundling result for all ACK/NACK bits in the bundling window (e.g., a result of logical AND operation) is transmitted as ACK/NACK information. A DAI in a PDCCH indicates the total number of PDSCHs scheduled on all CCs in one subframe. A maximum size of the bundling window for PUCCH format 3 may be determined as 2 (i.e., a maximum of two CCs (or cells) may configure one bundling window).

Embodiment 11

Embodiment 11 relates to an ACK/NACK transmission method through PUCCH format 3 when PDCCH/PDSCH is received only on a PCell (hereinafter, referred to as PCell-only-receiving). Especially, PCell-only-receiving in TDD is described in detail.

When a PDCCH corresponding to a PDSCH is not received on SCells and is received only on a PCell, a PUCCH format 1a/1b resource of LTE release-8 may be used (i.e., may operate in fallback mode).

In FDD, the fallback mode may be applied for the purpose of using a PUCCH resource defined in LTE release-8 and the purpose of definitely determining the PUCCH resource even without receiving an ARI on SCells.

If a TPC field is used for an ARI purpose on SCells, an ACK/NACK resource may be ambiguous in a PCell-only-receiving case. To solve such a problem, ACK/NACK multiplexing or ACK/NACK bundling defined in an LTE release-8 TDD system may be applied. However, if ACK/NACK bundling or time domain bundling is applied, some ACK/NACK information cannot be transmitted and, therefore, substantial loss of DL throughput may be generated. Further, since partial ACK/NACK states are overlapped in an ACK/NACK mapping relationship, ACK/NACK performance for 4-bit ACK/NACK in an LTE release-8 TDD system cannot be guaranteed.

Accordingly, an ACK/NACK transmission method for a PCell-only-receiving case is proposed hereinbelow.

Embodiment 11-1

According to this embodiment, a resource of PUCCH format 1a/1b defined in LTE release-8 may be used when a single PDSCH is received on a PCell. In this case, use of a DAI and an ARI may be defined as follows.

Figure 43:
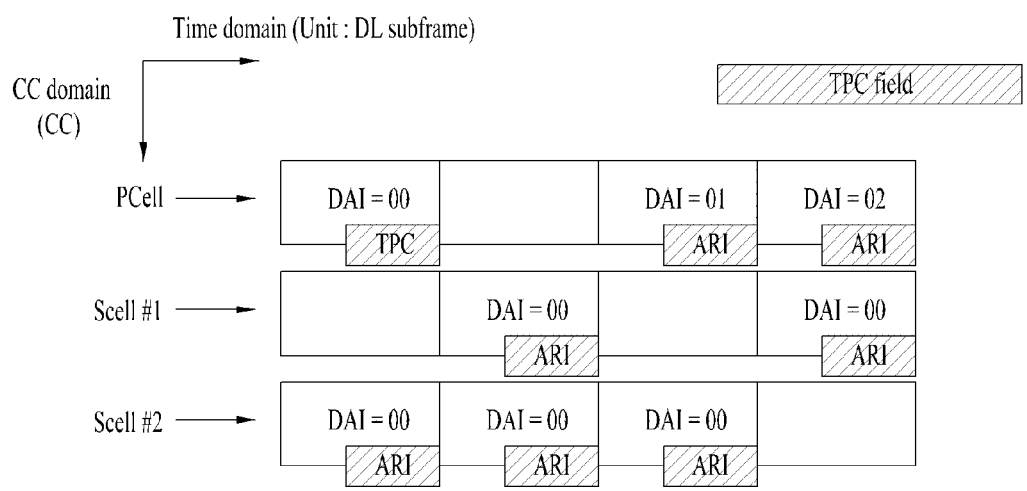
FIG. 43 is a diagram illustrating an example of use of a DAI and a TPC.

FIG. 43 is a diagram illustrating an example of use of a DAI and a TPC.

As illustrated in FIG. 43, DAIs on a PCell may be used as an accumulation counter of a PDCCH (or PDSCH) as in an LTE release-8 TDD system. DAIs on SCells may be used as an accumulation counter of a PDCCH (or PDSCH) as in an LTE release-8 TDD system. The DAIs on SCells may be configured as '00'. In the illustrated example of FIG. 43, DAI values of PDCCHs of SCells are all configured as '00'. If the DAI values of PDCCHs on SCells are configured identically as '00', PDCCH DCI may also be scheduled even in a common search space. The predefined value of '00' may be used as a virtual CRC (i.e., for error detection when a DAI value is not '00') in terms of UE implementation.

As illustrated in FIG. 43, a TPC field of a PDCCH allocated first on a PCell (i.e., a PDCCH with DAI=00) is used for a TPC command of an original purpose. TPC fields of all other PDCCHs (including the PCell and SCells), except for the PDCCH with DAI=00 on the PCell, are used for an ARI purpose. Fields used for the ARI purpose in the PDCCHs should have the same value in all PDCCHs.

UE behavior in this case may be defined as follows.
If there is PDSCH transmission without a corresponding PDCCH on a PCell (i.e. only SPS PDSCH),
    if there is no other PDSCH transmission,
        LTE release-8 PUCCH format 1a/1b is used.
    Else,
        PUCCH format 3 is used.
            Exceptionally, a TPC field in a PDCCH with DAI='00' is used as an ARI.
Else,
    if there is a single PDSCH with DAI='00' on a PCell or there is a single PDCCH with DAI='00' indicating DL SPS release on a PCell,
        LTE release-8 PUCCH format 1a/1b is used.
    Else,
        PUCCH format 3 is used.

In the above description, the case where 'there is PDSCH transmission without a corresponding PDCCH' corresponds to a DL SPS PDSCH. Moreover, 'a single PDSCH with DAI='00'' indicates that a DAI field in a PDCCH corresponding to the PDSCH is 00.

Embodiment 11-1 is applicable to all cases including a 9 DL:1UL subframe configuration for TDD ACK/NACK feedback and time-domain/CC-domain bundling for Mode 1 and Mode 2.

The above-described Embodiment 11-1 is summarized as follows.

Resources of LTE release-8 PUCCH format 1a/1b and PUCCH format 1a/1b are used in (1) the case where there is 'a single PDSCH without a corresponding PDCCH' on a PCell, (2) the case where there is 'a single PDSCH with a corresponding PDCCH' only on a PCell and a DAI value in the PDCCH is 00, or (3) the case where there is 'a single PDCCH indicating DL SPS release' only on a PCell and a DAI value in the PDCCH is 00.

LTE release-8 PUCCH format 3 is used for cases except for the above (1), (2), and (3) cases.

If there is no 'PDSCH without a corresponding PDCCH (i.e., DL SPS PDSCH)' on a PCell, the following operation is performed. If there is a 'PDSCH with a corresponding PDCCH' on the PCell and a DAI value of the PDCCH is 00, a TPC field of the PDCCH is used for an actual TPC command. If there is a 'PDCCH indicating DL SPS release' and a DAI value of the PDCCH is 00, a TPC field of the PDCCH is used for an actual TPC command. In the other cases, all TPC fields are used as ARIs.

In the other cases (i.e., there is a 'PDSCH without a corresponding PDCCH (i.e., DL SPS PDSCH) on a PCell), all TPC fields of PDCCHs are used as ARIs.

In addition, in all of the above cases, all fields used as ARIs in PDCCHs have the same value.

Embodiment 11-2

In FDD, TPC fields on SCells are used for an ARI purpose and TPC fields on a PCell are used for an original TPC purpose. According to this embodiment, in TDD, TPC fields in PDCCHs on the PCell are used for an original TPC purpose and TPC fields in PDCCHs on SCells are used for an ARI purposes, in a similar manner as in FDD. In this case, the same PUCCH power control operation as an operation in legacy LTE release-8 may be performed without modification.

Figure 44:
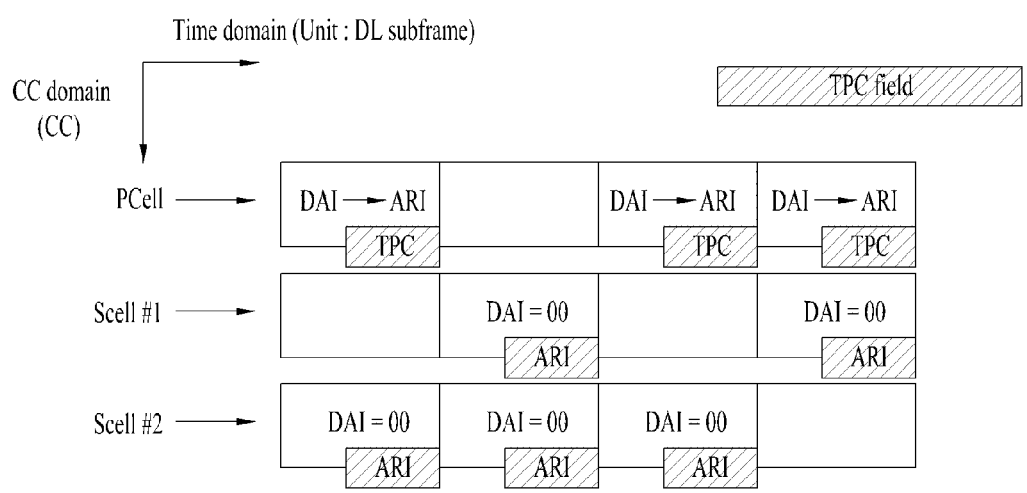
FIG. 44 is a diagram illustrating another example of use of a DAI and a TPC.

FIG. 44 is a diagram illustrating another example of use of a DAI and a TPC.

As in the example of FIG. 44, DAI fields of PDCCHs on a PCell may be used for an ARI purpose with respect to a UE receiving PDSCHs only on the PCell. Using such DAI fields is available in Mode 1 because Mode 1 does not need to support a DAI in time-domain/CC-domain bundling. In addition, fields used as ARIs of PDCCHs (DAI fields on the PCell and TPC fields on SCells) should have the same value.

In the illustrated example of FIG. 44, DAI values of PDCCHs on the SCells are all configured as '00'. A description thereof is omitted because it is the same as that of FIG. 43.

UE behavior based on the above description is defined as follows.
  For a PDCCH(s) which schedules a PDSCH(s) or indicate SPS release on a PCell,
    a TPC field is used for a TPC command.
    A DAI field is used as an ARI for PUCCH format 3.
  For PDCCHs which schedule PDSCHs on SCells,
    a TPC field is used as an ARI for PUCCH format 3.
  Exceptionally, for only an SPS PDSCH without a PDCCH,
    LTE release-8 PUCCH format 1a/1b (RRC-configured for SPS) is used.
  All fields used as ARIs in PDCCHs have the same value.

The above embodiments 9 to 11 mainly relate to a detailed application example of the present invention for ACK/NACK transmission through a PUCCH in a TDD system. In the following Embodiment 12, examples in which the present invention reusing a TPC field on a PCell as an ARI is applied to FDD and TDD systems will be described in detail.

Embodiment 12

In this Embodiment 12, a method of using an ARI in a 'PDCCH indicating DL SPS release' on a PCell is described.

Specifically, Embodiment 12 relates to a method for transmitting ACK/NACK through PUCCH format 3 by reusing a TPC field of a 'PDCCH indicating DL SPS release', when a single 'PDCCH indicating DL SPS release' on a PCell is received in the case where there are no PDSCH on an SCell(s) and an SPS PDSCH (i.e., a PDSCH without a corresponding PDCCH) on the PCell. That is, the method for transmitting ACK/NACK when there is no SPS PDSCH (i.e., a PDSCH without a corresponding PDCCH) and a single PDSCH is received on the PCell have been described. In this embodiment, an additional ACK/NACK transmission method when a PDSCH (a PDSCH with/without a corresponding PDCCH) is not present and a 'PDCCH indicating DL SPS release' is received on the PCell is described.

A method of using an ARI in FDD is as follows.

A TPC field of a 'PDCCH indicating DL SPS release' on a PCell is used for an ARI purpose. A TPC field of a PDCCH except for the 'PDCCH indicating DL SPS release' is used on the PCell for a TPC command of an original purpose. Further, a TPC field of a PDCCH on SCells is used as an ARI. The UE assumes that all ARI values on the PCell and SCells are the same.

UE behavior based on the above description may be defined as follows.
  If there is a single PDSCH without a corresponding PDCCH on a PCell (i.e. only SPS PDSCH),
    LTE release-8 PUCCH format 1a/1b is used.
    A PUCCH resource may be selected from among RRC-configured resources, by a TPC field of a PDCCH corresponding to SPS or by a value of a TPC field in a PDCCH during SPS activation when a corresponding PDCCH is not present (explicit mapping).
    When a corresponding PDCCH is present, a PUCCH resource may be selected by a prescribed rule based on a CCE index of the PDCCH (e.g. by an equation defined in LTE release-8 (implicit mapping).
  Else if there is a single PDCCH indicating DL SPS release only on a PCell (i.e. only SPS release PDCCH).
    PUCCH format 3 is used.
    Exceptionally, a TPC field of a PDCCH indicating DL SPS release may also be used as an ARI.
  Else,
    PUCCH format 3 is used.

Next, a method of using a DAI and an ARI in TDD is as follows.

A DAI on a PCell is used as an accumulation counter of PDCCHs/PDSCHs as in LTE release-8. DAIs for SCells are configured as a preset value (e.g., '00') so that DCI is scheduled on a common search space. The preset value may be used as a virtual CRC in terms of UE implementation.

A TPC field of a PDCCH allocated first on a PCell (i.e., a PDCCH with DAI=1 or DAI=00) is used for a TPC command of an original purpose. TPC fields of all other PDCCHs (i.e., the other PDCCHs on the PCell and PDCCHs on SCells) except for the PDCCH allocated first on the PCell are used for an ARI purpose. TPC fields when DAI='00' in the above other PDCCHs are also used as ARIs. In addition, the UE assumes that all ARI values are the same.

UE behavior based on the above description may be defined as follows.
  If there is a PDSCH transmission on a PCell and there is no PDCCH corresponding to the PDSCH (i.e. SPS PDSCH),
    if there is no other PDSCH transmissions (i.e. if only an SPS PDSCH is present),
      LTE release-8 PUCCH format 1a/1b is used.
      A PUCCH resource may be selected from among RRC-configured resources, by a TPC field of a PDCCH corresponding to SPS or by a value of a TPC field in a PDCCH during SPS activation when a corresponding PDCCH is not present (explicit mapping).
      When a corresponding PDCCH is present, a PUCCH resource may be selected by a prescribed rule based on a CCE index of the PDCCH (e.g. by an equation defined in LTE release-8 (implicit mapping)).

Else if (i.e. if an SPS PDSCH includes other additional transmissions),
PUCCH format 3 is used/
Exceptionally, a TPC field in a PDCCH with DAI='00' is also used as an ARI.
Else, no SPS
If there is a single PDSCH transmission only on PCell only with DAI='00', (only first PDCCH)
Rel-8 PUCCH format 1a/1b is used.
Implicit mapping may be used by a rule such as an equation in Rel-8 TDD based on a CCE index of the PDCCH.
A PUCCH resource may be selected from among RRC-configured resources, by a TPC field of a PDCCH corresponding to SPS or by a value of a TPC field in a PDCCH during SPS activation (when a corresponding PDCCH is not present) (explicit mapping).
Else if there is a single PDCCH only on PCell only indicating downlink SPS release on PCell (only SPS release),
PUCCH format 3 is used.
As an exceptional case, the TPC field in PDCCH indicating downlink SPS release is also used as ARI
Else,
PUCCH format 3 is used.

Embodiment 13

Embodiment 13 relates to a method of using different TPC fields according to whether an SPS PDSCH is present.

As described above, an ACK/NACK response is generated with respect to three cases. Case 1 relates to a PDSCH with a corresponding PDCCH, Case 2 relates to a PDCCH indicating DL SPS release, and Case 3 relates to a PDSCH without a corresponding PDCCH. Case 3 is also referred to as ACK/NACK for an SPS PDSCH.

In description of this embodiment, a 'PDCCH' related to an ACK/NACK response indicates Case 1 or Case 2 and an 'SPS PDSCH' indicates Case 3. An operation in which a specific UE performs DL reception for the above three cases and performs ACK/NACK for DL reception. An ACK/NACK response transmitted in an n-th UL subframe has a relationship of an ACK/NACK response to DL transmission of the above three cases in an (n–k)-th subframe(s) (where k∈K and K: $\{k_0, k_1, \ldots k_{M-1}\}$ and see Table 12). Description of an ACK/NACK transmission subframe location will be omitted hereinbelow.

If ACK/NACK is transmitted from the UE through various formats, complexity of blind decoding for the BS to interpret ACK/NACK is increased. To improve performance in the BS, such as complicated blind decoding, and to efficiently use resources, a PUCCH format as configured by a higher layer may be used. Hereinafter, a method of using different TPC fields depending on whether an SPS PDSCH is present will be described in detail.

When one serving cell is configured, use of a (2-bit) TPC field may be determined as follows. When an SPS PDSCH is present, TPC files in all PDCCHs may be used as ARIs and the UE may assume that ARI values are the same in all PDCCHs. Meanwhile, if the SPS PDSCH is not present, a TPC field of a PDCCH with DL DAI=1 may be used for an original TPC command and a TPC field of a PDCCH with DL DAI>1 may be used as an ARI. The UE may assume that ARI values are the same in all PDCCHs with DL DAI>1.

In addition, when one serving cell is configured, use of a PUCCH format may be determined as follows. If the UE receives 'only' the SPS PDSCH, LTE release-8 PUCCH format 1a/1b may be used. Alternatively, if the UE receives 'only' a single PDCCH with DL DAI=1, LTE release-8 PUCCH format 1a/1b may be used. In the other cases, PUCCH format 3 may be used as a PUCCH format configured by a higher layer.

If a DL DAI is used as a simple counter (PDCCH accumulation counter), resource allocation of TDD PUCCH format 3 in CA may be identical to resource allocation in a single carrier (or non-CA). That is, a resource allocation method for a PCell may use the same method as the resource allocation method in non-CA. In the case of CA, PUCCH resource allocation for multiple cells may be determined as follows.

If more than one serving cell is configured, use of a TPC field may be determined as follows. When an SPS PDSCH is present, TPC fields of all PDCCHs on a PCell and an SCell(s) may be used for an ARI purpose and the UE may assume that ARI values on all PDCCHs on the PCell and SCell(s) are the same. Meanwhile, if the SPS PDSCH is not present, a TPC field of a PDCCH with DL DAI=1 only on the PCell may be used for an original TPC command and TPC fields of all other PDCCHs on the PCell and SCell(s) may be used for an ARI purpose. The UE may assume that ARI values on all PDCCHs on the PCell and SCell(s) are the same.

If more than one serving cell is configured, use of a PUCCH format may be used as follows. If the UE receives 'only' an SPS PDSCH, LTE release-8 PUCCH format 1a/1b may be used. Alternatively, if the UE receives 'only' a single PDCCH with DL DAI=1, LTE release-8 PUCCH format 1a/1b may be used. For the other cases, PUCCH format 3 may be used as a PUCCH format configured by a higher layer.

Embodiment 14

Embodiment 14 relates to a PUCCH resource allocation method for TDD HARQ ACK/NACK response transmission in consideration of the above-described embodiments.

In a legacy LTE release-8/9 system, since ACK/NACK bundling (spatial bundling and/or time-domain bundling) is applied to ACK/NACK transmission exceeding a prescribed bit size (e.g., 4 bits), loss of individual ACK/NACK information has been generated. In an LTE release-10 (or LTE-A system) system, PUCCH format 3 is designed so as to support transmission of individual ACK/NACK information of up to 20 bits. In a CA and/or TDD support system, since the case in which ACK/NACK of 20 bits or more is transmitted may occur, a method of efficiently using resources while transmitting ACK/NACK information without any loss is needed.

Figure 45:
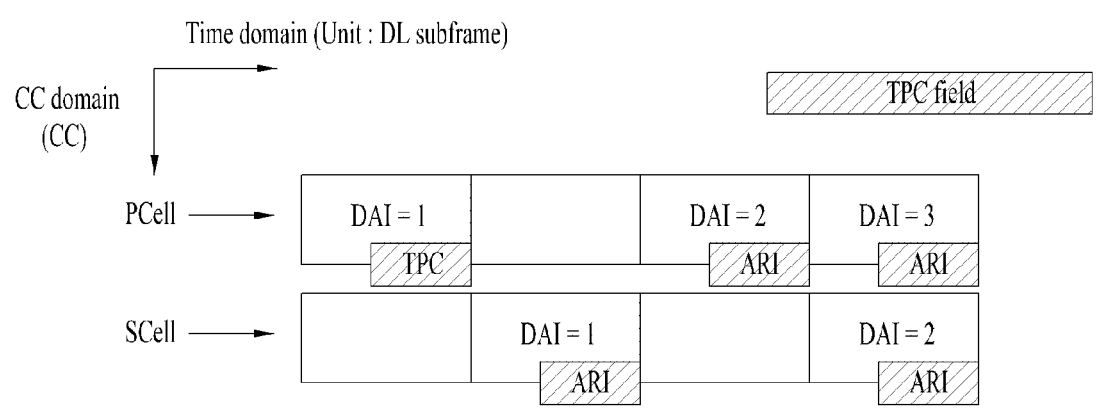
FIG. 45 is a diagram illustrating an example of the present invention for use of a TPC field in a PDCCH.

FIG. 45 is a diagram illustrating an example of the present invention for use of a TPC field in a PDCCH. In the example of FIG. 45, an ARI is information indicating a resource of PUCCH format 3 for ACK/NACK transmission. Although a TPC field of a PDCCH with DL DAI=1 on a PCell is used for an original TPC command, TPC fields of the other PDCCHs on the PCell and an SCell are used as ARIs. The UE may assume that ARI values on the PCell and SCell are the same. Therefore, even if only one ARI is detected, a resource of PUCCH format 3 may be determined.

When a TPC field is reused as an ARI, accuracy of PUCCH power control may be reduced. However, since a resource of PUCCH format 3 can be certainly determined through ARI information, transmission of ACK/NACK information without loss using PUCCH format 3 may be preferable for overall system relative to reduction in accuracy of PUCCH power control.

In the example of FIG. 45, when the UE succeeds in detecting at least one PDCCH including an ARI, an ACK/NACK response may be transmitted using PUCCH format 3 indicated by the ARI. However, if the UE detects 'only' a PDCCH without an ARI (i.e., a PDCCH with DAI=1 on a PCell), the UE cannot obtain ARI information and cannot determine the PUCCH format 3 resource. In this case, an ACK/NACK response may be transmitted without information loss using a legacy format, i.e., PUCCH format 1a/1b of LTE release-8/9.

Accordingly, a resource allocation method capable of transmitting an ACK/NACK response to DL transmission (PDCCHs and/or PDSCHs) transmitted in one or more DL subframes without any loss may be provided. In addition, since a PUCCH format and a PUCCH resource are determined in the same manner irrespective of CA or non-CA, the operations of the BS and the UE can be specified simply and clearly.

Figure 46:
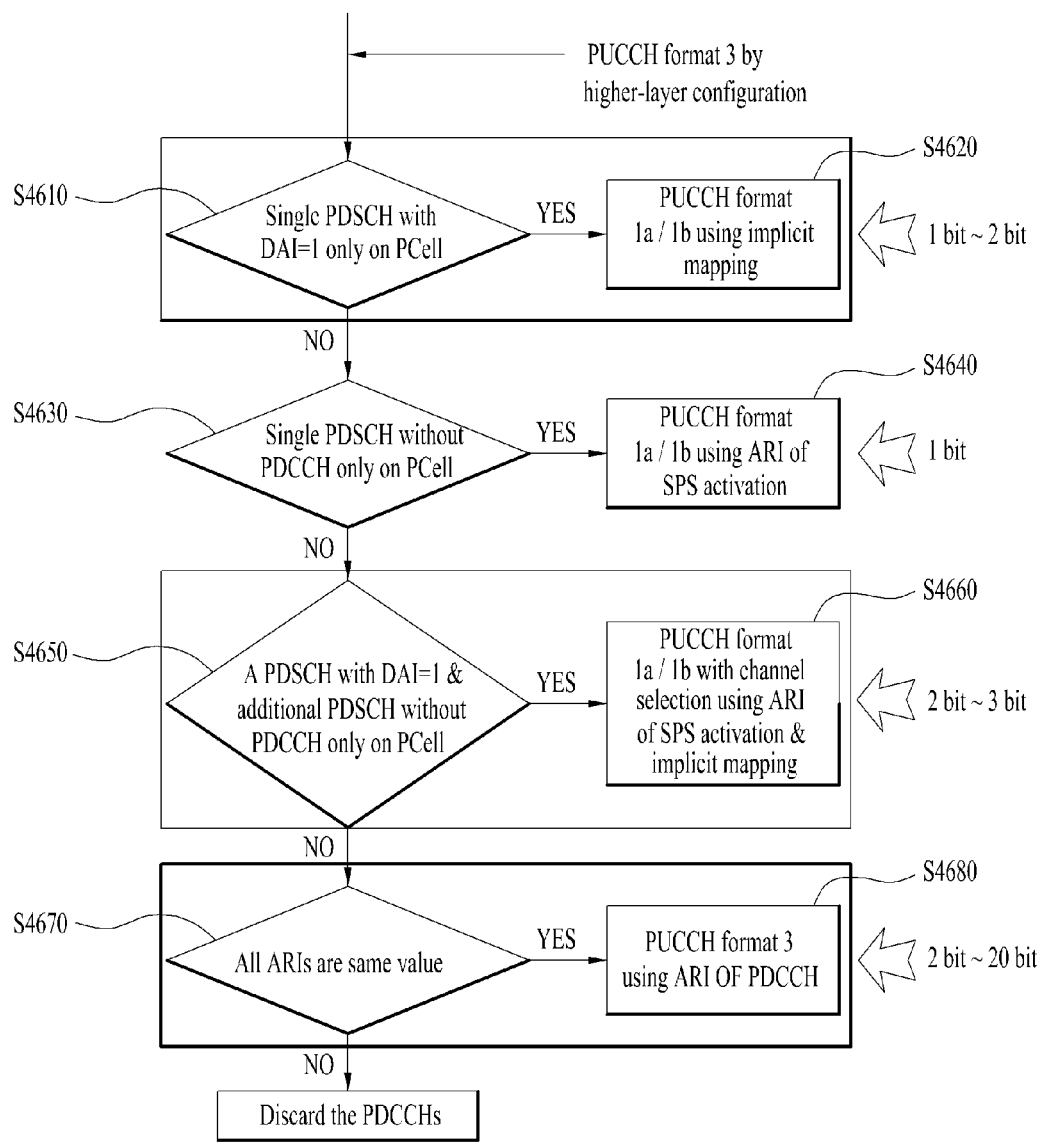
FIG. 46 is an overall flowchart explaining an ACK/NACK transmission method for various DL transmissions according to an example of the present invention.

FIG. 46 is an overall flowchart explaining various embodiments proposed in the present invention. In the example of FIG. 46, a description is given on the premise that PUCCH format 3 is configured for the UE by a higher layer.

In step S4610, a UE determines whether one PDSCH with DAI=1 (i.e., a PDSCH corresponding to a PDCCH with DAI=1) is received only on a PCell.

If a result of step S4610 is YES, step S4620 is performed. Since a TPC field of the PDCCH with DAI=1 on the PCell is used for an original TPC command, the UE cannot acquire ARI information upon receiving only the PDCCH with DAI=1. Accordingly, the UE does not use PUCCH format 3. The UE may transmit ACK/NACK using PUCCH format 1a/1b. A resource of PUCCH format 1a/1b may be determined by implicit mapping (i.e., by a PUCCH resource index derived from a CCE index of the PDCCH).

Meanwhile, if the result of step S4610 is NO, step S4630 is performed. In step S4630, the UE determines whether a single PDSCH without a PDCCH only on the PCell has been received.

If a result of step S4630 is YES, step S4640 is performed. Since the UE has not received the PDCCH, the UE cannot acquire the ARI information and does not use PUCCH format 3. The UE may transmit ACK/NACK using PUCCH format 1a/1b. Here, since the PDCCH has not been received, the UE cannot derive the PUCCH resource index derived from the PDCCH CCE index. Accordingly, the UE may determine the PUCCH resource index according to information included in an SPS activation PDCCH (e.g., information indicated by reuse of a TPC field in the SPS activation PDCCH).

If a result of step S4630 is NO, step S4650 is performed. In step S4650, the UE determines whether a 'PDSCH with DAI=1' and, additionally, 'a PDSCH without a PDCCH' only on the PCell have been received.

If a result of step S4650 is YES, step S4660 is performed. Even in this case, since the ARI information cannot be obtained, the UE uses PUCCH format 1a/1b instead of PUCCH format 3. Here, the UE may transmit ACK/NACK information by a channel selection scheme in order to prevent loss of ACK/NACK information. Channel selection may be performed such that a PUCCH resource is selected from among A (=2 or 3) PUCCH resources. Here, a value of A may be determined according to the number of codewords (or transport blocks) of the PDSCH.

Meanwhile, if a result of step S4650 is NO, step S4670 is performed. In step S4670, the UE may determine whether a value of an ARI (i.e., TPC field) of a PDCCH in which a DAI value is not 1 (i.e., DAI>1) on the PCell is equal to ARI (i.e., TPC field) values of all PDCCHs on the SCell(s).

If a result of step S4670 is YES, step S4680 is performed. In this case, the UE may transmit ACK/NACK information using a PUCCH format 3 resource indicated by the ARI. The UE assumes that ARI values are the same in all PDCCHs and may perform step S4680 using an ARI value in at least one PDCCH.

Meanwhile, if a result of step S4670 is NO (i.e., if ARI values on the PCell and SCell(s) are not equal), the UE may discard the received PDCCHs.

In summary, for a 'PDSCH with a PDCCH', a 'PDSCH without a PDCCH (SPS-PDSCH)', and an 'SPS release PDCCH', for which the UE should transmit ACK/NACK, the following UE behavior may be defined. However, the range of the present invention is not limited thereto and TDD HARQ ACK/NACK resource allocation and transmission operation may be performed by an available combination of various embodiments of the present invention.

First, operation of a non-CA system may be identical to a 'PCell-only-receiving' operation in a CA environment. That is, the TDD HARQ ACK/NACK resource allocation and transmission operation when one serving cell is configured for the UE may be the same as a TDD HARQ ACK/NACK resource allocation and transmission operation when a PDSCH and/or a PDCCH is received only on the PCell in the case where more than one serving cell is configured. Therefore, hereinafter, description of operation on the PCell may be replaced with operation on a serving cell when only one serving cell is configured.

If a DAI in a PDCCH corresponding to a PDSCH on a PCell is 1, a TPC field is used for an original power control purpose. If the DAI in the PDCCH corresponding to the PDSCH is greater than 1, the TPC field is used as an ARI. TPC fields in the PDCCHs corresponding to all PDSCHs on an SCell are used as ARIs. The UE assumes that all ARI values are the same.

If the UE receives only one SPS-PDSCH only on the PCell, the UE falls back to PUCCH format 1a/1b.

If the UE receives only one PDSCH with DAI=1 (i.e., a PDSCH with DAI=1, corresponding to PDCCH), the UE falls back to PUCCH format 1a/1b.

If one PDSCH with DAI=1 and one SPS-PDSCH are received only on the PCell, ACK/NACK transmission is performed by a channel selection scheme using PUCCH format 1b.

The number of PUCCH resources used for channel selection, A, is 2 or 3.

If one or more PDSCHs with DAI>1 (PDCCHs with DAI>1, corresponding to PDSCHs) are received, ACK/NACK transmission is performed using a PUCCH format 3 resource indicated by an ARI.

If one or more PDSCHs are received on an SCell, ACK/NACK transmission is performed using a PUCCH format 3 resource indicated by an ARI.

Accordingly, for all cases of receiving one of a 'PDSCH with a PDCCH', a 'PDSCH without a PDCCH (SPS-PDSCH)', and an 'SPS release PDCCH' only on a PCell or on a PCell and an SCell(s), ACK/NACK information can be correctly and efficiently transmitted without losing ACK/NACK information.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. In addition, claims which are not explicitly dependent on each other can be combined to provide an embodiment or new claims can be added through amendment after this application is filed.

What is claimed is:

1. A method for transmitting Acknowledgement/Negative Acknowledgement (ACK/NACK) information in a wireless communication system, the method performed by a User Equipment (UE) configured to use a Physical Uplink Control Channel (PUCCH) format 3 and comprising:
    configuring the PUCCH format 3 for a transmission of the ACK/NACK information; and
    transmitting the ACK/NACK information for downlink transmission in a downlink subframe set including M downlink subframes in one uplink subframe, wherein M>1,
    wherein a plurality of serving cells are configured for the UE and include one Primary Cell (PCell) and at least one Secondary Cell (SCell),
    wherein the UE transmits the ACK/NACK information using a PUCCH format 1b when a first condition is met, and
    wherein the first condition comprises a condition in case where the ACK/NACK information corresponds to one Physical Downlink Shared Channel (PDSCH) without a corresponding Physical Downlink Control Channel (PDCCH) received only on the PCell in the downlink subframe set and the ACK/NACK information corresponds to an additional PDSCH indicated by detection of one corresponding PDCCH.

2. The method according to claim 1, wherein the one corresponding PDCCH has a Downlink Assignment Index (DAI) value of 1.

3. The method according to claim 1, wherein the UE further transmits the ACK/NACK information using the PUCCH format 1b when a second condition is met, and
    wherein the second condition comprises a condition in case where the ACK/NACK information corresponds to the one PDSCH without the corresponding PDCCH received only on the PCell in the downlink subframe set and a Semi-Persistent Scheduling (SPS) release PDCCH having a Downlink Assignment Index (DAI) value of 1.

4. The method according to claim 3, wherein the UE transmits the ACK/NACK information using the PUCCH format 3 when the first condition and the second condition are not met.

5. The method according to claim 1, wherein a PUCCH resource used for transmitting the ACK/NACK information is selected from among 3 PUCCH resources, when a number of transport blocks of the downlink transmission in the downlink subframe set is 2.

6. The method according to claim 5, wherein one of the 3 PUCCH resources is determined according to a higher layer configuration, and
    wherein the other resources of the 3 PUCCH resources are determined using a Control Channel Element (CCE) index of the corresponding PDCCH.

7. The method according to claim 1, wherein a PUCCH resource used for transmitting the ACK/NACK information is selected from among 2 PUCCH resources, when a number of transport blocks of the downlink transmission in the downlink subframe set is 1.

8. The method according to claim 1, wherein the ACK/NACK information is transmitted by using 2 bits in the one uplink subframe.

9. The method according to claim 1, wherein the wireless communication system is a Time Division Duplex (TDD) system.

10. A User Equipment (UE) for transmitting Acknowledgement/Negative Acknowledgement (ACK/NACK) information in a wireless communication system, the UE configured to use a Physical Uplink Control Channel (PUCCH) format 3 and comprising:
    a receiver configured to receive a downlink signal from a Base Station (BS);
    a transmitter configured to transmit an uplink signal to the BS; and
    a processor configured to control the UE including the receiver and the transmitter,
    wherein the processor is further configured to:
        configure the PUCCH format 3 for a transmission of the ACK/NACK information; and
        control the transmitter to transmit the ACK/NACK information for downlink transmission in a downlink subframe set including M downlink subframes in one uplink subframe,
    wherein M>1,
    wherein a plurality of serving cells are configured for the UE and the more than one serving cell includes one Primary Cell (PCell) and at least one Secondary Cell (SCell),
    wherein the UE transmits the ACK/NACK information using a PUCCH format 1b when a first condition is met, and
    wherein the first condition comprises a condition in case where the ACK/NACK information corresponds to one Physical Downlink Shared Channel (PDSCH) without a corresponding Physical Downlink Control Channel (PDCCH) received by the receiver only on the PCell in the downlink subframe set and the ACK/NACK information further corresponds to an additional PDSCH indicated by detection of one corresponding PDCCH.

11. The UE according to claim 10, wherein the one corresponding PDCCH has a Downlink Assignment Index (DAI) value of 1.

12. The UE according to claim 10, wherein the processor further controls the transmitter to transmit the ACK/NACK information using the PUCCH format 1b when a second condition is met,
   wherein the second condition comprises a condition in case where the ACK/NACK information corresponds to the one PDSCH without the corresponding PDCCH received only on the PCell in the downlink subframe set and a Semi-Persistent Scheduling (SPS) release PDCCH having a Downlink Assignment Index (DAI) value of 1.

13. The UE according to claim 12, wherein the processor further controls the transmitter to transmit the ACK/NACK information using the PUCCH format 3 when the first condition and the second condition are not met.

14. The UE according to claim 10, wherein a PUCCH resource used for transmitting the ACK/NACK information is selected from among 3 PUCCH resources, when a number of transport blocks of the downlink transmission in the downlink subframe set is 2.

15. The UE according to claim 14, wherein one of the 3 PUCCH resources is determined according to a higher layer configuration, and
   wherein the other resources of the 3 PUCCH resources are determined using a Control Channel Element (CCE) index of the corresponding PDCCH.

16. The UE according to claim 10, wherein a PUCCH resource used for transmitting the ACK/NACK information is selected from among 2 PUCCH resources, when a number of transport blocks of the downlink transmission in the downlink subframe set is 1.

17. The UE according to claim 10, wherein the ACK/NACK information is transmitted by using 2 bits in the one uplink subframe.

18. The UE according to claim 10, wherein the wireless communication system is a Time Division Duplex (TDD) system.

* * * * *